(12) United States Patent
Verghese et al.

(10) Patent No.: US 8,667,452 B2
(45) Date of Patent: Mar. 4, 2014

(54) WIRELESS ENERGY TRANSFER MODELING TOOL

(71) Applicant: WiTricity Corporation, Watertown, MA (US)

(72) Inventors: Simon Verghese, Arlington, MA (US); Volkan Efe, Watertown, MA (US); Morris P. Kesler, Bedford, MA (US); Andre B. Kurs, Chestnut Hill, MA (US); Aristeidis Karalis, Boston, MA (US); Alexander Patrick McCauley, Cambridge, MA (US); Maria Empar Rollano Hijarrubia, Cambridge, MA (US)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 13/668,756

(22) Filed: Nov. 5, 2012

(65) Prior Publication Data

US 2013/0159956 A1     Jun. 20, 2013

Related U.S. Application Data

(60) Provisional application No. 61/555,941, filed on Nov. 4, 2011.

(51) Int. Cl.
| | | |
|---|---|---|
| H01F 27/42 | (2006.01) | |
| H01F 37/00 | (2006.01) | |
| H01F 38/00 | (2006.01) | |
| G06F 11/22 | (2006.01) | |
| G06F 17/50 | (2006.01) | |

(52) U.S. Cl.
USPC .......................................... 716/136; 307/104

(58) Field of Classification Search
USPC .......................................... 307/104; 716/136
See application file for complete search history.

(56) References Cited

U.S. PATENT DOCUMENTS

| | | | |
|---|---|---|---|
| 645,576 | A | 3/1900 | Telsa |
| 649,621 | A | 5/1900 | Tesla |
| 787,412 | A | 4/1905 | Tesla |
| 1,119,732 | A | 12/1914 | Tesla |
| 2,133,494 | A | 10/1938 | Waters |
| 3,517,350 | A | 6/1970 | Beaver |
| 3,535,543 | A | 10/1970 | Dailey |

(Continued)

FOREIGN PATENT DOCUMENTS

| | | |
|---|---|---|
| CA | 142352 | 8/1912 |
| CN | 102239633 | 11/2011 |

(Continued)

OTHER PUBLICATIONS

Extended European Search Report for 11184066.6 mailed Mar. 28, 2013, Massachusetts Institute of Technology, 7 pages.

(Continued)

*Primary Examiner* — Suresh Memula
(74) *Attorney, Agent, or Firm* — Fish & Richardson P.C.

(57) ABSTRACT

A method includes defining and storing one or more attributes of a source resonator and a device resonator forming a system, defining and storing the interaction between the source resonator and the device resonator, modeling the electromagnetic performance of the system to derive one or more modeled values and utilizing the derived one or more modeled values to design an impedance matching network.

27 Claims, 69 Drawing Sheets

(56) References Cited

U.S. PATENT DOCUMENTS

| | | |
|---|---|---|
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,280,129 A | 7/1981 | Wells |
| 5,027,709 A | 7/1991 | Slagle |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,287,112 A | 2/1994 | Schuermann |
| 5,341,083 A | 8/1994 | Klontz et al. |
| 5,367,242 A | 11/1994 | Hulman |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,742,471 A | 4/1998 | Barbee, Jr. et al. |
| 5,821,731 A | 10/1998 | Kuki et al. |
| 5,898,579 A | 4/1999 | Boys et al. |
| 5,923,544 A | 7/1999 | Urano |
| 5,940,509 A | 8/1999 | Jovanovich et al. |
| 5,957,956 A | 9/1999 | Kroll et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,483,202 B1 | 11/2002 | Boys |
| 6,515,878 B1 | 2/2003 | Meins et al. |
| 6,535,133 B2 | 3/2003 | Gohara |
| 6,597,076 B2 | 7/2003 | Scheible et al. |
| 6,609,023 B1 | 8/2003 | Fischell et al. |
| 6,631,072 B1 | 10/2003 | Paul et al. |
| 6,664,770 B1 | 12/2003 | Bartels |
| 6,673,250 B2 | 1/2004 | Kuennen et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Gevorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| 7,212,414 B2 | 5/2007 | Baarman |
| 7,233,137 B2 | 6/2007 | Nakamura et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,462,951 B1 | 12/2008 | Baarman |
| 7,466,213 B2 | 12/2008 | Löbl et al. |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,525,283 B2 | 4/2009 | Cheng et al. |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,843,288 B2 | 11/2010 | Lee et al. |
| 7,863,859 B2 | 1/2011 | Soar |
| 7,885,050 B2 | 2/2011 | Lee |
| 7,919,886 B2 | 4/2011 | Tanaka |
| 7,923,870 B2 | 4/2011 | Jin |
| 7,952,322 B2 | 5/2011 | Partovi et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,304,935 B2 | 11/2012 | Karalis et al. |
| 8,324,759 B2 | 12/2012 | Karalis et al. |
| 8,400,017 B2 | 3/2013 | Kurs et al. |
| 8,410,636 B2 | 4/2013 | Kurs et al. |
| 8,441,154 B2 | 5/2013 | Karalis et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0100338 A1 | 5/2004 | Clark |

(56) References Cited

U.S. PATENT DOCUMENTS

| | | |
|---|---|---|
| 2004/0113847 A1 | 6/2004 | Qi et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman et al. |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0140482 A1 | 6/2005 | Cheng et al. |
| 2005/0156560 A1 | 7/2005 | Shimaoka et al. |
| 2005/0194926 A1 | 9/2005 | Di Stefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0022636 A1 | 2/2006 | Xian et al. |
| 2006/0061323 A1 | 3/2006 | Cheng et al. |
| 2006/0066443 A1 | 3/2006 | Hall |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0117596 A1 | 5/2007 | Greene et al. |
| 2007/0145830 A1 | 6/2007 | Lee et al. |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0067874 A1 | 3/2008 | Tseng |
| 2008/0154331 A1 | 6/2008 | John et al. |
| 2008/0191638 A1 | 8/2008 | Kuennen et al. |
| 2008/0197710 A1 | 8/2008 | Kreitz et al. |
| 2008/0211320 A1 | 9/2008 | Cook et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0300657 A1 | 12/2008 | Stultz |
| 2008/0300660 A1 | 12/2008 | John |
| 2009/0010028 A1 | 1/2009 | Baarman et al. |
| 2009/0015075 A1 | 1/2009 | Cook et al. |
| 2009/0033564 A1 | 2/2009 | Cook et al. |
| 2009/0045772 A1 | 2/2009 | Cook et al. |
| 2009/0051224 A1 | 2/2009 | Cook et al. |
| 2009/0058189 A1 | 3/2009 | Cook |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook |
| 2009/0072782 A1 | 3/2009 | Randall |
| 2009/0079268 A1 | 3/2009 | Cook et al. |
| 2009/0085408 A1 | 4/2009 | Bruhn |
| 2009/0085706 A1 | 4/2009 | Baarman et al. |
| 2009/0096413 A1 | 4/2009 | Partovi et al. |
| 2009/0102292 A1 | 4/2009 | Cook et al. |
| 2009/0108679 A1 | 4/2009 | Porwal |
| 2009/0108997 A1 | 4/2009 | Petterson et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen et al. |
| 2009/0160261 A1 | 6/2009 | Elo |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0322158 A1 | 12/2009 | Stevens et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |

(56) References Cited

U.S. PATENT DOCUMENTS

| | | |
|---|---|---|
| 2010/0065352 A1 | 3/2010 | Ichikawa |
| 2010/0066349 A1 | 3/2010 | Lin et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs et al. |
| 2010/0164297 A1* | 7/2010 | Kurs et al. ..................... 307/104 |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0184371 A1 | 7/2010 | Cook et al. |
| 2010/0187911 A1 | 7/2010 | Joannopoulos et al. |
| 2010/0187913 A1 | 7/2010 | Smith et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244839 A1 | 9/2010 | Yoshikawa |
| 2010/0248622 A1 | 9/2010 | Lyell Kirby et al. |
| 2010/0253152 A1 | 10/2010 | Karalis et al. |
| 2010/0253281 A1 | 10/2010 | Li |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1* | 10/2010 | Kurs et al. ..................... 307/104 |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0327660 A1 | 12/2010 | Karalis et al. |
| 2010/0327661 A1 | 12/2010 | Karalis et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2012/0001492 A9 | 1/2012 | Cook et al. |
| 2012/0007441 A1 | 1/2012 | John |
| 2012/0032522 A1 | 2/2012 | Schatz et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |

(56) References Cited

U.S. PATENT DOCUMENTS

| | | |
|---|---|---|
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |

FOREIGN PATENT DOCUMENTS

| | | |
|---|---|---|
| DE | 3824972 A1 | 1/1989 |
| DE | 10029147 A1 | 12/2001 |
| DE | 20016655 U1 | 2/2002 |
| DE | 10304584 A1 | 8/2004 |
| DE | 102005036290 A1 | 2/2007 |
| DE | 102006044057 A1 | 4/2008 |
| EP | 1335477 A2 | 8/2003 |
| EP | 2340611 A1 | 7/2011 |
| EP | 2357716 A2 | 8/2011 |
| IN | 1734/KOLNP/2011 | 9/2011 |
| JP | 02097005 A | 4/1990 |
| JP | 04265875 A | 9/1992 |
| JP | 09298847 A | 11/1997 |
| JP | 10164837 A | 6/1998 |
| JP | 11075329 A | 3/1999 |
| JP | 11188113 A | 7/1999 |
| JP | 2001309580 A | 11/2001 |
| JP | 2002010535 | 1/2002 |
| JP | 2003179526 A | 6/2003 |
| JP | 2004166459 A | 6/2004 |
| JP | 2004201458 A | 7/2004 |
| JP | 2005057444 A | 3/2005 |
| JP | 2008206231 A | 9/2008 |
| JP | 2011072074 A | 4/2011 |
| JP | 2012504387 A | 2/2012 |
| KR | 1020080007635 A | 1/2008 |
| KR | 1020090122072 A | 11/2009 |
| KR | 1020110050920 A | 5/2011 |
| WO | WO-9217929 A1 | 10/1992 |
| WO | WO-9323908 A1 | 11/1993 |
| WO | WO-9428560 A1 | 12/1994 |
| WO | WO-9602970 A1 | 2/1996 |
| WO | WO-9850993 A1 | 11/1998 |
| WO | WO-0077910 A1 | 12/2000 |
| WO | 10221484 A1 | 11/2003 |
| WO | WO-03092329 A1 | 11/2003 |
| WO | WO-03096361 A1 | 11/2003 |
| WO | WO-03096512 A2 | 11/2003 |
| WO | WO-2004038888 A2 | 5/2004 |
| WO | WO-2004055654 A2 | 7/2004 |
| WO | WO-2004073150 A1 | 8/2004 |
| WO | WO-2004073166 A2 | 8/2004 |
| WO | WO-2004073176 A2 | 8/2004 |
| WO | WO-2004073177 A2 | 8/2004 |
| WO | WO-2004112216 A1 | 12/2004 |
| WO | WO-2005024865 A2 | 3/2005 |
| WO | WO-2005060068 A1 | 6/2005 |
| WO | WO-2005109597 A1 | 11/2005 |
| WO | WO-2005109598 A1 | 11/2005 |
| WO | WO-2006011769 A1 | 2/2006 |
| WO | WO-2007008646 A2 | 1/2007 |
| WO | WO-2007020583 A2 | 2/2007 |
| WO | WO-2007042952 A1 | 4/2007 |
| WO | WO-2007084716 A2 | 7/2007 |
| WO | WO-2007084717 A2 | 7/2007 |
| WO | WO-2008109489 A2 | 9/2008 |
| WO | WO-2008118178 A1 | 10/2008 |
| WO | WO-2009009559 A1 | 1/2009 |
| WO | WO-2009018568 A2 | 2/2009 |
| WO | WO-2009023155 A2 | 2/2009 |
| WO | WO-2009023646 A2 | 2/2009 |
| WO | WO-2009033043 A2 | 3/2009 |
| WO | 2009062438 A1 | 5/2009 |
| WO | WO-2009070730 A2 | 6/2009 |
| WO | WO-2009126963 A2 | 10/2009 |
| WO | WO-2009140506 A1 | 11/2009 |
| WO | WO-2009149464 A2 | 12/2009 |
| WO | WO-2009155000 A2 | 12/2009 |
| WO | WO-2010030977 A2 | 3/2010 |
| WO | WO-2010036980 A1 | 4/2010 |
| WO | WO-2010039967 A1 | 4/2010 |
| WO | WO-2010090538 A1 | 8/2010 |
| WO | WO-2010090539 A1 | 8/2010 |
| WO | WO-2010093997 A1 | 8/2010 |
| WO | 2010104569 A1 | 9/2010 |
| WO | 2011061388 A1 | 5/2011 |
| WO | 2011061821 A1 | 5/2011 |
| WO | WO-2011062827 A2 | 5/2011 |
| WO | WO-2011112795 A1 | 9/2011 |
| WO | 2396796 A1 | 12/2011 |
| WO | WO-2012037279 A1 | 3/2012 |
| WO | 2012170278 A2 | 12/2012 |
| WO | 2012170278 A3 | 1/2013 |

(56) References Cited

FOREIGN PATENT DOCUMENTS

| | | | |
|---|---|---|---|
| WO | 2013013235 A2 | 1/2013 |
| WO | 2013020138 A2 | 2/2013 |
| WO | 2013036947 A2 | 3/2013 |
| WO | 2013020138 A3 | 4/2013 |
| WO | 2013059441 A1 | 4/2013 |
| WO | 2013013235 A3 | 5/2013 |
| WO | 2013036947 A3 | 5/2013 |
| WO | 2013067484 A1 | 5/2013 |

OTHER PUBLICATIONS

Jackson, J. D., "Classical Electrodynamics", 3rd Edition, Wiley, New York, 1999, pp. 201-203.
International Application Serial No. PCT/US2011/051634, International Preliminary Report on Patentability mailed Mar. 28, 2013, 8.
International Application Serial No. PCT/US2012/040184, International Search Report and Written Opinion mailed Nov. 28, 2012, 8 pages.
International Application Serial No. PCT/US2012/047844, International Search Report and Written Opinion mailed Mar. 25, 2013, 9 pages.
International Application Serial No. PCT/US2012/049777, International Search Report and Written Opinion mailed Jan. 23, 2013, 10 pages.
International Application Serial No. PCT/US2012/054490, International Search Report and Written Opinion mailed Feb. 28, 2013, 8 pages.
International Application Serial No. PCT/US2012/060793, International Search Report and Written Opinion mailed Mar. 8, 2013, 13 pages.
International Application Serial No. PCT/US2012/063530, International Search Report and Written Opinion, mailed Mar. 13, 2013, 16 pages.
Abe et al., "A noncontact Charger Using a Resonant Converter with Parallel Capacitor of the Secondary Coil", IEEE, vol. 36, No. 2, Mar./Apr. 2000, pp. 444-451.
Altchev et al., "Efficient Resonant Inductive Coupling Energy Transfer Using New Magnetic and Design Criteria", IEEE, Jun. 16, 2005, pp. 1293-1298.
Aoki et al., "Observation of strong coupling between one atom and a monolithic microresonator," Nature, vol. 443, Oct. 12, 2006, pp. 671-674.
Apneseth et al., "Introducing wireless proximity switches", ABB Review, Apr. 2002, pp. 42-49.
U.S. Appl. No. 12/613,686, Notice of Allowance mailed Jan. 6, 2011, 10 pages.
U.S. Appl. No. 12/613,686, Notice of Allowance mailed Mar. 7, 2011, 27 pages.
Australian Application Serial No. 2006269374, Examination Report mailed Sep. 18, 2008.
Baker et al., "Feedback Analysis and Design of RF Power Links for Low-Power Bionic Systems", IEEE Transactions on Biomedical Circuits and Systems, vol. 1, No. 1, Mar. 2007, pp. 28-38.
Balanis, Constantine A., Antenna Theory: Analysis and Design, 3rd Edition, Sections 4.2, 4.3, 5.2, 5.3, John Wiley & Sons Inc., 2005, 40 pages.
Berardelli, Phil, "Outlets Are Out", ScienceNOW Daily News, Science Now, http://sciencenow.sciencemag.org/cgi/content/full/2006/1114/2, Nov. 14, 2006, 2 pages.
Biever, Celeste, "Evanescent coupling could power gadgets wirelessly", NewScientistsTech.com, http://www.newscientisttech.com/article.ns?id=dn10575&print=true, Nov. 15, 2006, 2 pages.
Borenstein, Seth, (AP Science writer) "Man tries wirelessly boosting batteries", Boston.com, http://www.boston.com/business/technology/articles/2006/11/15/man_tries_wirelessly_b . . . Nov. 15, 2006, 1 page.
Boyle, Alan, "Electro-nirvana? Not so fast", MSNBC, http://cosmiclog.msnbc.msn.com/_news/2007/06/08/4350760-electro-nirvana-not-so-fast, Jun. 8, 2007, 1 page.
Bulkeley, William M., "MIT Scientists Pave the Way for Wireless Battery Charging", The Wall Street Journal, http://online.wsj.com/article/SB118123955549228045.html?mod=googlenews_wsj, Jun. 8, 2007, 2 pages.
Burri et al., Invention Description, Feb. 5, 2008, 16 pages.
Cass, Stephen, "Air Power—Wireless data connections are common—now scientists are working on wireless power", Sponsored by IEEE Spectrum, http://spectrum.ieee.org/computing/hardware/airpower, Nov. 2006, 2 pages.
Castelvecchi, Davide, "The Power of Induction—Cutting the last cord could resonate with our increasingly gadget-dependent lives", Science News Online, vol. 172, No. 3, Jul. 21, 2007, 6 pages.
Chang, Angela, "Recharging, The Wireless Way—Even physicists forget to recharge their cell phones sometimes", PC Magazine, ABC News Internet Ventures, Dec. 12, 2006, 1 page.
Chinaview, "Scientists light bulb with 'wireless electricity' ", www.Chinaview.cn, http://news.xinhuanet.com/english/2007-06/08/content_6215681.htm, Jun. 2007, 1 page.
Cooks, Gareth (Globe staff), "The vision of an MIT physicist: Getting rid of pesky rechargers" Boston.com, Dec. 11, 2006, 1 page.
Derbyshire, David, "The end of the plug? Scientists invent wireless device that beams electricity through your home", Daily Mail, http://www.dailymail.co.uk/pages/live/articles/technology/technology.html?in_article_id=4 . . . , Jun. 7, 2007, 3 pages.
Esser et al., "A New Approach to Power Supplies for Robots", IEEE, vol. 27, No. 5, Sep./Oct. 1991, pp. 872-875.
European Application No. 06 786 588.1-1242, Examination Report mailed Jan. 15, 2009, 5 pages.
Fenske et al., "Dielectric Materials at Microwave Frequencies", Appiied Microwave & Wireless, 2000, pp. 92-100.
Fernandez et al., "A simple DC-DC converter for the power supply of a.cochlear implant", Power Electronics Specialist Conference, IEEE 34th Annual, Jun. 2003, pp. 1965-1970.
Fildes, Jonathan, "The technology with impact 2007", BBC News, Dec. 27, 2007, 3 pages.
Fildes, Jonathan, "Wireless energy promise powers up" Science and Technology Report, BBC News, http://news.bbc.co.uk/2/hi/technology/6725955.stm, Jun. 7, 2007, 3 pages.
Fildes, Jonathan, (Science and Technology Reporter), "Physics Promises Wireless Power" BBC News, Nov. 15, 2006, 3 pages.
Freedman, David H., "Power on a Chip", MIT Technology Review, Nov. 2004, 3 pages.
Geyi, Wen, "A Method for the Evaluation of Small Antenna Q, IEEE Transactions on Antennas and Propagation", vol. 51, No. 8, Aug. 2003, pp. 2124-2129.
Hadley, Franklin, "Goodbye Wires—MIT Team Experimentally Demonstrates Wireless Power Transfer, Potentially Useful for Power Laptops, Cell-Phones Without Cords", Massachusetts Institute of Technology, Institute for Soldier Nanotechnologies, http://web.mit.edu/newsoffice/2007/wireless-0607.html, Jun. 7, 2007, 3 pages.
Haus, H.A., "Waves and Fields in Optoelectronics", Chapter 7 Coupling of Modes—Reasonators and Couplers, 1984, pp. 197-234.
Heikkinen et al., "Performance and Efficiency of Planar Rectennas for Short-Range Wireless Power Transfer at 2.45 GHz", Microwave and Optical Technology Letters, vol. 31, No. 2, Oct. 20, 2001, pp. 86-91.
Highfield, Roger, (Science Editor), "Wireless revolution could spell end of plugs", Telegraph.co.uk, http://www.telegraph.co.uk/news/main.jhtml?xml=news/2007/06/07/nwireless107.xml, Jun. 7, 2007, 3 pages.
Hirai et al., "Integral Motor with Driver and Wireless Transmission of Power and Information for Autonomous Subspindle Drive", IEEE, vol. 15, No. 1, Jan. 2000, pp. 13-20.
Hirai et al., "Practical Study on Wireless Transmission of Power and Information for Autonomous Decentralized Manufacturing System", IEEE, vol. 46, No. 2, Apr. 1999, pp. 349-359.
Hirai et al., "Study on Intelligent Battery Charging Using Inductive Transmission of Power and Information", IEEE, vol. 15, No. 2, Mar. 2000, pp. 335-345.
Hirai et al., "Wireless Transmission of Power and Information and Information for Cableless Linear Motor Drive", IEEE, vol. 15, No. 1, Jan. 2000, pp. 21-27.

(56) References Cited

OTHER PUBLICATIONS

Hirayama, Makoto, "Splashpower—World Leaders in Wireless Power", PowerPoint presentation, Splashpower Japan, Sep. 3, 2007, 30 pages.
In pictures: A year in technology, BBC News, http://news.bbc.co.uk/2/hi/in_pictures/7129507.stm, Dec. 28, 2007, 2 pages.
Infotech Online, "Recharging gadgets without cables", infotech.indiatimes.com, Nov. 17, 2006, 1 page.
Intel News Release, "Intel CTO Says Gap between Humans, Machines Will Close by 2050", (intel.com/.../20080821comp.htm?iid=S . . . ), Printed Nov. 6, 2009, 2 pages.
International Application Serial No. PCT/US2006/026480, International Preliminary Report on Patentability mailed Jan. 29, 2008, 8 pages.
International Application Serial No. PCT/US2006/026480, International Search Report and Written Opinion mailed Dec. 21, 2007, 14 pages.
International Application Serial No. PCT/US2007/070892, International Preliminary Report on Patentability mailed Sep. 29, 2009, 14 pages.
International Application Serial No. PCT/US2007/070892, International Search Report and Written Opinion mailed Mar. 3, 2008, 21 pages.
International Application Serial No. PCT/US2009/058499, International Preliminary Report on Patentability mailed Mar. 29, 2011, 5 pages.
International Application Serial No. PCT/US2009/058499, International Search Report and Written Opinion mailed Dec. 10, 2009, 6 pages.
International Application Serial No. PCT/US2009/059244, International Search Report and Written Opinion mailed Dec. 7, 2009, 12 pages.
International Application Serial No. PCT/US2009/43970, International Search Report and Written Opinion mailed Jul. 14, 2009, 9 pages.
International Application Serial No. PCT/US2010/024199, International Preliminary Report on Patentability mailed Aug. 25, 2011, 7 pages.
International Application Serial No. PCT/US2010/024199, International Search Report and Written Opinion mailed May 14, 2010, 12 pages.
International Application Serial No. PCT/US2011/027868, International Preliminary Report on Patentability mailed Sep. 20, 2012, 8 pages.
International Application Serial No. PCT/US2011/027868, International Search Report and Written Opinion mailed Jul. 5, 2011, 9 pages.
International Application Serial No. PCT/US2011/051634, International Search Report and Written Opinion mailed Jan. 6, 2012, 11 pages.
International Application Serial No. PCT/US2011/054544, International Search Report and Written Opinion mailed Jan. 30, 2012, 17 pages.
Jackson, J.D., Classical Electrodynamics, 3rd Edition, 1999, pp. 201-203.
Jacob et al., "Lithium Tantalate—A High Permittivity Dielectric Material for Microwave Communication Systems", Proceedings of IEEE Tencon—Poster Papers, 2003, pp. 1362-1366.
Karalis et al., Efficient Wireless non-radiative mid-range energy transfer, Annals of Physics, vol. 323, 2008, pp. 34-48.
Karalis, Aristeidis, "Electricity Unplugged", Feature: Wireless Energy, Physics World, physicsworld.com, Feb. 2009, pp. 23-25.
Kawamura et al., "Wireless Transmission of Power and Information Through One High-Frequency Resonant AC Link Inverter for Robot Manipulator Applications", IEEE, vol. 32, No. 3, May/Jun. 1996, pp. 503-508.
Konishi, Yoshihiro, Microwave Electronic Circuit Technology, (Marcel Dekker, Inc., New York, NY 1998), Chapter 4, pp. 145-197.

Kurs et al., "Optimized design of a low-resistance electrical conductor for the multimegahertz range," Applied Physics Letters, vol. 98, Apr. 2011, pp. 172504-172504-3.
Kurs et al., "Simultaneous mid-range power transfer to multiple devices", Applied Physics Letters, vol. 96, Jan. 26, 2010, pp. 044102-044102-3.
Kurs et al., "Wireless Power Transfer via Strongly Coupled Magnetic Resonances", Science vol. 317, No. 5834, Jul. 6, 2007, pp. 83-86.
Lamb, Gregory M., "Look, Ma—no wires!—Electricity broadcast through the air may someday run your home", The Christian Science Monitor, http://www.csmonitor.com/2006/1116/p14s01-stct.html, Nov. 15, 2006, 2 pages.
Lee, "Antenna Circuit Design for RFID Applications", Microchip Technology Inc., AN710, Jan. 21, 2003, 50 pages.
Lee, "RFID Coil Design", Microchip Technology Inc., AN678, 1998, 21 pages.
Liang et al., Silicon waveguide two-photon absorption detector at 1.5 μm wavelength for autocorrelation measurements, Applied Physics Letters, vol. 81, No. 7, Aug. 12, 2002, pp. 1323-1325.
Markoff, John, "Intel Moves to Free Gadgets of Their Recharging Cords", The New York Times—nytimes.com, Aug. 21, 2008, 2 pages.
Mediano et al. "Design of class E amplifier with nonlinear and linear shunt capacitances for any duty cycle", IEEE Trans. Microwave Theor. Tech., vol. 55, No. 3, Mar. 2007, pp. 484-492.
Microchip Technology Inc., "MCRF355/360 Reader Reference Design", microID 13.56 MHz Design Guide, 2001, 24 pages.
Minkel, J.R., "Wireless Energy Lights Bulb from Seven Feet Away—Physicists vow to cut the cord between your laptop battery and the wall socket with just a simple loop of wire", Scientific American, http://www.scientificamerican.com/article.cfm?id=wireless-energy-lights-bulb-from-seven-feet-away , Jun. 7, 2007, 1 page.
Minkel, J.R., "Wireless Energy Transfer May Power Devices at a Distance", Scientific American, Nov. 14, 2006, 1 page.
Morgan, James, "Lab report: Pull the plug for a positive charge", The Herald, Web Issue 2680, Nov. 16, 2006, 3 pages.
O'Brien et al., "Analysis of Wireless Power Supplies for Industrial Automation Systems", IEEE, Nov. 2-6, 2003, pp. 367-372.
O'Brien et al., "Design of Large Air-Gap Transformers for Wireless Power Supplies", IEEE, Jun. 15-19, 2003, pp. 1557-1562.
Pendry, J.B., "A Chiral Route to Negative Refraction", Science, vol. 306, Nov. 19, 2004, pp. 1353-1355.
Peterson, Gary, MIT WiTricity Not So Original After All, Feed Line No. 9:, http://www.tfcbooks.com/articles/witricity.htm, accessed on Nov. 12, 2009, pp. 1-3.
Physics Today, "Unwired energy questions asked, answered", Sep. 2007, pp. 16-17.
Physics Today,"Unwired Energy" section in Physics Update, www.physicstoday.org, http://arxiv.org/abs/physics/0611063, Jan. 2007, pp. 26.
Powercast L.L.C., "White Paper", Powercast simply wire free, 2003, 2 pages.
PR News wire, "The Big Story for CES 2007: The public debut of eCoupled Intelligent Wireless Power", Press Release, Fulton Innovation LLC, Las Vegas, NV, Dec. 27, 2006, 3 pages.
Press Release, "The world's first sheet-type wireless power transmission system: Will a socket be replaced by e-wall?", Public Relations Office, School of Engineering, University of Tokyo, Japan, Dec. 12, 2006, 4 pages.
PressTV, "Wireless power transfer possible", http://edition.presstv.ir/detail/12754.html, Jun. 11, 2007, 1 page.
Reidy, Chris (Globe staff), "MIT discovery could unplug your iPod forever", Boston.com, http://www.boston.com/businessiticker/2007/06/mit_discovery_c.html, Jun. 7, 2007, 3 pages.
Risen, Clay, "Wireless Energy", The New York Times, Dec. 9, 2007, 1 page.
Sakamoto et al., A Novel Circuit for Non-Contact Charging Through Electro-Magnetic Coupling, IEEE, Jun. 29-Jul. 1992, pp. 168-174.
Scheible et al., "Novel Wireless Power Supply System for Wireless Communication Devices in Industrial Automation Systems", IEEE, Nov. 5-8, 2002, pp. 1358-1363.
Schneider, David, "Electrons Unplugged. Wireless power at a distance is still far away," IEEE Spectrum, May 2010, pp. 35-39.

(56) References Cited

OTHER PUBLICATIONS

Schuder et al., "An Inductively Coupled RF System for the Transmission of 1 kW of Power Through the Skin", IEEE Transactions on Bio-Medical Engineering, vol. BME-18, No. 4, Jul. 1971, pp. 265-273.

Schuder et al., "Energy Transport Into the Closed Chest From a Set of Very-Large Mutually Orthogonal Coils", Communication Electronics, vol. 64, Jan. 1963, pp. 527-534.

Schuder, John C., "Powering an Artificial Heart: Birth of the Inductively Coupled-Radio Frequency System in 1960", Artificial Organs, vol. 26, No. 11, Nov. 2002, pp. 909-915.

Schutz et al., "Load Adaptive Medium Frequency Resonant Power Supply", IEEE, Nov. 2002, pp. 282-287.

Sekitani et al., "A large-area flexible wireless power transmission sheet using printed plastic MEMS switches and organic field-effect transistors". Dec. 11-13, 2006, 1-3 [Publication Unknown] Possible source, need to check w D. Peterson: IEDM '06. International Electron Devices Meeting, 2006, Dec. 11-13, 2006, 4 pages.

Sekitani et al., "A large-area wireless power-transmission sheet using printed organic transistors and plastic MEMS switches", Nature Materials 6: 413-417 (Jun. 1, 2007) Published online Apr. 29, 2007, 5 pages.

Sekiya et al. "FM/PWM control scheme in class DE inverter", IEEE Trans. Circuits Syst. I, vol. 51, No. 7, Jul. 2004, pp. 1250-1260.

Senge, Miebi, "MIT's wireless electricity for mobile phones", Vanguard, http://www.vanguardngr.com/articles/2002/features/gsm/gsm211062007.htm, Jun. 11, 2007, 1 page.

Sensiper, S., "Electromagnetic wave propagation on helical conductors", Technical Report No. 194 (based on PhD thesis), Massachusetts Institute of Technology, May 16, 1951, 126 pages.

Soljacic et al., "Photonic-crystal slow-light enhancement of nonlinear phase sensitivity", J. Opt. Soc. Am B, vol. 19, No. 9, Sep. 2002, pp. 2052-2059.

Soljacic et al., "Wireless Energy Transfer Can Potentially Recharge Laptops, Cell Phones Without Cords", Nov. 14, 2006, 3 pages.

Soljacic, "Wireless Non-Radiative Energy Transfer", PowerPoint presentation, Massachusetts Institute of Technology, Oct. 6, 2005, 14 pages.

Soljacic, Marin, "Wireless nonradiative energy transfer", Visions of Discovery New Light on Physics, Cosmology, and Consciousness, Cambridge University Press, New York, 2011, pp. 530-542.

Someya, Takao, "The world's first sheet-type wireless power transmission system", Press Interview Handout, University of Tokyo, Dec. 12, 2006, 18 pages.

Staelin et al., Electromagnetic Waves, (Prentice Hall Upper Saddle River, New Jersey, 1998), Chapters 2, 3, 4, and 8, pp. 46-176 and 336-405.

Stark III, Joseph C., "Wireless Power Transmission Utilizing a Phased Array of Tesla Coils", Master Thesis, Massachusetts Institute of Technology, 2004, 247 pages.

Tesla, Nikola, "High Frequency Oscillators for Electro-Therapeutic and Other Purposes", Proceedings of the IEEE, vol. 87, No. 7, Jul. 1999, pp. 1282-1292.

Tesla, Nikola, "High Frequency Oscillators for Electro-Therapeutic and Other Purposes", The Electrical Engineer, vol. XXVI, No. 50, Nov. 17, 1898, 11 pages.

Texas Instruments, "HF Antenna Design Notes", Technical Application Report, Literature No. 11-08-26-003, Sep. 2003, 47 pages.

Thomsen et al., "Ultrahigh speed all-optical demultiplexing based on two-photon absorption in a laser diode", Electronics Letters, vol. 34, No. 19, Sep. 17, 1998, pp. 1871-1872.

U.S. Appl. No. 60/698,442, "Wireless Non-Radiative Energy Transfer", filed Jul. 12, 2005, 14 pages.

U.S. Appl. No. 60/908,666, "Wireless Energy Transfer", filed Mar. 28, 2007, 108 pages.

U.S. Appl. No. 60/908,383, "Wireless Energy Transfer", filed Mar. 27, 2007, 80 pages.

UPM Rafsec, "Tutorial overview of inductively coupled RFID Systems", http://www.rafsec.com/rfidsystems.pdf, May 2003, 7 pages.

Vandevoorde et al., "Wireless energy transfer for stand-alone systems: A comparison between low and high power applicability", Sensors and Actuators a 92, Jul. 17, 2001, pp. 305-311.

Vilkomerson et al., "Implantable Doppler System for Self-Monitoring Vascular Grafts", IEEE Ultrasonics Symposium, Aug. 23-27, 2004, pp. 461-465.

Yariv et al., "Coupled-resonator optical waveguide: a proposal and analysis", Optics Letters, vol. 24, No. 11, Jun. 1, 1999, pp. 711-713.

Zierhofer et al., "High-Efficiency Coupling-Insensitive Transcutaneous Power and Data Transmission Via an Inductive Link", IEEE Transactions on Biomedical Engineering, vol. 37, No. 7, Jul. 1990, pp. 716-722.

* cited by examiner

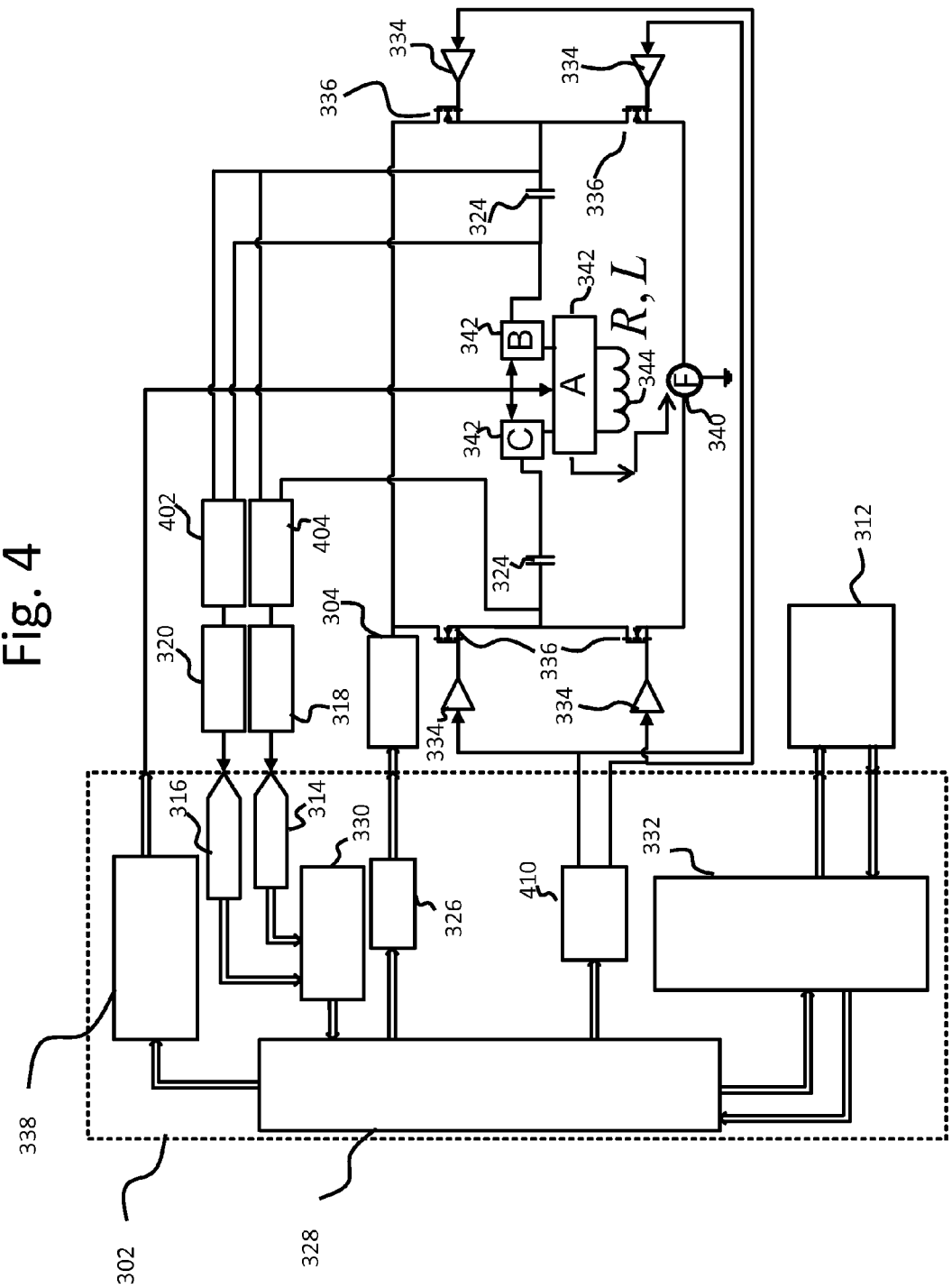

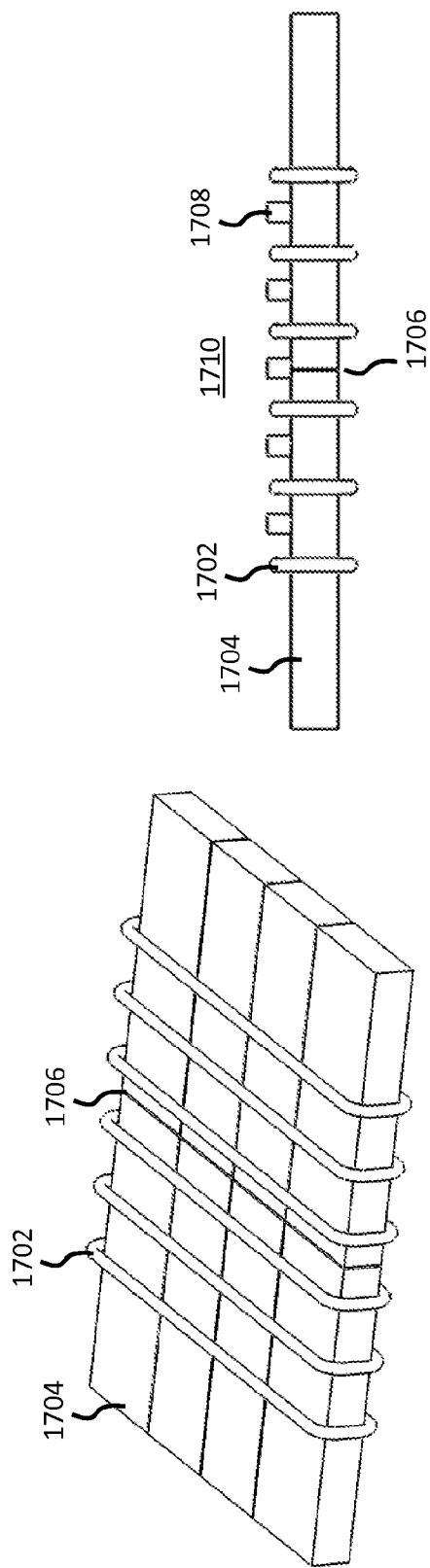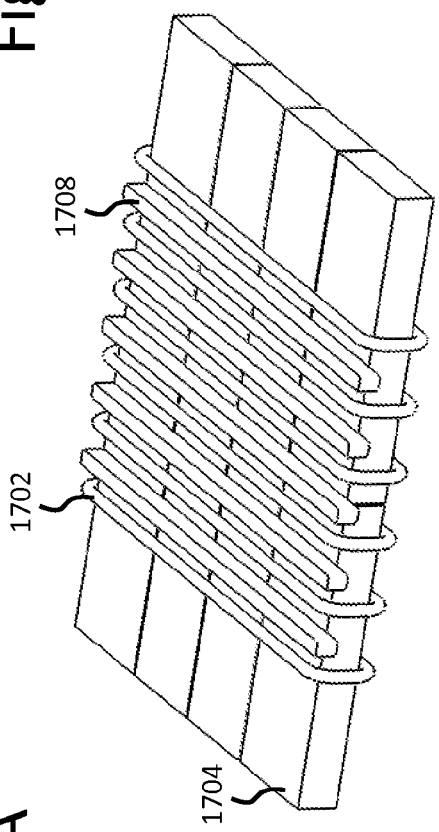
Fig. 17A
Fig. 17B
Fig. 17C

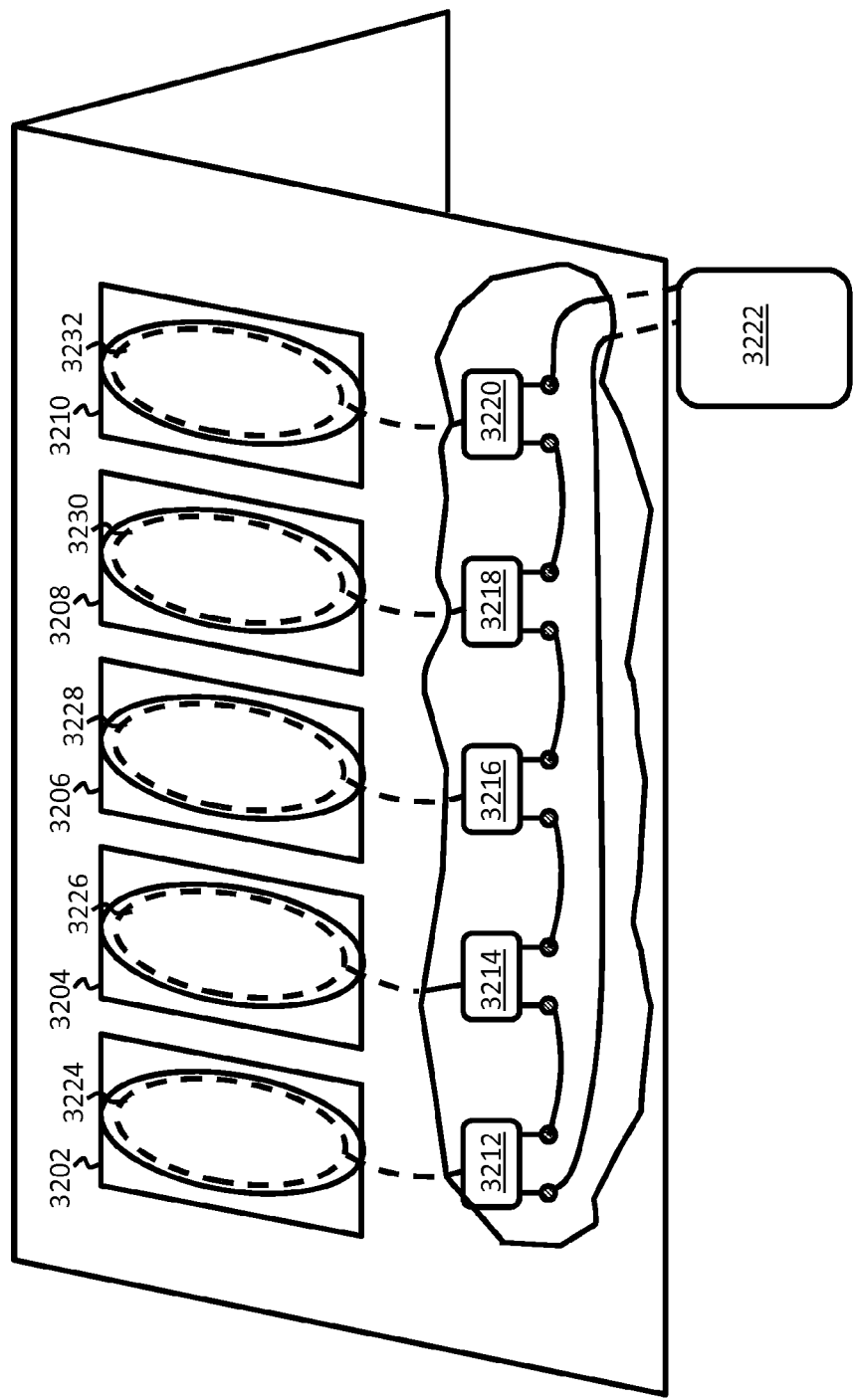

Fig. 58

WIRELESS ENERGY TRANSFER MODELING TOOL

CROSS-REFERENCE TO RELATED APPLICATIONS

This application claims the benefit of U.S. provisional patent application 61/555,941 filed Nov. 4, 2011.

Each of the foregoing applications is incorporated herein by reference in its entirety.

BACKGROUND

1. Field

This disclosure relates to wireless energy transfer, methods, systems and apparati to accomplish such transfer, and applications.

2. Description of the Related Art

Energy distribution over an area to moving devices or devices that may be often repositioned is unpractical with wired connections. Moving and changing devices create the possibility of wire tangles, tripping hazards, and the like. Wireless energy transfer over a larger area may be difficult when the area or region in which devices may be present may be large compared to the size of the device. Large mismatches in a source and device wireless energy capture modules may pose challenges in delivering enough energy to the devices at a high enough efficiency to make the implementations practical or may be difficult to deploy.

Therefore a need exists for methods and designs for energy distribution that is wire free but easy to deploy and configurable while may deliver sufficient power to be practical to power many household and industrial devices.

SUMMARY

Resonators and resonator assemblies may be positioned to distribute wireless energy over a larger area in packaging applications. The wireless energy transfer resonators and components that may be used have been described in, for example, in commonly owned U.S. patent application Ser. No. 12/789,611 published on Sep. 23, 2010 as U.S. Pat. Pub. No. 2010/0237709 and entitled "RESONATOR ARRAYS FOR WIRELESS ENERGY TRANSFER," and U.S. patent application Ser. No. 12/722,050 published on Jul. 22, 2010 as U.S. Pat. Pub. No. 2010/0181843 and entitled "WIRELESS ENERGY TRANSFER FOR REFRIGERATOR APPLICATION" the contents of which are incorporated in their entirety as if fully set forth herein.

In accordance with an exemplary and non-limiting embodiment, a method comprises defining and storing one or more attributes of a source resonator and a device resonator forming a system, defining and storing the interaction between the source resonator and the device resonator, modeling the electromagnetic performance of the system to derive one or more modeled values and utilizing the derived one or more modeled values to design an impedance matching network.

In accordance with another exemplary and non-limiting embodiment, a non-transitory computer-readable medium contains a set of instructions that causes a computer to enable the defining of one or more attributes of a source resonator and a device resonator forming a system, enable the defining of an interaction between the source resonator and the device resonator, model the electromagnetic performance of the system to derive one or more modeled values and utilize the derived one or more modeled values to design an impedance matching network.

Unless otherwise indicated, this disclosure uses the terms wireless energy transfer, wireless power transfer, wireless power transmission, and the like, interchangeably. Those skilled in the art will understand that a variety of system architectures may be supported by the wide range of wireless system designs and functionalities described in this application.

This disclosure references certain individual circuit components and elements such as capacitors, inductors, resistors, diodes, transformers, switches and the like; combinations of these elements as networks, topologies, circuits, and the like; and objects that have inherent characteristics such as "self-resonant" objects with capacitance or inductance distributed (or partially distributed, as opposed to solely lumped) throughout the entire object. It would be understood by one of ordinary skill in the art that adjusting and controlling variable components within a circuit or network may adjust the performance of that circuit or network and that those adjustments may be described generally as tuning, adjusting, matching, correcting, and the like. Other methods to tune or adjust the operating point of the wireless power transfer system may be used alone, or in addition to adjusting tunable components such as inductors and capacitors, or banks of inductors and capacitors. Those skilled in the art will recognize that a particular topology discussed in this disclosure can be implemented in a variety of other ways.

Unless otherwise defined, all technical and scientific terms used herein have the same meaning as commonly understood by one of ordinary skill in the art to which this disclosure belongs. In case of conflict with publications, patent applications, patents, and other references mentioned or incorporated herein by reference, the present specification, including definitions, will control.

Any of the features described above may be used, alone or in combination, without departing from the scope of this disclosure. Other features, objects, and advantages of the systems and methods disclosed herein will be apparent from the following detailed description and figures.

BRIEF DESCRIPTION OF FIGURES

FIG. 4 is a block diagram of a wireless source with a differential amplifier.

FIG. 17A is a resonator with a block of magnetic material comprising smaller individual tiles and 17B and 17C is the resonator with additional strips of thermally conductive material used for thermal management.

FIG. 32 is a diagram showing multiple outputs of panels combined together.

FIG. 58 is an illustration of a user interface according to an exemplary and non-limiting embodiment.

DETAILED DESCRIPTION

Figure 1:
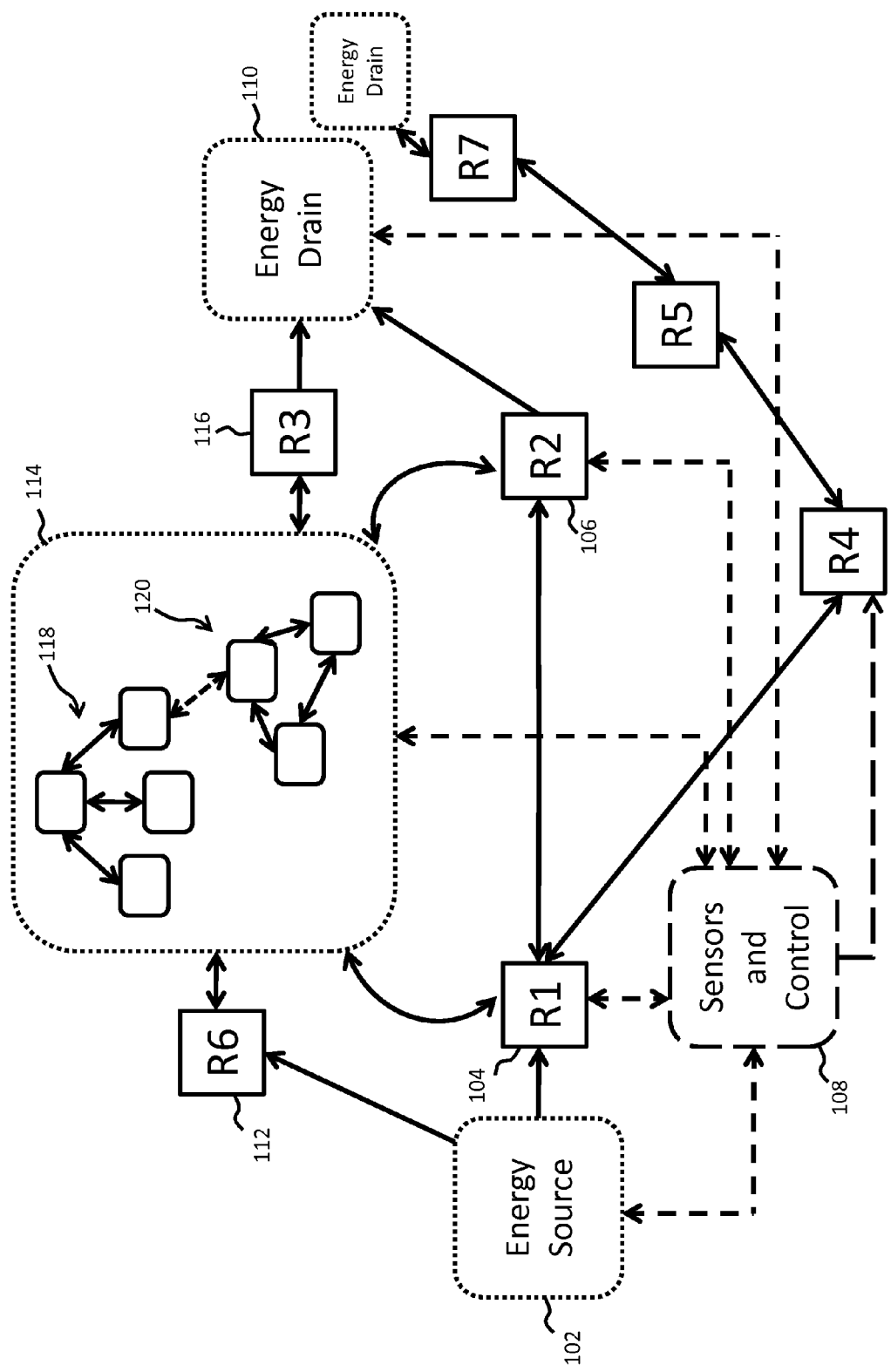
FIG. 1 is a system block diagram of wireless energy transfer configurations.

As described above, this disclosure relates to wireless energy transfer using coupled electromagnetic resonators. However, such energy transfer is not restricted to electromagnetic resonators, and the wireless energy transfer systems described herein are more general and may be implemented using a wide variety of resonators and resonant objects.

As those skilled in the art will recognize, important considerations for resonator-based power transfer include resonator efficiency and resonator coupling. Extensive discussion of such issues, e.g., coupled mode theory (CMT), coupling coefficients and factors, quality factors (also referred to as Q-factors), and impedance matching is provided, for example, in U.S. patent application Ser. No. 12/789,611 published on Sep. 23, 2010 as US 20100237709 and entitled "RESONATOR ARRAYS FOR WIRELESS ENERGY TRANSFER," and U.S. patent application Ser. No. 12/722,050 published on Jul. 22, 2010 as US 20100181843 and entitled "WIRELESS ENERGY TRANSFER FOR REFRIGERATOR APPLICATION" and incorporated herein by reference in its entirety as if fully set forth herein.

A resonator may be defined as a resonant structure that can store energy in at least two different forms, and where the stored energy oscillates between the two forms. The resonant structure will have a specific oscillation mode with a resonant (modal) frequency, f, and a resonant (modal) field. The angular resonant frequency, $\omega$, may be defined as $\omega=2\pi f$, the resonant period, T, may be defined as $T=1/f=2\pi/\alpha$, and the resonant wavelength, $\lambda$, may be defined as $\lambda=c/f$, where c is the speed of the associated field waves (light, for electromagnetic resonators). In the absence of loss mechanisms, coupling mechanisms or external energy supplying or draining mechanisms, the total amount of energy stored by the resonator, W, would stay fixed, but the form of the energy would oscillate between the two forms supported by the resonator, wherein one form would be maximum when the other is minimum and vice versa.

For example, a resonator may be constructed such that the two forms of stored energy are magnetic energy and electric energy. Further, the resonator may be constructed such that the electric energy stored by the electric field is primarily confined within the structure while the magnetic energy stored by the magnetic field is primarily in the region surrounding the resonator. In other words, the total electric and magnetic energies would be equal, but their localization would be different. Using such structures, energy exchange between at least two structures may be mediated by the resonant magnetic near-field of the at least two resonators. These types of resonators may be referred to as magnetic resonators.

An important parameter of resonators used in wireless power transmission systems is the Quality Factor, or Q-factor, or Q, of the resonator, which characterizes the energy decay and is inversely proportional to energy losses of the resonator. It may be defined as $Q=\omega*W/P$, where P is the time-averaged power lost at steady state. That is, a resonator with a high-Q has relatively low intrinsic losses and can store energy for a relatively long time. Since the resonator loses energy at its intrinsic decay rate, $2\Gamma$, its Q, also referred to as its intrinsic Q, is given by $Q=\omega/2\Gamma$. The quality factor also represents the number of oscillation periods, T, it takes for the energy in the resonator to decay by a factor of $e^{-2\pi}$. Note that the quality factor or intrinsic quality factor or Q of the resonator is that due only to intrinsic loss mechanisms. The Q of a resonator connected to, or coupled to a power generator, g, or load, l, may be called the "loaded quality factor" or the "loaded Q". The Q of a resonator in the presence of an extraneous object that is not intended to be part of the energy transfer system may be called the "perturbed quality factor" or the "perturbed Q".

Resonators, coupled through any portion of their near-fields may interact and exchange energy. The efficiency of this energy transfer can be significantly enhanced if the resonators operate at substantially the same resonant frequency. By way of example, but not limitation, imagine a source resonator with $Q_s$ and a device resonator with $Q_d$. High-Q wireless energy transfer systems may utilize resonators that are high-Q. The Q of each resonator may be high. The geometric mean of the resonator Q's, $\sqrt{Q_s Q_d}$ may also or instead be high.

The coupling factor, k, is a number between $0 \leq |k| \leq 1$, and it may be independent (or nearly independent) of the resonant frequencies of the source and device resonators, when those are placed at sub-wavelength distances. Rather the coupling factor k may be determined mostly by the relative geometry and the distance between the source and device resonators where the physical decay-law of the field mediating their coupling is taken into account. The coupling coefficient used in CMT, $\kappa = k\sqrt{\omega_s \omega_d}/2$, may be a strong function of the resonant frequencies, as well as other properties of the resonator structures. In applications for wireless energy transfer utilizing the near-fields of the resonators, it is desirable to have the size of the resonator be much smaller than the resonant wavelength, so that power lost by radiation is reduced. In some embodiments, high-Q resonators are sub-wavelength structures. In some electromagnetic embodiments, high-Q resonator structures are designed to have resonant frequencies higher than 100 kHz. In other embodiments, the resonant frequencies may be less than 1 GHz.

In exemplary embodiments, the power radiated into the far-field by these sub wavelength resonators may be further reduced by lowering the resonant frequency of the resonators and the operating frequency of the system. In other embodiments, the far field radiation may be reduced by arranging for the far fields of two or more resonators to interfere destructively in the far field.

In a wireless energy transfer system a resonator may be used as a wireless energy source, a wireless energy capture device, a repeater or a combination thereof. In embodiments a resonator may alternate between transferring energy, receiving energy or relaying energy. In a wireless energy transfer system one or more magnetic resonators may be coupled to an energy source and be energized to produce an oscillating magnetic near-field. Other resonators that are within the oscillating magnetic near-fields may capture these fields and convert the energy into electrical energy that may be used to power or charge a load thereby enabling wireless transfer of useful energy.

The so-called "useful" energy in a useful energy exchange is the energy or power that must be delivered to a device in order to power or charge it at an acceptable rate. The transfer efficiency that corresponds to a useful energy exchange may be system or application-dependent. For example, high power vehicle charging applications that transfer kilowatts of power may need to be at least 80% efficient in order to supply useful amounts of power resulting in a useful energy exchange sufficient to recharge a vehicle battery without significantly heating up various components of the transfer system. In some consumer electronics applications, a useful energy exchange may include any energy transfer efficiencies greater than 10%, or any other amount acceptable to keep rechargeable batteries "topped off" and running for long periods of time. In implanted medical device applications, a useful energy exchange may be any exchange that does not harm the patient but that extends the life of a battery or wakes up a sensor or monitor or stimulator. In such applications, 100 mW of power or less may be useful. In distributed sensing applications, power transfer of microwatts may be useful, and transfer efficiencies may be well below 1%.

A useful energy exchange for wireless energy transfer in a powering or recharging application may be efficient, highly efficient, or efficient enough, as long as the wasted energy levels, heat dissipation, and associated field strengths are within tolerable limits and are balanced appropriately with related factors such as cost, weight, size, and the like.

The resonators may be referred to as source resonators, device resonators, first resonators, second resonators, repeater resonators, and the like. Implementations may include three (3) or more resonators. For example, a single source resonator may transfer energy to multiple device resonators or multiple devices. Energy may be transferred from a first device to a second, and then from the second device to the third, and so forth. Multiple sources may transfer energy to a single device or to multiple devices connected to a single device resonator or to multiple devices connected to multiple device resonators. Resonators may serve alternately or simultaneously as sources, devices, and/or they may be used to relay power from a source in one location to a device in another location. Intermediate electromagnetic resonators may be used to extend the distance range of wireless energy transfer systems and/or to generate areas of concentrated magnetic near-fields. Multiple resonators may be daisy-chained together, exchanging energy over extended distances and with a wide range of sources and devices. For example, a source resonator may transfer power to a device resonator via several repeater resonators. Energy from a source may be transferred to a first repeater resonator, the first repeater resonator may transfer the power to a second repeater resonator and the second to a third and so on until the final repeater resonator transfers its energy to a device resonator. In this respect the range or distance of wireless energy transfer may be extended and/or tailored by adding repeater resonators. High power levels may be split between multiple sources, transferred to multiple devices and recombined at a distant location.

The resonators may be designed using coupled mode theory models, circuit models, electromagnetic field models, and the like. The resonators may be designed to have tunable characteristic sizes. The resonators may be designed to handle different power levels. In exemplary embodiments, high power resonators may require larger conductors and higher current or voltage rated components than lower power resonators.

FIG. 1 shows a diagram of exemplary configurations and arrangements of a wireless energy transfer system. A wireless energy transfer system may include at least one source resonator (R1) 104 (optionally R6, 112) coupled to an energy source 102 and optionally a sensor and control unit 108. The energy source may be a source of any type of energy capable of being converted into electrical energy that may be used to drive the source resonator 104. The energy source may be a battery, a solar panel, the electrical mains, a wind or water turbine, an electromagnetic resonator, a generator, and the like. The electrical energy used to drive the magnetic resonator is converted into oscillating magnetic fields by the resonator. The oscillating magnetic fields may be captured by other resonators which may be device resonators (R2) 106, (R3) 116 that are optionally coupled to an energy drain 110. The oscillating fields may be optionally coupled to repeater resonators (R4, R5) that are configured to extend or tailor the wireless energy transfer region. Device resonators may capture the magnetic fields in the vicinity of source resonator(s), repeater resonators and other device resonators and convert them into electrical energy that may be used by an energy drain. The energy drain 110 may be an electrical, electronic, mechanical or chemical device and the like configured to receive electrical energy. Repeater resonators may capture magnetic fields in the vicinity of source, device and repeater resonator(s) and may pass the energy on to other resonators.

A wireless energy transfer system may comprise a single source resonator 104 coupled to an energy source 102 and a single device resonator 106 coupled to an energy drain 110. In embodiments a wireless energy transfer system may comprise multiple source resonators coupled to one or more energy sources and may comprise multiple device resonators coupled to one or more energy drains.

In embodiments the energy may be transferred directly between a source resonator 104 and a device resonator 106. In other embodiments the energy may be transferred from one or more source resonators 104, 112 to one or more device resonators 106, 116 via any number of intermediate resonators which may be device resonators, source resonators, repeater resonators, and the like. Energy may be transferred via a network or arrangement of resonators 114 that may include subnetworks 118, 120 arranged in any combination of topologies such as token ring, mesh, ad hoc, and the like.

In embodiments the wireless energy transfer system may comprise a centralized sensing and control system 108. In embodiments parameters of the resonators, energy sources, energy drains, network topologies, operating parameters, etc. may be monitored and adjusted from a control processor to meet specific operating parameters of the system. A central control processor may adjust parameters of individual components of the system to optimize global energy transfer efficiency, to optimize the amount of power transferred, and the like. Other embodiments may be designed to have a substantially distributed sensing and control system. Sensing and control may be incorporated into each resonator or group of resonators, energy sources, energy drains, and the like and may be configured to adjust the parameters of the individual components in the group to maximize the power delivered, to maximize energy transfer efficiency in that group and the like.

In embodiments, components of the wireless energy transfer system may have wireless or wired data communication links to other components such as devices, sources, repeaters, power sources, resonators, and the like and may transmit or receive data that can be used to enable the distributed or centralized sensing and control. A wireless communication channel may be separate from the wireless energy transfer channel, or it may be the same. In one embodiment the resonators used for power exchange may also be used to exchange information. In some cases, information may be exchanged by modulating a component in a source or device circuit and sensing that change with port parameter or other monitoring equipment. Resonators may signal each other by tuning, changing, varying, dithering, and the like, the resonator parameters such as the impedance of the resonators which may affect the reflected impedance of other resonators in the system. The systems and methods described herein may enable the simultaneous transmission of power and communication signals between resonators in wireless power transmission systems, or it may enable the transmission of power and communication signals during different time periods or at different frequencies using the same magnetic fields that are used during the wireless energy transfer. In other embodiments wireless communication may be enabled with a separate wireless communication channel such as WiFi, Bluetooth, Infrared, and the like.

In embodiments, a wireless energy transfer system may include multiple resonators and overall system performance may be improved by control of various elements in the system. For example, devices with lower power requirements may tune their resonant frequency away from the resonant frequency of a high-power source that supplies power to devices with higher power requirements. In this way, low and high power devices may safely operate or charge from a single high power source. In addition, multiple devices in a charging zone may find the power available to them regulated according to any of a variety of consumption control algorithms such as First-Come-First-Serve, Best Effort, Guaranteed Power, etc. The power consumption algorithms may be hierarchical in nature, giving priority to certain users or types of devices, or it may support any number of users by equally sharing the power that is available in the source. Power may be shared by any of the multiplexing techniques described in this disclosure.

Figure 2:
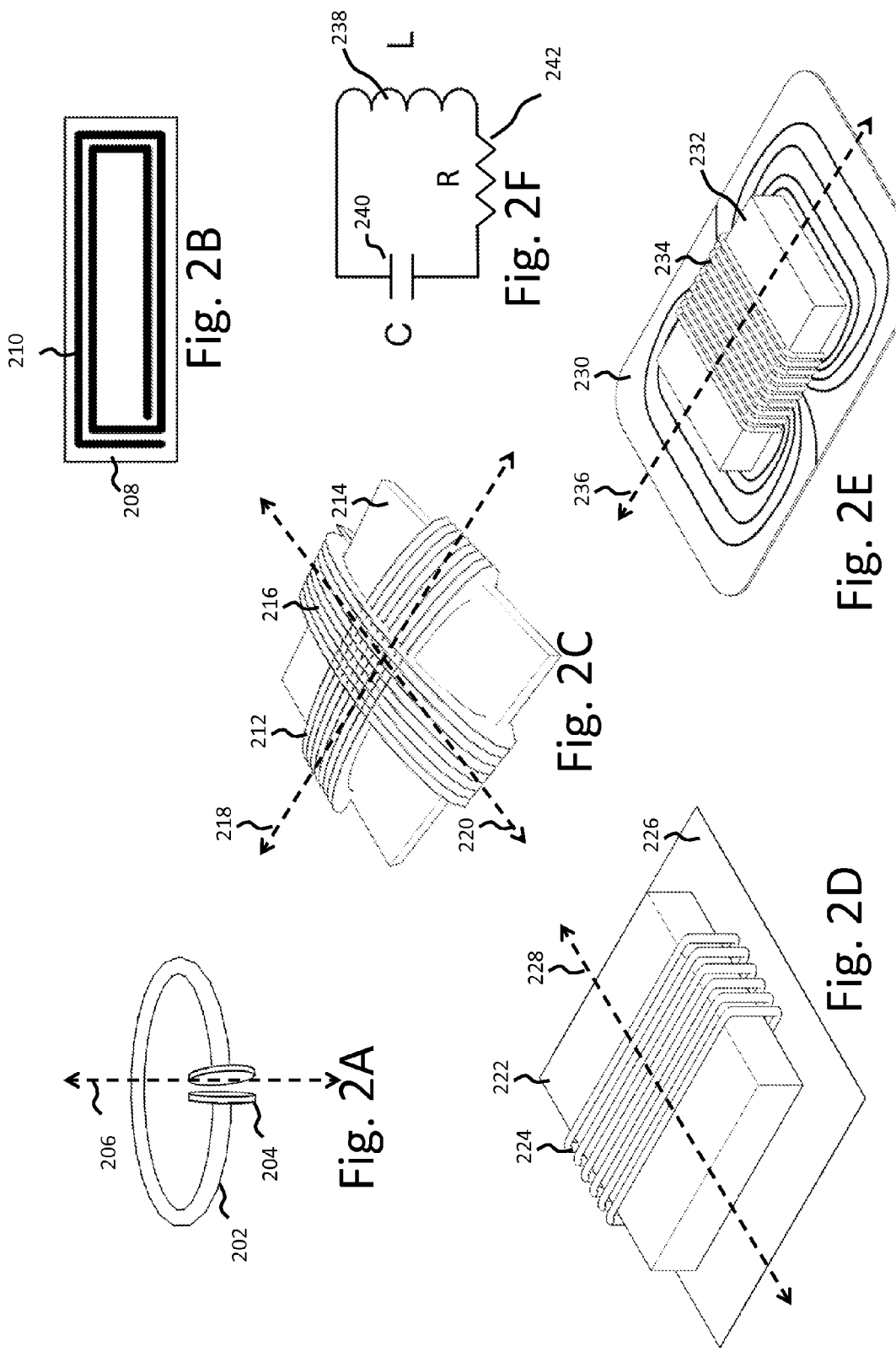
FIGS. 2A-2F are exemplary structures and schematics of simple resonator structures.

In embodiments electromagnetic resonators may be realized or implemented using a combination of shapes, structures, and configurations. Electromagnetic resonators may include an inductive element, a distributed inductance, or a combination of inductances with a total inductance, L, and a capacitive element, a distributed capacitance, or a combination of capacitances, with a total capacitance, C. A minimal circuit model of an electromagnetic resonator comprising capacitance, inductance and resistance, is shown in FIG. 2F. The resonator may include an inductive element 238 and a capacitive element 240. Provided with initial energy, such as electric field energy stored in the capacitor 240, the system will oscillate as the capacitor discharges transferring energy into magnetic field energy stored in the inductor 238 which in turn transfers energy back into electric field energy stored in the capacitor 240. Intrinsic losses in these electromagnetic resonators include losses due to resistance in the inductive and capacitive elements and to radiation losses, and are represented by the resistor, R, 242 in FIG. 2F.

FIG. 2A shows a simplified drawing of an exemplary magnetic resonator structure. The magnetic resonator may include a loop of conductor acting as an inductive element 202 and a capacitive element 204 at the ends of the conductor loop. The inductor 202 and capacitor 204 of an electromagnetic resonator may be bulk circuit elements, or the inductance and capacitance may be distributed and may result from the way the conductors are formed, shaped, or positioned, in the structure.

For example, the inductor 202 may be realized by shaping a conductor to enclose a surface area, as shown in FIG. 2A. This type of resonator may be referred to as a capacitively-loaded loop inductor. Note that we may use the terms "loop" or "coil" to indicate generally a conducting structure (wire, tube, strip, etc.), enclosing a surface of any shape and dimension, with any number of turns. In FIG. 2A, the enclosed surface area is circular, but the surface may be any of a wide variety of other shapes and sizes and may be designed to achieve certain system performance specifications. In embodiments the inductance may be realized using inductor elements, distributed inductance, networks, arrays, series and parallel combinations of inductors and inductances, and the like. The inductance may be fixed or variable and may be used to vary impedance matching as well as resonant frequency operating conditions.

There are a variety of ways to realize the capacitance required to achieve the desired resonant frequency for a resonator structure. Capacitor plates 204 may be formed and utilized as shown in FIG. 2A, or the capacitance may be distributed and be realized between adjacent windings of a multi-loop conductor. The capacitance may be realized using capacitor elements, distributed capacitance, networks, arrays, series and parallel combinations of capacitances, and the like. The capacitance may be fixed or variable and may be used to vary impedance matching as well as resonant frequency operating conditions.

The inductive elements used in magnetic resonators may contain more than one loop and may spiral inward or outward or up or down or in some combination of directions. In general, the magnetic resonators may have a variety of shapes, sizes and number of turns and they may be composed of a variety of conducting materials. The conductor 210, for example, may be a wire, a Litz wire, a ribbon, a pipe, a trace formed from conducting ink, paint, gels, and the like or from single or multiple traces printed on a circuit board. An exemplary embodiment of a trace pattern on a substrate 208 forming inductive loops is depicted in FIG. 2B.

In embodiments the inductive elements may be formed using magnetic materials of any size, shape thickness, and the like, and of materials with a wide range of permeability and loss values. These magnetic materials may be solid blocks, they may enclose hollow volumes, they may be formed from many smaller pieces of magnetic material tiled and or stacked together, and they may be integrated with conducting sheets or enclosures made from highly conducting materials. Conductors may be wrapped around the magnetic materials to generate the magnetic field. These conductors may be wrapped around one or more than one axis of the structure. Multiple conductors may be wrapped around the magnetic materials and combined in parallel, or in series, or via a switch to form customized near-field patterns and/or to orient the dipole moment of the structure. Examples of resonators comprising magnetic material are depicted in FIGS. 2C, 2D, 2E. In FIG. 2D the resonator comprises loops of conductor 224 wrapped around a core of magnetic material 222 creating a structure that has a magnetic dipole moment 228 that is parallel to the axis of the loops of the conductor 224. The resonator may comprise multiple loops of conductor 216, 212 wrapped in orthogonal directions around the magnetic material 214 forming a resonator with a magnetic dipole moment 218, 220 that may be oriented in more than one direction as depicted in FIG. 2C, depending on how the conductors are driven.

An electromagnetic resonator may have a characteristic, natural, or resonant frequency determined by its physical properties. This resonant frequency is the frequency at which the energy stored by the resonator oscillates between that stored by the electric field, $W_E$, ($W_E=q^2/2C$, where q is the charge on the capacitor, C) and that stored by the magnetic field, $W_B$, ($W_B=Li^2/2$, where i is the current through the inductor, L) of the resonator. The frequency at which this energy is exchanged may be called the characteristic frequency, the natural frequency, or the resonant frequency of the resonator, and is given by $\omega$, $$\omega = 2\pi f = \sqrt{\sqrt{\frac{1}{LC}}}.$$

The resonant frequency of the resonator may be changed by tuning the inductance, L, and/or the capacitance, C, of the resonator. In one embodiment system parameters are dynamically adjustable or tunable to achieve as close as possible to optimal operating conditions. However, based on the discussion above, efficient enough energy exchange may be realized even if some system parameters are not variable or components are not capable of dynamic adjustment.

In embodiments a resonator may comprise an inductive element coupled to more than one capacitor arranged in a network of capacitors and circuit elements. In embodiments the coupled network of capacitors and circuit elements may be used to define more than one resonant frequency of the resonator. In embodiments a resonator may be resonant, or partially resonant, at more than one frequency.

In embodiments, a wireless power source may comprise of at least one resonator coil coupled to a power supply, which may be a switching amplifier, such as a class-D amplifier or a class-E amplifier or a combination thereof. In this case, the resonator coil is effectively a power load to the power supply. In embodiments, a wireless power device may comprise of at least one resonator coil coupled to a power load, which may be a switching rectifier, such as a class-D rectifier or a class-E rectifier or a combination thereof. In this case, the resonator coil is effectively a power supply for the power load, and the impedance of the load directly relates also to the work-drainage rate of the load from the resonator coil. The efficiency of power transmission between a power supply and a power load may be impacted by how closely matched the output impedance of the power source is to the input impedance of the load. Power may be delivered to the load at a maximum possible efficiency, when the input impedance of the load is equal to the complex conjugate of the internal impedance of the power supply. Designing the power supply or power load impedance to obtain a maximum power transmission efficiency is often called "impedance matching", and may also referred to as optimizing the ratio of useful-to-lost powers in the system. Impedance matching may be performed by adding networks or sets of elements such as capacitors, inductors, transformers, switches, resistors, and the like, to form impedance matching networks between a power supply and a power load. In embodiments, mechanical adjustments and changes in element positioning may be used to achieve impedance matching. For varying loads, the impedance matching network may include variable components that are dynamically adjusted to ensure that the impedance at the power supply terminals looking towards the load and the characteristic impedance of the power supply remain substantially complex conjugates of each other, even in dynamic environments and operating scenarios.

In embodiments, impedance matching may be accomplished by tuning the duty cycle, and/or the phase, and/or the frequency of the driving signal of the power supply or by tuning a physical component within the power supply, such as a capacitor. Such a tuning mechanism may be advantageous because it may allow impedance matching between a power supply and a load without the use of a tunable impedance matching network, or with a simplified tunable impedance matching network, such as one that has fewer tunable components for example. In embodiments, tuning the duty cycle, and/or frequency, and/or phase of the driving signal to a power supply may yield a dynamic impedance matching system with an extended tuning range or precision, with higher power, voltage and/or current capabilities, with faster electronic control, with fewer external components, and the like.

In some wireless energy transfer systems the parameters of the resonator such as the inductance may be affected by environmental conditions such as surrounding objects, temperature, orientation, number and position of other resonators and the like. Changes in operating parameters of the resonators may change certain system parameters, such as the efficiency of transferred power in the wireless energy transfer. For example, high-conductivity materials located near a resonator may shift the resonant frequency of a resonator and detune it from other resonant objects. In some embodiments, a resonator feedback mechanism is employed that corrects its frequency by changing a reactive element (e.g., an inductive element or capacitive element). In order to achieve acceptable matching conditions, at least some of the system parameters may need to be dynamically adjustable or tunable. All the system parameters may be dynamically adjustable or tunable to achieve approximately the optimal operating conditions. However, efficient enough energy exchange may be realized even if all or some system parameters are not variable. In some examples, at least some of the devices may not be dynamically adjusted. In some examples, at least some of the sources may not be dynamically adjusted. In some examples, at least some of the intermediate resonators may not be dynamically adjusted. In some examples, none of the system parameters may be dynamically adjusted.

In some embodiments changes in parameters of components may be mitigated by selecting components with characteristics that change in a complimentary or opposite way or direction when subjected to differences in operating environment or operating point. In embodiments, a system may be designed with components, such as capacitors, that have an opposite dependence or parameter fluctuation due to temperature, power levels, frequency, and the like. In some embodiments, the component values as a function of temperature may be stored in a look-up table in a system microcontroller and the reading from a temperature sensor may be used in the system control feedback loop to adjust other parameters to compensate for the temperature induced component value changes.

In some embodiments the changes in parameter values of components may be compensated with active tuning circuits comprising tunable components. Circuits that monitor the operating environment and operating point of components and system may be integrated in the design. The monitoring circuits may provide the signals necessary to actively compensate for changes in parameters of components. For example, a temperature reading may be used to calculate expected changes in, or to indicate previously measured values of, capacitance of the system allowing compensation by switching in other capacitors or tuning capacitors to maintain the desired capacitance over a range of temperatures. In embodiments, the RF amplifier switching waveforms may be adjusted to compensate for component value or load changes in the system. In some embodiments the changes in parameters of components may be compensated with active cooling, heating, active environment conditioning, and the like.

The parameter measurement circuitry may measure or monitor certain power, voltage, and current, signals in the system, and processors or control circuits may adjust certain settings or operating parameters based on those measurements. In addition the magnitude and phase of voltage and current signals, and the magnitude of the power signals, throughout the system may be accessed to measure or monitor the system performance. The measured signals referred to throughout this disclosure may be any combination of port parameter signals, as well as voltage signals, current signals, power signals, temperatures signals and the like. These parameters may be measured using analog or digital techniques, they may be sampled and processed, and they may be digitized or converted using a number of known analog and digital processing techniques. In embodiments, preset values of certain measured quantities are loaded in a system controller or memory location and used in various feedback and control loops. In embodiments, any combination of measured, monitored, and/or preset signals may be used in feedback circuits or systems to control the operation of the resonators and/or the system.

Adjustment algorithms may be used to adjust the frequency, Q, and/or impedance of the magnetic resonators. The algorithms may take as inputs reference signals related to the degree of deviation from a desired operating point for the system and may output correction or control signals related to that deviation that control variable or tunable elements of the system to bring the system back towards the desired operating point or points. The reference signals for the magnetic resonators may be acquired while the resonators are exchanging power in a wireless power transmission system, or they may be switched out of the circuit during system operation. Corrections to the system may be applied or performed continuously, periodically, upon a threshold crossing, digitally, using analog methods, and the like.

In embodiments, lossy extraneous materials and objects may introduce potential reductions in efficiencies by absorbing the magnetic and/or electric energy of the resonators of the wireless power transmission system. Those impacts may be mitigated in various embodiments by positioning resonators to minimize the effects of the lossy extraneous materials and objects and by placing structural field shaping elements (e.g., conductive structures, plates and sheets, magnetic material structures, plates and sheets, and combinations thereof) to minimize their effect.

One way to reduce the impact of lossy materials on a resonator is to use high-conductivity materials, magnetic materials, or combinations thereof to shape the resonator fields such that they avoid the lossy objects. In an exemplary embodiment, a layered structure of high-conductivity material and magnetic material may tailor, shape, direct, reorient, etc. the resonator's electromagnetic fields so that they avoid lossy objects in their vicinity by deflecting the fields. FIG. 2D shows a top view of a resonator with a sheet of conductor 226 below the magnetic material that may used to tailor the fields of the resonator so that they avoid lossy objects that may be below the sheet of conductor 226. The layer or sheet of good 226 conductor may comprise any high conductivity materials such as copper, silver, aluminum, as may be most appropriate for a given application. In certain embodiments, the layer or sheet of good conductor is thicker than the skin depth of the conductor at the resonator operating frequency. The conductor sheet may be preferably larger than the size of the resonator, extending beyond the physical extent of the resonator.

In environments and systems where the amount of power being transmitted could present a safety hazard to a person or animal that may intrude into the active field volume, safety measures may be included in the system. In embodiments where power levels require particularized safety measures, the packaging, structure, materials, and the like of the resonators may be designed to provide a spacing or "keep away" zone from the conducting loops in the magnetic resonator. To provide further protection, high-Q resonators and power and control circuitry may be located in enclosures that confine high voltages or currents to within the enclosure, that protect the resonators and electrical components from weather, moisture, sand, dust, and other external elements, as well as from impacts, vibrations, scrapes, explosions, and other types of mechanical shock. Such enclosures call for attention to various factors such as thermal dissipation to maintain an acceptable operating temperature range for the electrical components and the resonator. In embodiments, enclosure may be constructed of non-lossy materials such as composites, plastics, wood, concrete, and the like and may be used to provide a minimum distance from lossy objects to the resonator components. A minimum separation distance from lossy objects or environments which may include metal objects, salt water, oil and the like, may improve the efficiency of wireless energy transfer. In embodiments, a "keep away" zone may be used to increase the perturbed Q of a resonator or system of resonators. In embodiments a minimum separation distance may provide for a more reliable or more constant operating parameters of the resonators.

In embodiments, resonators and their respective sensor and control circuitry may have various levels of integration with other electronic and control systems and subsystems. In some embodiments the power and control circuitry and the device resonators are completely separate modules or enclosures with minimal integration to existing systems, providing a power output and a control and diagnostics interface. In some embodiments a device is configured to house a resonator and circuit assembly in a cavity inside the enclosure, or integrated into the housing or enclosure of the device.

Example Resonator Circuitry

Figure 3:
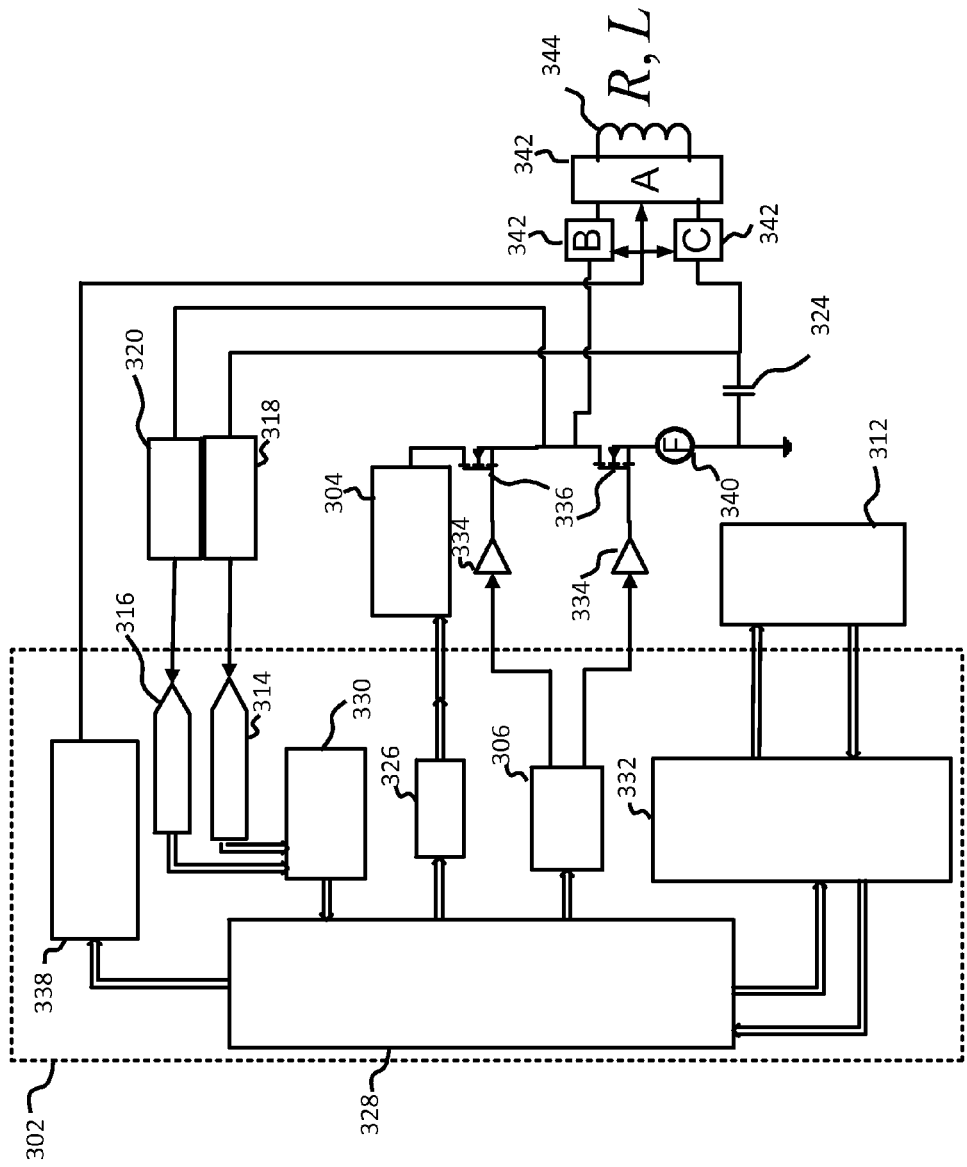
FIG. 3 is a block diagram of a wireless source with a single-ended amplifier.

FIGS. 3 and 4 show high level block diagrams depicting power generation, monitoring, and control components for exemplary sources of a wireless energy transfer system. FIG. 3 is a block diagram of a source comprising a half-bridge switching power amplifier and some of the associated measurement, tuning, and control circuitry. FIG. 4 is a block diagram of a source comprising a full-bridge switching amplifier and some of the associated measurement, tuning, and control circuitry.

The half bridge system topology depicted in FIG. 3 may comprise a processing unit that executes a control algorithm 328. The processing unit executing a control algorithm 328 may be a microcontroller, an application specific circuit, a field programmable gate array, a processor, a digital signal processor, and the like. The processing unit may be a single device or it may be a network of devices. The control algorithm may run on any portion of the processing unit. The algorithm may be customized for certain applications and may comprise a combination of analog and digital circuits and signals. The master algorithm may measure and adjust voltage signals and levels, current signals and levels, signal phases, digital count settings, and the like.

The system may comprise an optional source/device and/or source/other resonator communication controller 332 coupled to wireless communication circuitry 312. The optional source/device and/or source/other resonator communication controller 332 may be part of the same processing unit that executes the master control algorithm, it may a part or a circuit within a microcontroller 302, it may be external to the wireless power transmission modules, it may be substantially similar to communication controllers used in wire powered or battery powered applications but adapted to include some new or different functionality to enhance or support wireless power transmission.

The system may comprise a PWM generator 306 coupled to at least two transistor gate drivers 334 and may be controlled by the control algorithm. The two transistor gate drivers 334 may be coupled directly or via gate drive transformers to two power transistors 336 that drive the source resonator coil 344 through impedance matching network components 342. The power transistors 336 may be coupled and powered with an adjustable DC supply 304 and the adjustable DC supply 304 may be controlled by a variable bus voltage, Vbus. The Vbus controller may be controlled by the control algorithm 328 and may be part of, or integrated into, a microcontroller 302 or other integrated circuits. The Vbus controller 326 may control the voltage output of an adjustable DC supply 304 which may be used to control power output of the amplifier and power delivered to the resonator coil 344. In other embodiments, the PWM generator 306 may control the phase angle between the current waveform through the load and the switching times of the power transistors 336 which may be used to control power output from the amplifier and power delivered to the resonator coil 344. In other embodiments, the PWM generator 306 may control the duty cycle of the switch closure time to control power output from that amplifier and power delivered to the resonator coil 344.

The system may comprise sensing and measurement circuitry including signal filtering and buffering circuits 318, 320 that may shape, modify, filter, process, buffer, and the like, signals prior to their input to processors and/or converters such as analog to digital converters (ADC) 314, 316, for example. The processors and converters such as ADCs 314, 316 may be integrated into a microcontroller 302 or may be separate circuits that may be coupled to a processing core 330. Based on measured signals, the control algorithm 328 may generate, limit, initiate, extinguish, control, adjust, or modify the operation of any of the PWM generator 306, the communication controller 332, the Vbus control 326, the source impedance matching controller 338, the filter/buffering elements, 318, 320, the converters, 314, 316, the resonator coil 344, and may be part of, or integrated into, a microcontroller 302 or a separate circuit. The impedance matching networks 342 and resonator coils 344 may include electrically controllable, variable, or tunable components such as capacitors, switches, inductors, and the like, as described herein, and these components may have their component values or operating points adjusted according to signals received from the source impedance matching controller 338. Components may be tuned to adjust the operation and characteristics of the resonator including the power delivered to and by the resonator, the resonant frequency of the resonator, the impedance of the resonator, the Q of the resonator, and any other coupled systems, and the like. The resonator may be any type or structure resonator described herein including a capacitively loaded loop resonator, a planer resonator comprising a magnetic material or any combination thereof.

The full bridge system topology depicted in FIG. 4 may comprise a processing unit that executes a master control algorithm 328. The processing unit executing the control algorithm 328 may be a microcontroller, an application specific circuit, a field programmable gate array, a processor, a digital signal processor, and the like. The system may comprise a source/device and/or source/other resonator communication controller 332 coupled to wireless communication circuitry 312. The source/device and/or source/other resonator communication controller 332 may be part of the same processing unit that executes that master control algorithm, it may a part or a circuit within a microcontroller 302, it may be external to the wireless power transmission modules, it may be substantially similar to communication controllers used in wire powered or battery powered applications but adapted to include some new or different functionality to enhance or support wireless power transmission.

The system may comprise a PWM generator 410 with at least two outputs coupled to at least four transistor gate drivers 334 that may be controlled by signals generated in a master control algorithm. The four transistor gate drivers 334 may be coupled to four power transistors 336 directly or via gate drive transformers that may drive the source resonator coil 344 through impedance matching networks 342. The power transistors 336 may be coupled and powered with an adjustable DC supply 304 and the adjustable DC supply 304 may be controlled by a Vbus controller 326 which may be controlled by a master control algorithm. The Vbus controller 326 may control the voltage output of the adjustable DC supply 304 which may be used to control power output of the amplifier and power delivered to the resonator coil 344. In other embodiments, the PWM generator 410 may control the relative phase angle for the two halves of the bridge between the current waveform through the load and the switching times of the power transistors 336 which may be used to control power output from the amplifier and power delivered to the resonator coil 344. In other embodiments, the PWM generator 410 may control the duty cycle of the switch closure time to control power output from that amplifier and power delivered to the resonator coil 344.

The system may comprise sensing and measurement circuitry including signal filtering and buffering circuits 318, 320 and differential/single ended conversion circuitry 402, 404 that may shape, modify, filter, process, buffer, and the like, signals prior to being input to processors and/or converters such as analog to digital converters (ADC) 314, 316. The processors and/or converters such as ADC 314, 316 may be integrated into a microcontroller 302 or may be separate circuits that may be coupled to a processing core 330. Based on measured signals, the master control algorithm may generate, limit, initiate, extinguish, control, adjust, or modify the operation of any of the PWM generator 410, the communication controller 332, the Vbus controller 326, the source impedance matching controller 338, the filter/buffering elements, 318, 320, differential/single ended conversion circuitry 402, 404, the converters, 314, 316, the resonator coil 344, and may be part of or integrated into a microcontroller 302 or a separate circuit.

Impedance matching networks 342 and resonator coils 344 may comprise electrically controllable, variable, or tunable components such as capacitors, switches, inductors, and the like, as described herein, and these components may have their component values or operating points adjusted according to signals received from the source impedance matching controller 338. Components may be tuned to enable tuning of the operation and characteristics of the resonator including the power delivered to and by the resonator, the resonant frequency of the resonator, the impedance of the resonator, the Q of the resonator, and any other coupled systems, and the like. The resonator may be any type or structure resonator described herein including a capacitively loaded loop resonator, a planar resonator comprising a magnetic material or any combination thereof.

Impedance matching networks may comprise fixed value components such as capacitors, inductors, and networks of components as described herein. Parts of the impedance matching networks, A, B and C, may comprise inductors, capacitors, transformers, and series and parallel combinations of such components, as described herein. In some embodiments, parts of the impedance matching networks A, B, and C, may be empty (short-circuited). In some embodiments, part B comprises a series combination of an inductor and a capacitor, and part C is empty.

The full bridge topology may allow operation at higher output power levels using the same DC bus voltage as an equivalent half bridge amplifier. The half bridge exemplary topology of FIG. 3 may provide a single-ended drive signal, while the exemplary full bridge topology of FIG. 4 may provide a differential drive to the source resonator 308. The impedance matching topologies and components and the resonator structure may be different for the two systems, as discussed herein.

The exemplary systems depicted in FIGS. 3 and 4 may further include fault detection circuitry 340 that may be used to trigger the shutdown of the microcontroller in the source amplifier or to change or interrupt the operation of the amplifier. This protection circuitry may comprise a high speed comparator or comparators to monitor the amplifier return current, the amplifier bus voltage (Vbus) from the DC supply 304, the voltage across the source resonator 308 and/or the optional tuning board, or any other voltage or current signals that may cause damage to components in the system or may yield undesirable operating conditions. Preferred embodiments may depend on the potentially undesirable operating modes associated with different applications. In some embodiments, protection circuitry may not be implemented or circuits may not be populated. In some embodiments, system and component protection may be implemented as part of a master control algorithm and other system monitoring and control circuits. In embodiments, dedicated fault circuitry 340 may include an output (not shown) coupled to a master control algorithm 328 that may trigger a system shutdown, a reduction of the output power (e.g. reduction of Vbus), a change to the PWM generator, a change in the operating frequency, a change to a tuning element, or any other reasonable action that may be implemented by the control algorithm 328 to adjust the operating point mode, improve system performance, and/or provide protection.

The exemplary systems depicted in FIGS. 3 and 4 may be configured so that the DC (or slowly varying AC) power supplied to the switches can be from a power source with varying power and/or output impedance. For example, the DC supply 304 may comprise a battery with an output voltage and output resistance that both vary as a function of the battery charge state. Or, the DC supply 304 may comprise a photovoltaic panel with a voltage and/or current that may vary as a function of environmental conditions such as solar illumination and temperature. In embodiments, the Vbus controller 326 may allow for tuning of the output impedance of the variable power source so that efficient wireless energy transfer is possible. In other embodiments, the PWM generator may allow for adjustment of the phase angle for switching the transistors 336 so that the optimum power can be extracted from the variable power source. For example, the switching times may be selected so that the input impedance of the amplifier matches the output impedance of the variable power source. In other examples, such as for the photovoltaic panel, the switching times may be selected so that an impedance is applied to the output of the photovoltaic panel that maximizes energy extraction from the photovoltaic panel. Those skilled in the art will understand that this general principle applies to other variable power sources including wind-powered generators, heat-powered generators, water-powered generators, fuel cells, batteries, and the like.

As described herein, sources in wireless power transfer systems may use a measurement of the input impedance of the impedance matching network 342 driving source resonator coil 344 as an error or control signal for a system control loop that may be part of the master control algorithm. In exemplary embodiments, variations in any combination of three parameters may be used to tune the wireless power source to compensate for changes in environmental conditions, for changes in coupling, for changes in device power demand, for changes in module, circuit, component or subsystem performance, for an increase or decrease in the number or sources, devices, or repeaters in the system, for user initiated changes, and the like. In exemplary embodiments, changes to the amplifier duty cycle, to the component values of the variable electrical components such as variable capacitors and inductors, and to the DC bus voltage may be used to change the operating point or operating range of the wireless source and improve some system operating value. The specifics of the control algorithms employed for different applications may vary depending on the desired system performance and behavior.

Impedance measurement circuitry such as described herein, and shown in FIGS. 3 and 4, may be implemented using two-channel simultaneous sampling ADCs and these ADCs may be integrated into a microcontroller chip or may be part of a separate circuit. Simultaneously sampling of the voltage and current signals at the input to a source resonator's impedance matching network and/or at the source resonator, may yield the phase and magnitude information of the current and voltage signals and may be processed using known signal processing techniques to yield complex impedance parameters. In some embodiments, monitoring only the voltage signals or only the current signals may be sufficient.

The impedance measurements described herein may use direct sampling methods which may be relatively simpler than some other known sampling methods. In embodiments, measured voltage and current signals may be conditioned, filtered and scaled by filtering/buffering circuitry before being input to ADCs. In embodiments, the filter/buffering circuitry may be adjustable to work at a variety of signal levels and frequencies, and circuit parameters such as filter shapes and widths may be adjusted manually, electronically, automatically, in response to a control signal, by the master control algorithm, and the like. Exemplary embodiments of filter/buffering circuits are shown in FIGS. 3, 4, and 5.

Figure 5A:
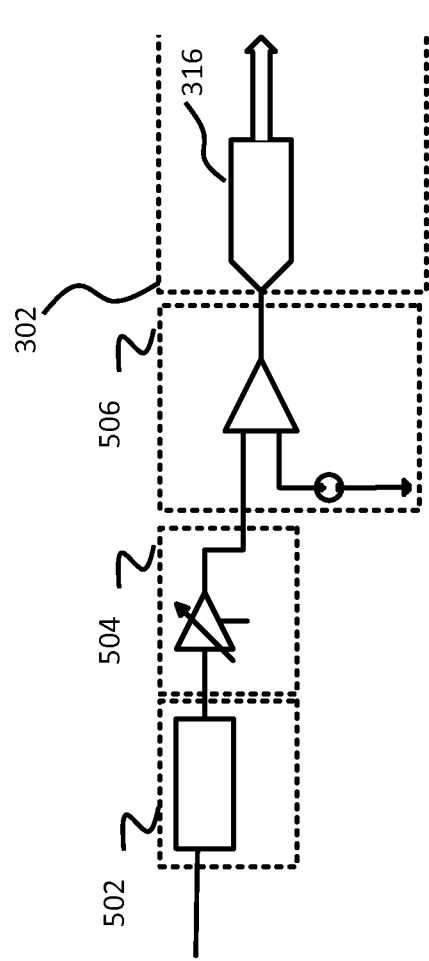
FIGS. 5A and 5B are block diagrams of sensing circuits.
Figure 5B:
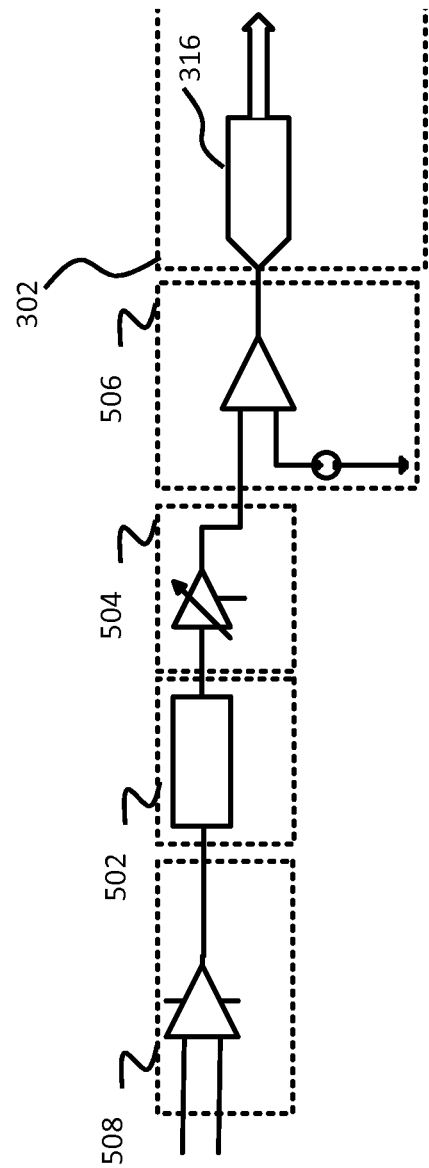

FIG. 5 shows more detailed views of exemplary circuit components that may be used in filter/buffering circuitry. In embodiments, and depending on the types of ADCs used in the system designs, single-ended amplifier topologies may reduce the complexity of the analog signal measurement paths used to characterize system, subsystem, module and/or component performance by eliminating the need for hardware to convert from differential to single-ended signal formats. In other implementations, differential signal formats may be preferable. The implementations shown in FIG. 5 are exemplary, and should not be construed to be the only possible way to implement the functionality described herein. Rather it should be understood that the analog signal path may employ components with different input requirements and hence may have different signal path architectures.

In both the single ended and differential amplifier topologies, the input current to the impedance matching networks 342 driving the resonator coils 344 may be obtained by measuring the voltage across a capacitor 324, or via a current sensor of some type. For the exemplary single-ended amplifier topology in FIG. 3, the current may be sensed on the ground return path from the impedance matching network 342. For the exemplary differential power amplifier depicted in FIG. 4, the input current to the impedance matching networks 342 driving the resonator coils 344 may be measured using a differential amplifier across the terminals of a capacitor 324 or via a current sensor of some type. In the differential topology of FIG. 4, the capacitor 324 may be duplicated at the negative output terminal of the source power amplifier.

In both topologies, after single ended signals representing the input voltage and current to the source resonator and impedance matching network are obtained, the signals may be filtered 502 to obtain the desired portions of the signal waveforms. In embodiments, the signals may be filtered to obtain the fundamental component of the signals. In embodiments, the type of filtering performed, such as low pass, bandpass, notch, and the like, as well as the filter topology used, such as elliptical, Chebyshev, Butterworth, and the like, may depend on the specific requirements of the system. In some embodiments, no filtering will be required.

The voltage and current signals may be amplified by an optional amplifier 504. The gain of the optional amplifier 504 may be fixed or variable. The gain of the amplifier may be controlled manually, electronically, automatically, in response to a control signal, and the like. The gain of the amplifier may be adjusted in a feedback loop, in response to a control algorithm, by the master control algorithm, and the like. In embodiments, required performance specifications for the amplifier may depend on signal strength and desired measurement accuracy, and may be different for different application scenarios and control algorithms.

The measured analog signals may have a DC offset added to them, 506, which may be required to bring the signals into the input voltage range of the ADC which for some systems may be 0 to 3.3V. In some systems this stage may not be required, depending on the specifications of the particular ADC used.

Figure 6A:
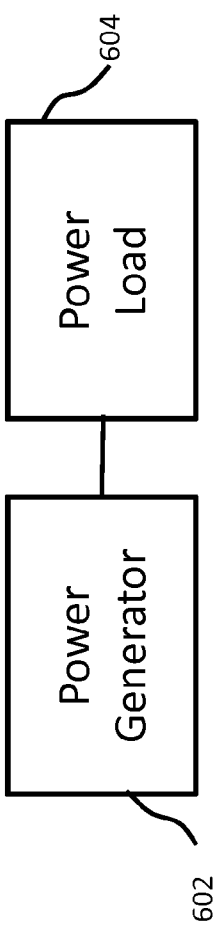
FIGS. 6A, 6B, and 6C are block diagrams of a wireless source.
Figure 6B:
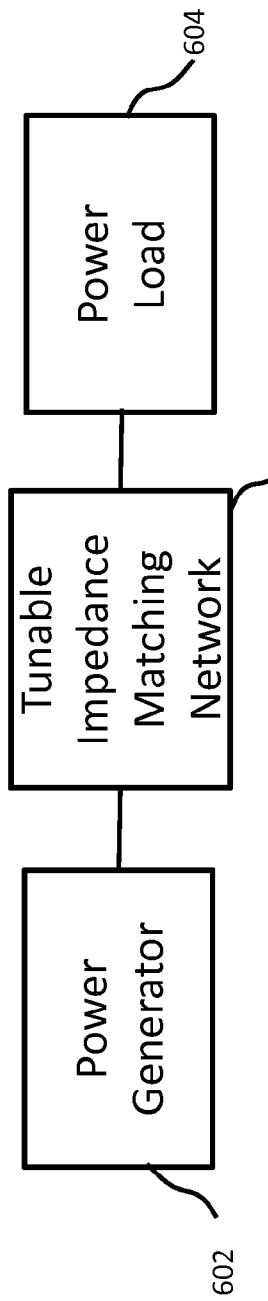
Figure 6C:
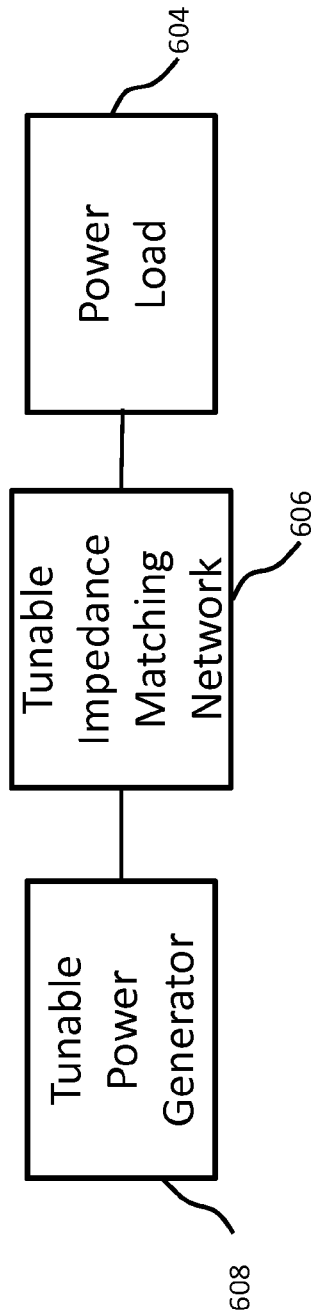

As described above, the efficiency of power transmission between a power generator and a power load may be impacted by how closely matched the output impedance of the generator is to the input impedance of the load. In an exemplary system as shown in FIG. 6A, power may be delivered to the load at a maximum possible efficiency, when the input impedance of the load 604 is equal to the complex conjugate of the internal impedance of the power generator or the power amplifier 602. Designing the generator or load impedance to obtain a high and/or maximum power transmission efficiency may be called "impedance matching". Impedance matching may be performed by inserting appropriate networks or sets of elements such as capacitors, resistors, inductors, transformers, switches and the like, to form an impedance matching network 606, between a power generator 602 and a power load 604 as shown in FIG. 6B. In other embodiments, mechanical adjustments and changes in element positioning may be used to achieve impedance matching. As described above for varying loads, the impedance matching network 606 may include variable components that are dynamically adjusted to ensure that the impedance at the generator terminals looking towards the load and the characteristic impedance of the generator remain substantially complex conjugates of each other, even in dynamic environments and operating scenarios. In embodiments, dynamic impedance matching may be accomplished by tuning the duty cycle, and/or the phase, and/or the frequency of the driving signal of the power generator or by tuning a physical component within the power generator, such as a capacitor, as depicted in FIG. 6C. Such a tuning mechanism may be advantageous because it may allow impedance matching between a power generator 608 and a load without the use of a tunable impedance matching network, or with a simplified tunable impedance matching network 606, such as one that has fewer tunable components for example. In embodiments, tuning the duty cycle, and/or frequency, and/or phase of the driving signal to a power generator may yield a dynamic impedance matching system with an extended tuning range or precision, with higher power, voltage and/or current capabilities, with faster electronic control, with fewer external components, and the like. The impedance matching methods, architectures, algorithms, protocols, circuits, measurements, controls, and the like, described below, may be useful in systems where power generators drive high-Q magnetic resonators and in high-Q wireless power transmission systems as described herein. In wireless power transfer systems a power generator may be a power amplifier driving a resonator, sometimes referred to as a source resonator, which may be a load to the power amplifier. In wireless power applications, it may be preferable to control the impedance matching between a power amplifier and a resonator load to control the efficiency of the power delivery from the power amplifier to the resonator. The impedance matching may be accomplished, or accomplished in part, by tuning or adjusting the duty cycle, and/or the phase, and/or the frequency of the driving signal of the power amplifier that drives the resonator.

Efficiency of Switching Amplifiers

Switching amplifiers, such as class D, E, F amplifiers, and the like or any combinations thereof, deliver power to a load at a maximum efficiency when almost no power is dissipated in the switching elements of the amplifier. This operating condition may be accomplished by designing the system so that the switching operations which are most critical (namely those that are most likely to lead to switching losses) are done when both the voltage across the switching element and the current through the switching element are nearly zero. These conditions may be referred to as Zero Voltage Switching (ZVS) and Zero Current Switching (ZCS) conditions respectively. When an amplifier operates at ZVS and ZCS either the voltage across the switching element or the current through the switching element is zero and thus no power can be dissipated in the switch. Since a switching amplifier may convert DC (or very low frequency AC) power to AC power at a specific frequency or range of frequencies, a filter may be introduced before the load to prevent unwanted harmonics that may be generated by the switching process from reaching the load and being dissipated there. In embodiments, a switching amplifier may be designed to operate at maximum efficiency of power conversion, when connected to a resonant load, with a quality factor (say Q>5), and of a specific impedance $Z_o = R_o + jX_o$, which leads to simultaneous ZVS and ZCS. We define $Z_o = R_o - jX_o$ as the characteristic impedance of the amplifier, so that achieving maximum power transmission efficiency is equivalent to impedance matching the resonant load to the characteristic impedance of the amplifier.

In a switching amplifier, the switching frequency of the switching elements, $f_{switch}$, wherein $f_{switch} = \omega/2\pi$ and the duty cycle, dc, of the ON switch-state duration of the switching elements may be the same for all switching elements of the amplifier. In this specification, we will use the term "class D" to denote both class D and class DE amplifiers, that is, switching amplifiers with dC<=50%.

Figure 7:
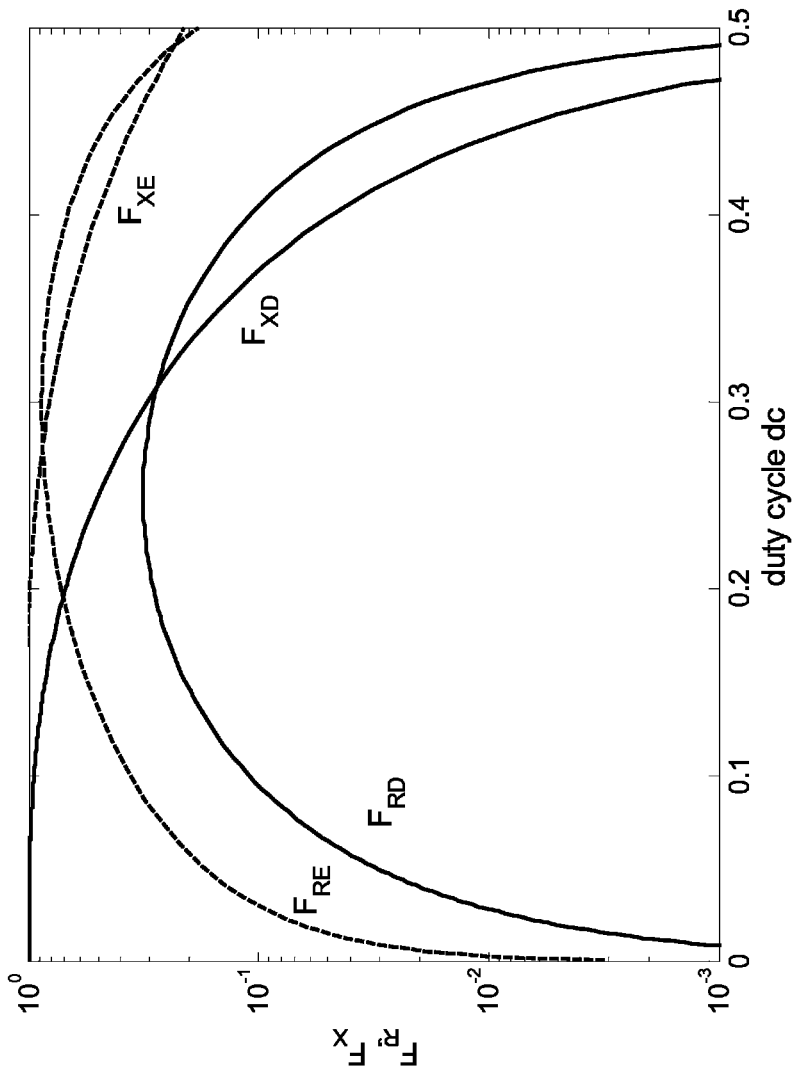
FIG. 7 is a plot showing the effects of a duty cycle on the parameters of an amplifier.

The value of the characteristic impedance of the amplifier may depend on the operating frequency, the amplifier topology, and the switching sequence of the switching elements. In some embodiments, the switching amplifier may be a half-bridge topology and, in some embodiments, a full-bridge topology. In some embodiments, the switching amplifier may be class D and, in some embodiments, class E. In any of the above embodiments, assuming the elements of the bridge are symmetric, the characteristic impedance of the switching amplifier has the form $$R_o = F_R(dc)/\omega C_a, X_o = F_X(dc)/\omega C_a, \quad (1)$$

where dc is the duty cycle of ON switch-state of the switching elements, the functions $F_R(dc)$ and $F_X(dc)$ are plotted in FIG. 7 (both for class D and E), $\omega$ is the frequency at which the switching elements are switched, and $C_a = n_a C_{switch}$ where $C_{switch}$ is the capacitance across each switch, including both the transistor output capacitance and also possible external capacitors placed in parallel with the switch, while $n_a = 1$ for a full bridge and $n_a = 2$ for a half bridge. For class D, one can also write the analytical expressions $$F_R(dc) = \sin^2 u/\pi, F_X(dc) = (u - \sin u * \cos u)/\pi, \quad (2)$$

where $u = \pi(1 - 2*dc)$, indicating that the characteristic impedance level of a class D amplifier decreases as the duty cycle, dc, increases towards 50%. For a class D amplifier operation with dc=50%, achieving ZVS and ZCS is possible only when the switching elements have practically no output capacitance ($C_a = 0$) and the load is exactly on resonance ($X_o = 0$), while $R_o$ can be arbitrary.

Impedance Matching Networks

In applications, the driven load may have impedance that is very different from the characteristic impedance of the external driving circuit, to which it is connected. Furthermore, the driven load may not be a resonant network. An Impedance Matching Network (IMN) is a circuit network that may be connected before a load as in FIG. 6B, in order to regulate the impedance that is seen at the input of the network consisting of the IMN circuit and the load. An IMN circuit may typically achieve this regulation by creating a resonance close to the driving frequency. Since such an IMN circuit accomplishes all conditions needed to maximize the power transmission efficiency from the generator to the load (resonance and impedance matching–ZVS and ZCS for a switching amplifier), in embodiments, an IMN circuit may be used between the driving circuit and the load.

For an arrangement shown in FIG. 6B, let the input impedance of the network consisting of the Impedance Matching Network (IMN) circuit and the load (denoted together from now on as IMN+load) be $Z_l = R_l(\omega) + jX_l(\omega)$. The impedance matching conditions of this network to the external circuit with characteristic impedance $Z_o = R_o - jX_o$ are then $R_l(\omega) = R_o$, $X_l(\omega) = X_o$.

Methods for Tunable Impedance Matching of a Variable Load

In embodiments where the load may be variable, impedance matching between the load and the external driving circuit, such as a linear or switching power amplifier, may be achieved by using adjustable/tunable components in the IMN circuit that may be adjusted to match the varying load to the fixed characteristic impedance $Z_o$ of the external circuit (FIG. 6B). To match both the real and imaginary parts of the impedance two tunable/variable elements in the IMN circuit may be needed.

In embodiments, the load may be inductive (such as a resonator coil) with impedance $R+j\omega L$, so the two tunable elements in the IMN circuit may be two tunable capacitance networks or one tunable capacitance network and one tunable inductance network or one tunable capacitance network and one tunable mutual inductance network.

In embodiments where the load may be variable, the impedance matching between the load and the driving circuit, such as a linear or switching power amplifier, may be achieved by using adjustable/tunable components or parameters in the amplifier circuit that may be adjusted to match the characteristic impedance $Z_o$ of the amplifier to the varying (due to load variations) input impedance of the network consisting of the IMN circuit and the load (IMN+load), where the IMN circuit may also be tunable (FIG. 6C). To match both the real and imaginary parts of the impedance, a total of two tunable/variable elements or parameters in the amplifier and the IMN circuit may be needed. The disclosed impedance matching method can reduce the required number of tunable/variable elements in the IMN circuit or even completely eliminate the requirement for tunable/variable elements in the IMN circuit. In some examples, one tunable element in the power amplifier and one tunable element in the IMN circuit may be used. In some examples, two tunable elements in the power amplifier and no tunable element in the IMN circuit may be used.

In embodiments, the tunable elements or parameters in the power amplifier may be the frequency, amplitude, phase, waveform, duty cycle and the like of the drive signals applied to transistors, switches, diodes and the like.

In embodiments, the power amplifier with tunable characteristic impedance may be a tunable switching amplifier of class D, E, F or any combinations thereof. Combining Equations (1) and (2), the impedance matching conditions for this network are $$R_l(\omega) = F_R(dc)/\omega C_a, X_l(\omega) = F_X(dc)/\omega C_a \quad (3).$$

In some examples of a tunable switching amplifier, one tunable element may be the capacitance $C_a$, which may be tuned by tuning the external capacitors placed in parallel with the switching elements.

In some examples of a tunable switching amplifier, one tunable element may be the duty cycle dc of the ON switch-state of the switching elements of the amplifier. Adjusting the duty cycle, dc, via Pulse Width Modulation (PWM) has been used in switching amplifiers to achieve output power control. In this specification, we disclose that PWM may also be used to achieve impedance matching, namely to satisfy Eq. (3), and thus maximize the amplifier efficiency.

In some examples of a tunable switching amplifier one tunable element may be the switching frequency, which is also the driving frequency of the IMN+load network and may be designed to be substantially close to the resonant frequency of the IMN+load network. Tuning the switching frequency may change the characteristic impedance of the amplifier and the impedance of the IMN+load network. The switching frequency of the amplifier may be tuned appropriately together with one more tunable parameters, so that Eqs. (3) are satisfied.

A benefit of tuning the duty cycle and/or the driving frequency of the amplifier for dynamic impedance matching is that these parameters can be tuned electronically, quickly, and over a broad range. In contrast, for example, a tunable capacitor that can sustain a large voltage and has a large enough tunable range and quality factor may be expensive, slow or unavailable for with the necessary component specifications.

Examples of Methods for Tunable Impedance Matching of a Variable Load

Figure 8:
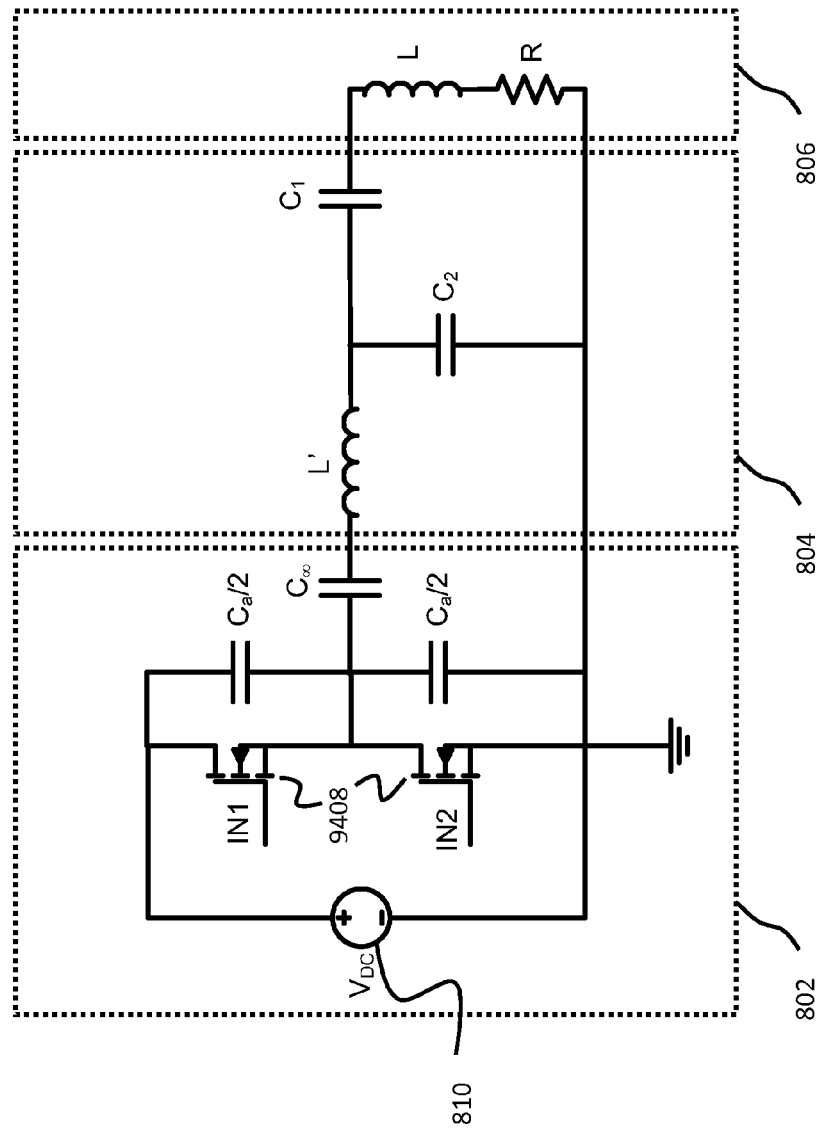
FIG. 8 is a simplified circuit diagram of a wireless power source with a switching amplifier.

A simplified circuit diagram showing the circuit level structure of a class D power amplifier 802, impedance matching network 804 and an inductive load 806 is shown in FIG. 8. The diagram shows the basic components of the system with the switching amplifier 804 comprising a power source 810, switching elements 808, and capacitors. The impedance matching network 804 comprising inductors and capacitors, and the load 806 modeled as an inductor and a resistor.

An exemplary embodiment of this inventive tuning scheme comprises a half-bridge class-D amplifier operating at switching frequency f and driving a low-loss inductive element $R+j\omega L$ via an IMN, as shown in FIG. 8.

In some embodiments L' may be tunable. L' may be tuned by a variable tapping point on the inductor or by connecting a tunable capacitor in series or in parallel to the inductor. In some embodiments $C_a$ may be tunable. For the half bridge topology, $C_a$ may be tuned by varying either one or both capacitors $C_{switch}$, as only the parallel sum of these capacitors matters for the amplifier operation. For the full bridge topology, $C_a$ may be tuned by varying either one, two, three or all capacitors $C_{switch}$, as only their combination (series sum of the two parallel sums associated with the two halves of the bridge) matters for the amplifier operation.

Figure 9:
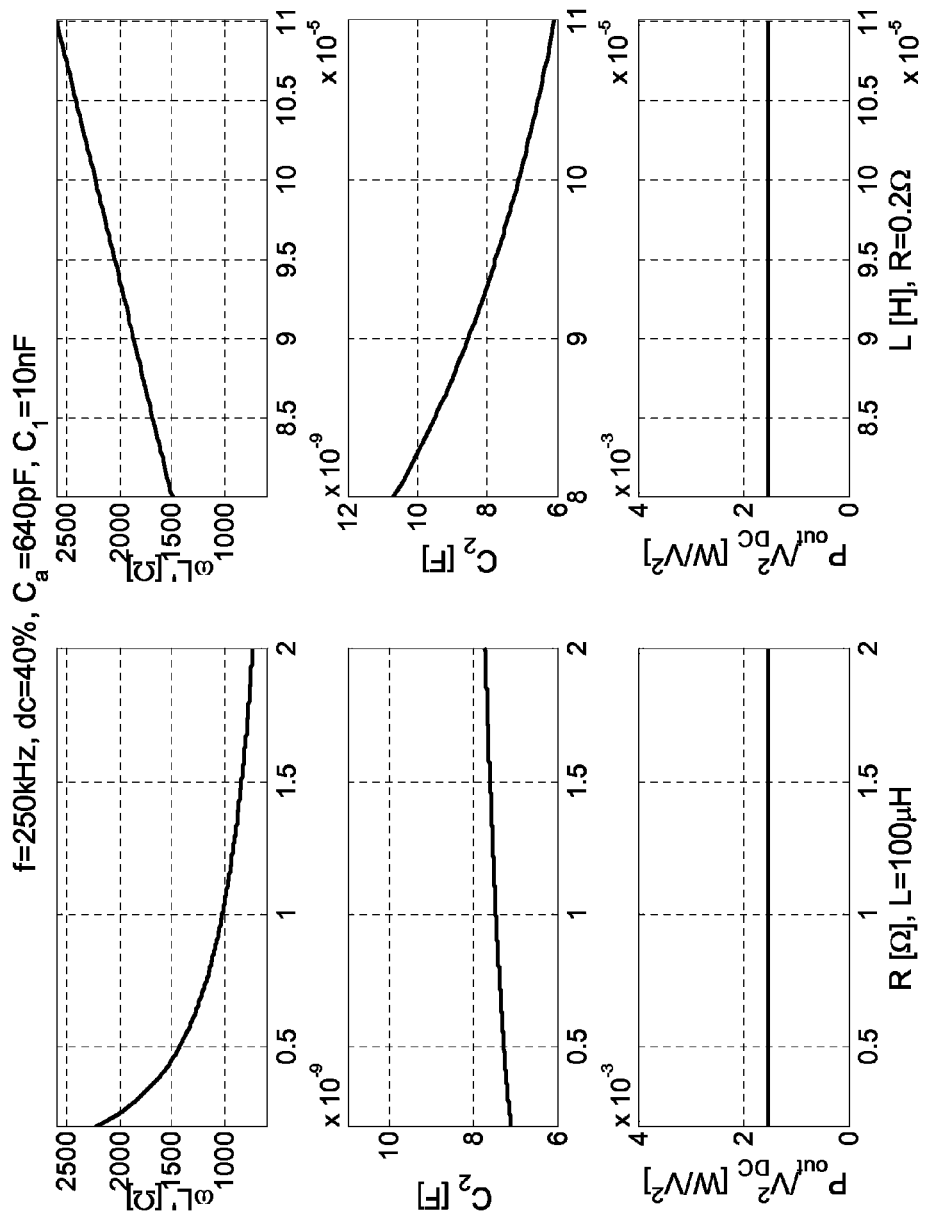
FIG. 9 shows plots of the effects of changes of parameters of a wireless power source.

In some embodiments of tunable impedance matching, two of the components of the IMN may be tunable. In some embodiments, L' and $C_2$ may be tuned. Then, FIG. 9 shows the values of the two tunable components needed to achieve impedance matching as functions of the varying R and L of the inductive element, and the associated variation of the output power (at given DC bus voltage) of the amplifier, for f=250 kHz, dc=40%, $C_a$=640 pF and $C_1$=10 nF. Since the IMN always adjusts to the fixed characteristic impedance of the amplifier, the output power is always constant as the inductive element is varying.

Figure 10:
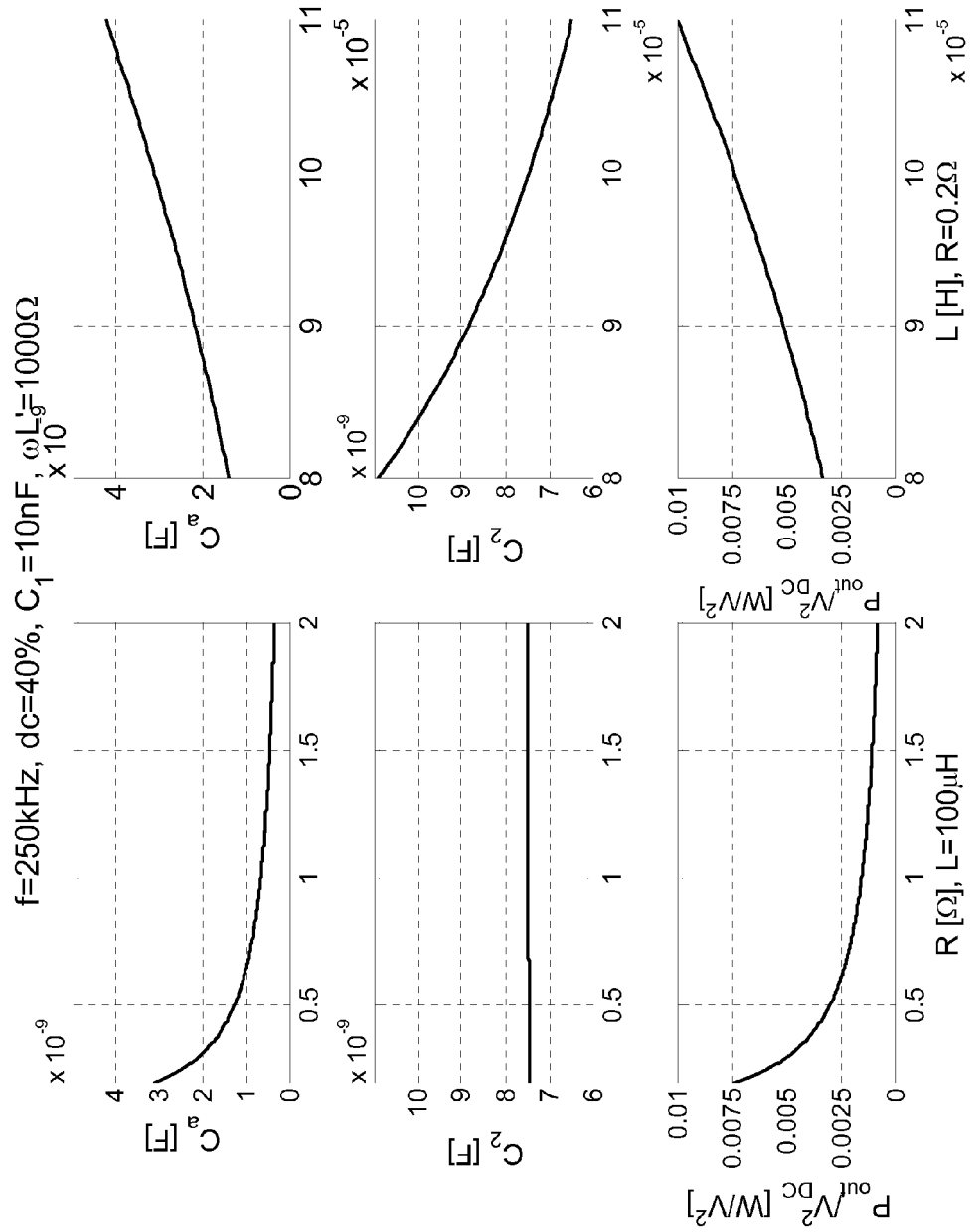
FIG. 10 shows plots of the effects of changes of parameters of a wireless power source.

In some embodiments of tunable impedance matching, elements in the switching amplifier may also be tunable. In some embodiments the capacitance $C_a$ along with the IMN capacitor $C_2$ may be tuned. Then, FIG. 10 shows the values of the two tunable components needed to achieve impedance matching as functions of the varying R and L of the inductive element, and the associated variation of the output power (at given DC bus voltage) of the amplifier for f=250 kHz, dc=40%, $C_1$=10 nF and $\omega L'$=1000Ω. It can be inferred from FIG. 10 that $C_2$ needs to be tuned mainly in response to variations in L and that the output power decreases as R increases.

Figure 11A:
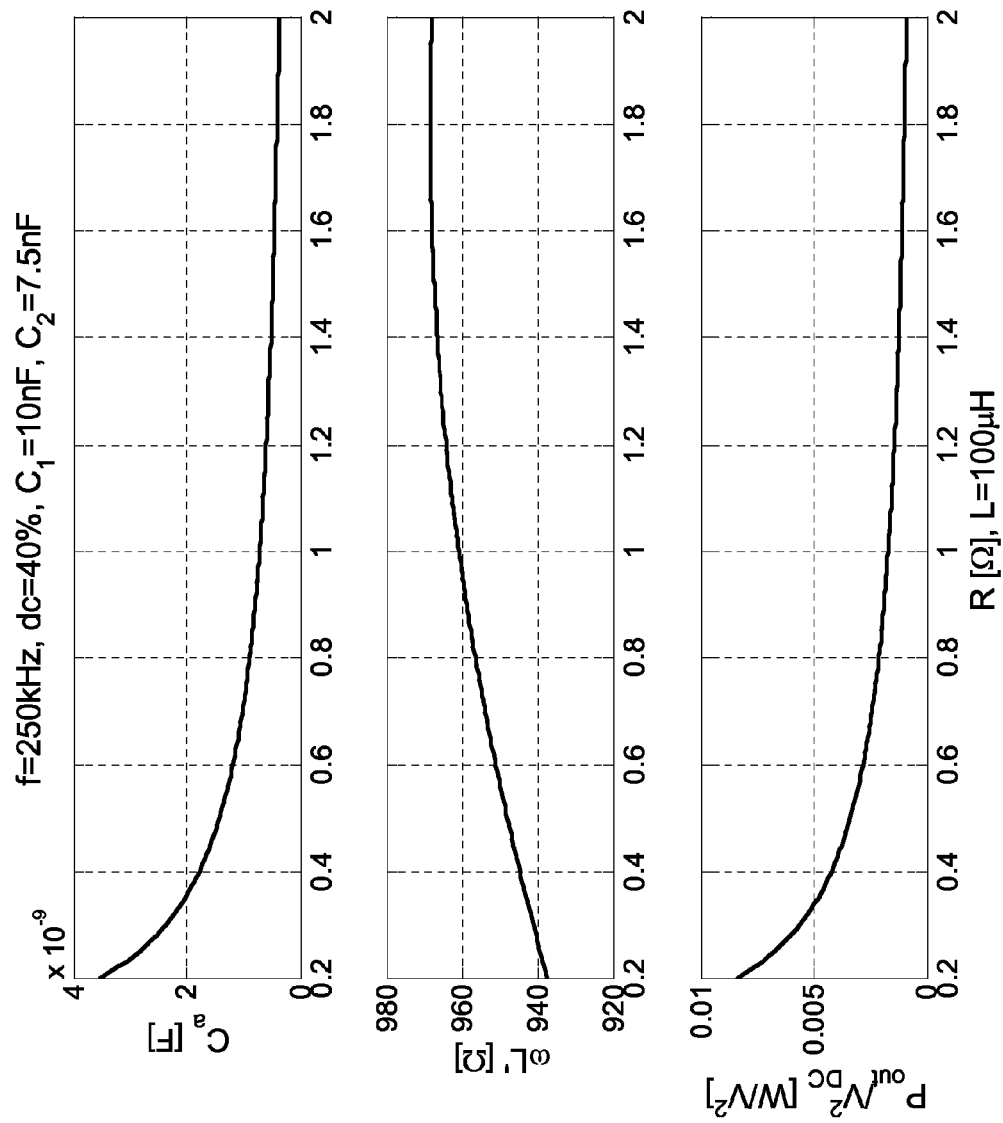
FIGS. 11A, 11B, 11C, and 11D are plots showing the effects of changes of parameters of a wireless power source.
Figure 11B:
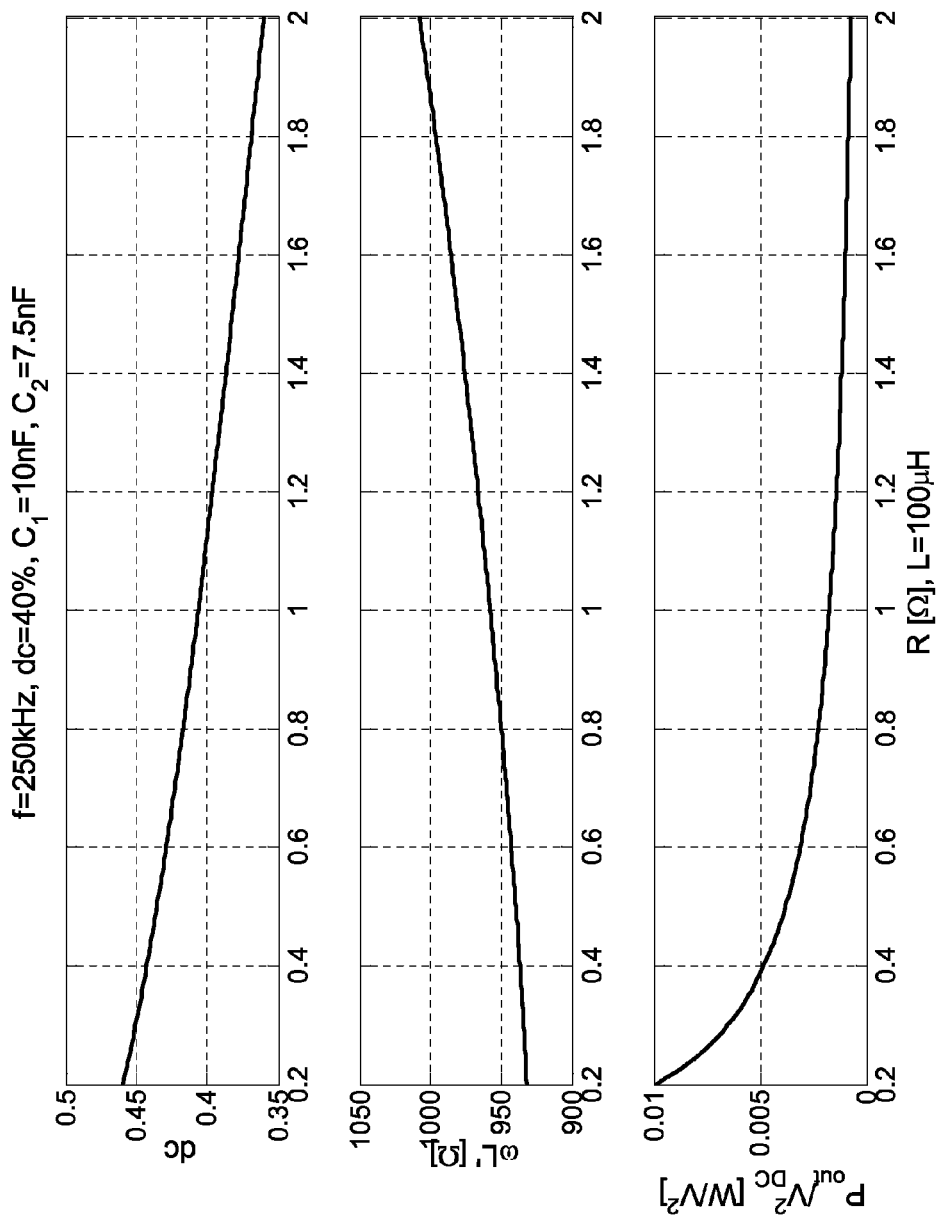
Figure 11C:
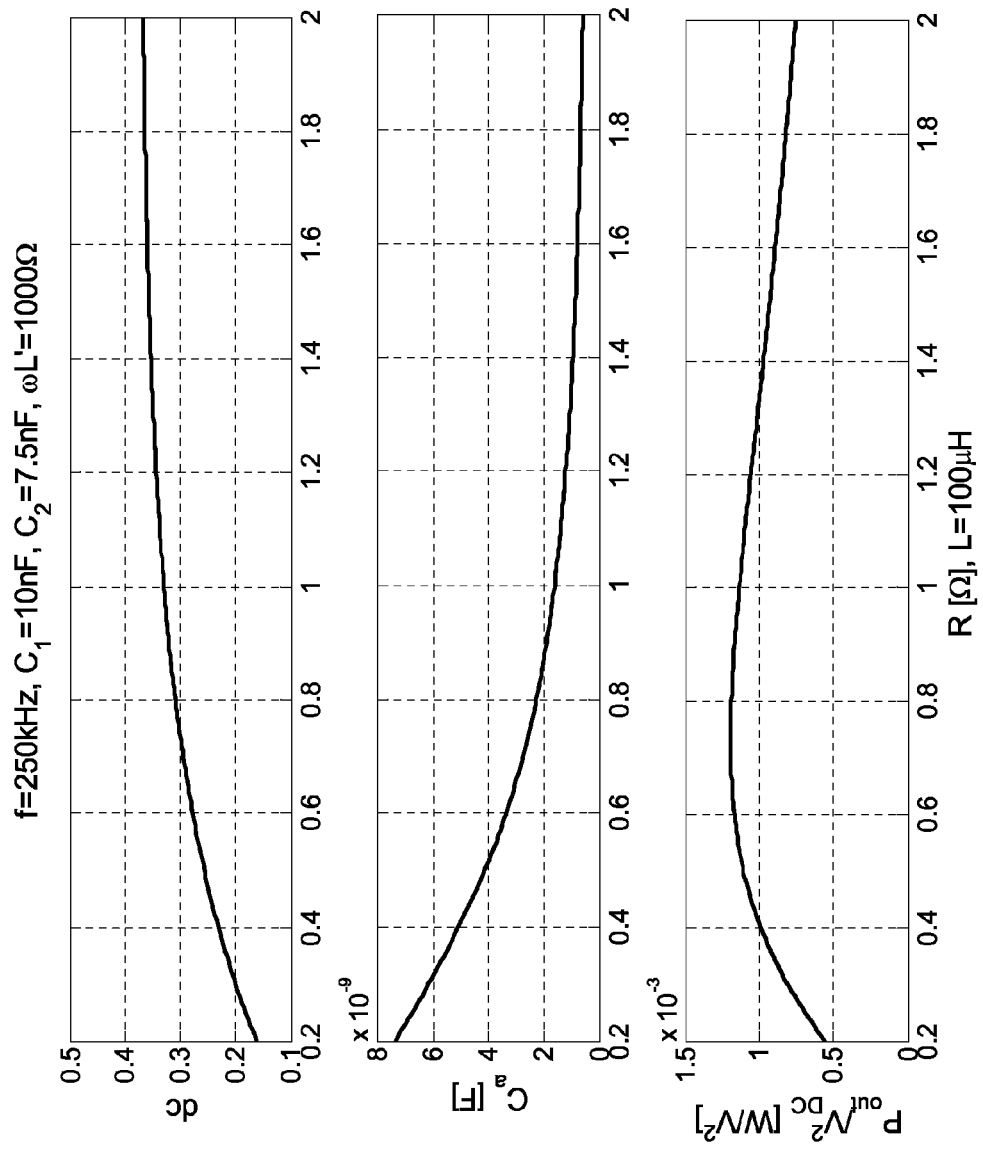
Figure 11D:
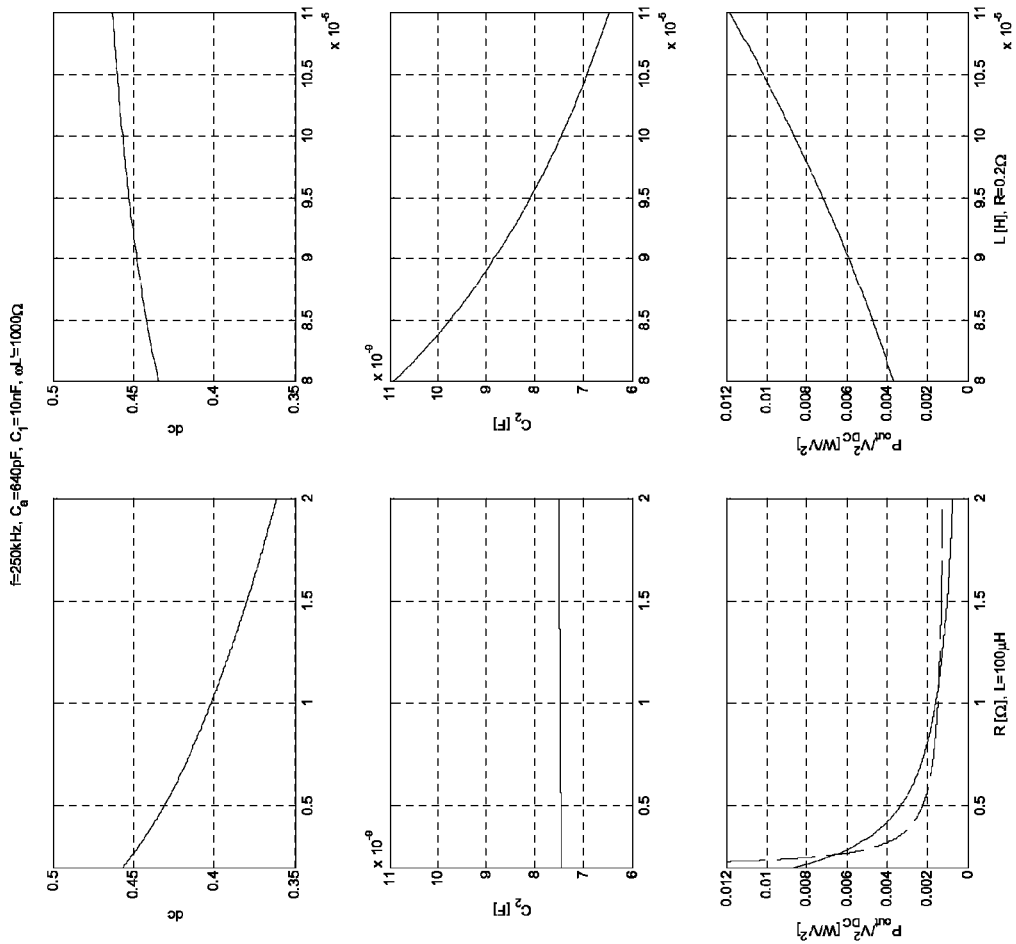

In some embodiments of tunable impedance matching, the duty cycle dc along with the IMN capacitor $C_2$ may be tuned. Then, FIG. 11D shows the values of the two tunable parameters needed to achieve impedance matching as functions of the varying R and L of the inductive element, and the associated variation of the output power (at given DC bus voltage) of the amplifier for f=250 kHz, $C_a$=640 pF, $C_1$=10 nF and $\omega L'$=1000Ω. It can be inferred from FIG. 11D that $C_2$ needs to be tuned mainly in response to variations in L and that the output power decreases as R increases.

In some embodiments of tunable impedance matching, the capacitance $C_a$ along with the IMN inductor $L'$ may be tuned. Then, FIG. 11A shows the values of the two tunable components needed to achieve impedance matching as functions of the varying R of the inductive element, and the associated variation of the output power (at given DC bus voltage) of the amplifier for f=250 kHz, dc=40%, $C_1$=10 nF and $C_2$=7.5 nF. It can be inferred from FIG. 11A that the output power decreases as R increases.

In some embodiments of tunable impedance matching, the duty cycle dc along with the IMN inductor $L'$ may be tuned. Then, FIG. 11B shows the values of the two tunable parameters needed to achieve impedance matching as functions of the varying R of the inductive element, and the associated variation of the output power (at given DC bus voltage) of the amplifier for f=250 kHz, $C_a$=640 pF, $C_1$=10 nF and $C_2$=7.5 nF as functions of the varying R of the inductive element. It can be inferred from FIG. 11B that the output power decreases as R increases.

In some embodiments of tunable impedance matching, only elements in the switching amplifier may be tunable with no tunable elements in the IMN. In some embodiments the duty cycle dc along with the capacitance $C_a$ may be tuned. Then, FIG. 11C, shows the values of the two tunable parameters needed to achieve impedance matching as functions of the varying R of the inductive element, and the associated variation of the output power (at given DC bus voltage) of the amplifier for f=250 kHz, $C_1$=10 nF, $C_2$=7.5 nF and col; = 1000Ω. It can be inferred from FIG. 11C that the output power is a non-monotonic function of R. These embodiments may be able to achieve dynamic impedance matching when variations in L (and thus the resonant frequency) are modest.

Figure 12:
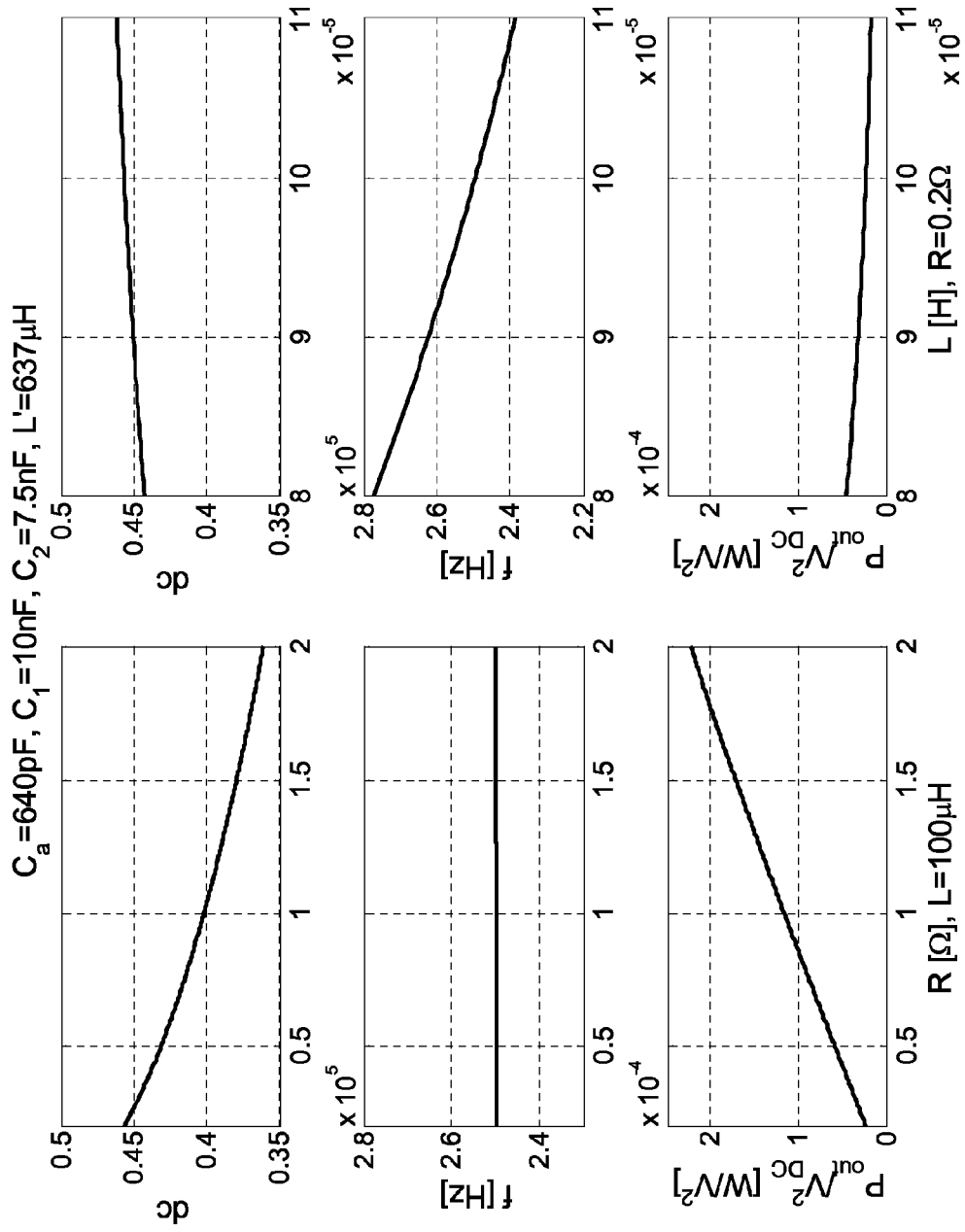
FIG. 12 shows plots of the effects of changes of parameters of a wireless power source.

In some embodiments, dynamic impedance matching with fixed elements inside the IMN, also when L is varying greatly as explained earlier, may be achieved by varying the driving frequency of the external frequency f (e.g. the switching frequency of a switching amplifier) so that it follows the varying resonant frequency of the resonator. Using the switching frequency f and the switch duty cycle dc as the two variable parameters, full impedance matching can be achieved as R and L are varying without the need of any variable components. Then, FIG. 12 shows the values of the two tunable parameters needed to achieve impedance matching as functions of the varying R and L of the inductive element, and the associated variation of the output power (at given DC bus voltage) of the amplifier for $C_a$=640 pF, $C_1$=10 nF, $C_2$=7.5 nF and $L'$=637 µH. It can be inferred from FIG. 12 that the frequency f needs to be tuned mainly in response to variations in L, as explained earlier.

Tunable Impedance Matching for Systems of Wireless Power Transmission

In applications of wireless power transfer the low-loss inductive element may be the coil of a source resonator coupled to one or more device resonators or other resonators, such as repeater resonators, for example. The impedance of the inductive element R+jωL may include the reflected impedances of the other resonators on the coil of the source resonator. Variations of R and L of the inductive element may occur due to external perturbations in the vicinity of the source resonator and/or the other resonators or thermal drift of components. Variations of R and L of the inductive element may also occur during normal use of the wireless power transmission system due to relative motion of the devices and other resonators with respect to the source. The relative motion of these devices and other resonators with respect to the source, or relative motion or position of other sources, may lead to varying coupling (and thus varying reflected impedances) of the devices to the source. Furthermore, variations of R and L of the inductive element may also occur during normal use of the wireless power transmission system due to changes within the other coupled resonators, such as changes in the power draw of their loads. All the methods and embodiments disclosed so far apply also to this case in order to achieve dynamic impedance matching of this inductive element to the external circuit driving it.

To demonstrate the presently disclosed dynamic impedance matching methods for a wireless power transmission system, consider a source resonator including a low-loss source coil, which is inductively coupled to the device coil of a device resonator driving a resistive load.

In some embodiments, dynamic impedance matching may be achieved at the source circuit. In some embodiments, dynamic impedance matching may also be achieved at the device circuit. When full impedance matching is obtained (both at the source and the device), the effective resistance of the source inductive element (namely the resistance of the source coil $R_s$ plus the reflected impedance from the device) is $R=R_s\sqrt{1+U_{sd}^2}$. (Similarly the effective resistance of the device inductive element is $R_d\sqrt{1+U_{sd}^2}$, where $R_d$ is the resistance of the device coil.) Dynamic variation of the mutual inductance between the coils due to motion results in a dynamic variation of $U_{sd}=\omega M_{sd}/\sqrt{R_s R_d}$. Therefore, when both source and device are dynamically tuned, the variation of mutual inductance is seen from the source circuit side as a variation in the source inductive element resistance R. Note that in this type of variation, the resonant frequencies of the resonators may not change substantially, since L may not be changing. Therefore, all the methods and examples presented for dynamic impedance matching may be used for the source circuit of the wireless power transmission system.

Note that, since the resistance R represents both the source coil and the reflected impedances of the device coils to the source coil, in FIGS. 9-12, as R increases due to the increasing U, the associated wireless power transmission efficiency increases. In some embodiments, an approximately constant power may be required at the load driven by the device circuitry. To achieve a constant level of power transmitted to the device, the required output power of the source circuit may need to decrease as U increases. If dynamic impedance matching is achieved via tuning some of the amplifier parameters, the output power of the amplifier may vary accordingly. In some embodiments, the automatic variation of the output power is preferred to be monotonically decreasing with R, so that it matches the constant device power requirement. In embodiments where the output power level is accomplished by adjusting the DC driving voltage of the power generator, using an impedance matching set of tunable parameters which leads to monotonically decreasing output power vs. R will imply that constant power can be kept at the power load in the device with only a moderate adjustment of the DC driving voltage. In embodiments, where the "knob" to adjust the output power level is the duty cycle dc or the phase of a switching amplifier or a component inside an Impedance Matching Network, using an impedance matching set of tunable parameters which leads to monotonically decreasing output power vs. R will imply that constant power can be kept at the power load in the device with only a moderate adjustment of this power "knob".

In the examples of FIGS. 9-12, if $R_s=0.194$ then the range $R=0.2\text{-}2\Omega$ corresponds approximately to $U_{sd}=0.3\text{-}10.5$. For these values, in FIG. 14, we show with dashed lines the output power (normalized to DC voltage squared) required to keep a constant power level at the load, when both source and device are dynamically impedance matched. The similar trend between the solid and dashed lines explains why a set of tunable parameters with such a variation of output power may be preferable.

In some embodiments, dynamic impedance matching may be achieved at the source circuit, but impedance matching may not be achieved or may only partially be achieved at the device circuit. As the mutual inductance between the source and device coils varies, the varying reflected impedance of the device to the source may result in a variation of both the effective resistance R and the effective inductance L of the source inductive element. The methods presented so far for dynamic impedance matching are applicable and can be used for the tunable source circuit of the wireless power transmission system.

Figure 14:
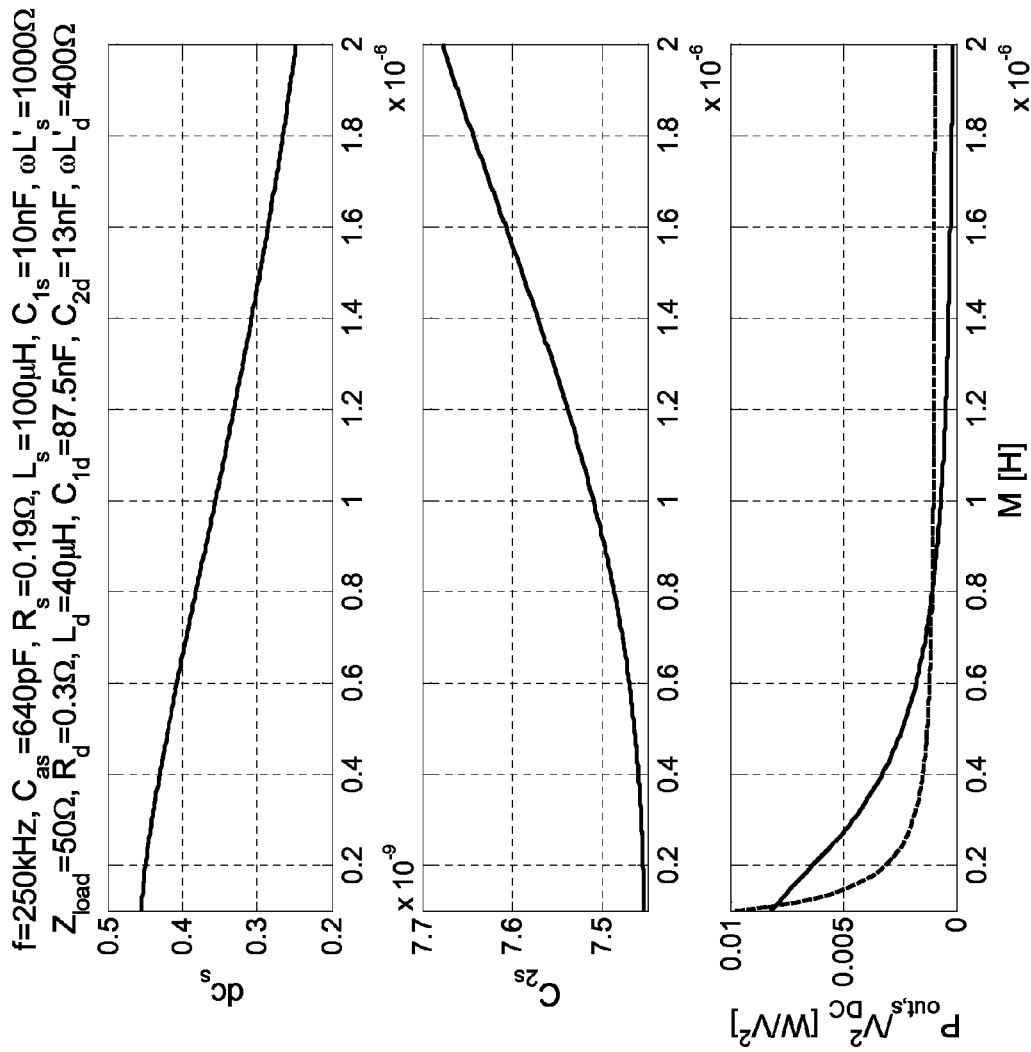
FIG. 14 shows plots of the effects of changes of parameters of a wireless power source.

As an example, consider the circuit of FIG. 14, where f=250 kHz, $C_a$=640 pF, $R_s$=0.19$\Omega$, $L_s$=100 µH, $C_{1s}$=10 nF, $\omega L'_s$=1000$\Omega$, $R_d$=0.3$\Omega$, $L_d$=40 µH, $C_{1d}$=87.5 nF, $C_{2d}$=13 nF, $\omega L'_d$=400$\Omega$ and $Z_l$=50$\Omega$, where s and d denote the source and device resonators respectively and the system is matched at $U_{sd}$=3. Tuning the duty cycle dc of the switching amplifier and the capacitor $C_{2s}$ may be used to dynamically impedance match the source, as the non-tunable device is moving relatively to the source changing the mutual inductance M between the source and the device. In FIG. 14, we show the required values of the tunable parameters along with the output power per DC voltage of the amplifier. The dashed line again indicates the output power of the amplifier that would be needed so that the power at the load is a constant value.

Figure 13:
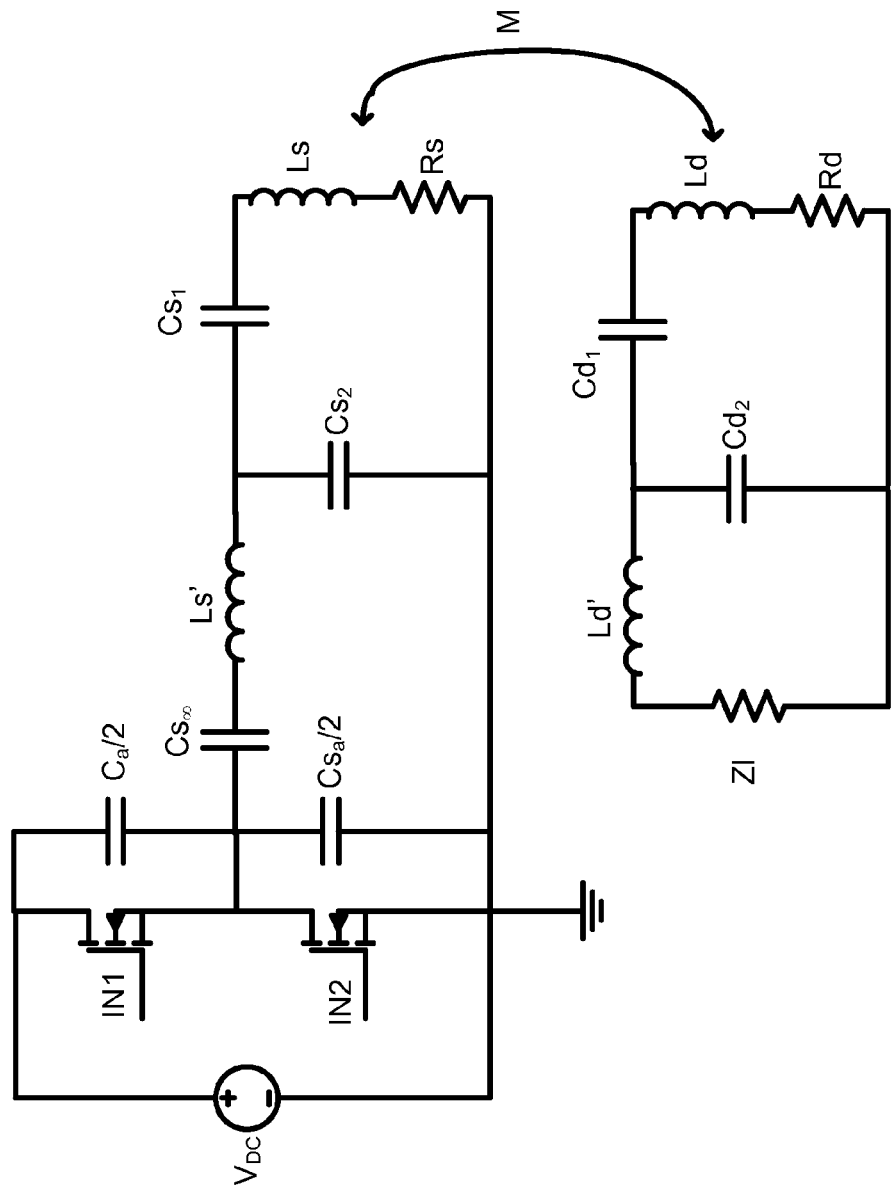
FIG. 13 is a simplified circuit diagram of a wireless energy transfer system comprising a wireless power source with a switching amplifier and a wireless power device.

In some embodiments, tuning the driving frequency f of the source driving circuit may still be used to achieve dynamic impedance matching at the source for a system of wireless power transmission between the source and one or more devices. As explained earlier, this method enables full dynamic impedance matching of the source, even when there are variations in the source inductance $L_s$ and thus the source resonant frequency. For efficient power transmission from the source to the devices, the device resonant frequencies must be tuned to follow the variations of the matched driving and source-resonant frequencies. Tuning a device capacitance (for example, in the embodiment of FIG. 13 $C_{1d}$ or $C_{2d}$) may be necessary, when there are variations in the resonant frequency of either the source or the device resonators. In fact, in a wireless power transfer system with multiple sources and devices, tuning the driving frequency alleviates the need to tune only one source-object resonant frequency, however, all the rest of the objects may need a mechanism (such as a tunable capacitance) to tune their resonant frequencies to match the driving frequency.

Resonator Thermal Management

In wireless energy transfer systems, some portion of the energy lost during the wireless transfer process is dissipated as heat. Energy may be dissipated in the resonator components themselves. For example, even high-Q conductors and components have some loss or resistance, and these conductors and components may heat up when electric currents and/or electromagnetic fields flow through them. Energy may be dissipated in materials and objects around a resonator. For example, eddy currents dissipated in imperfect conductors or dielectrics surrounding or near-by the resonator may heat up those objects. In addition to affecting the material properties of those objects, this heat may be transferred through conductive, radiative, or convective processes to the resonator components. Any of these heating effects may affect the resonator Q, impedance, frequency, etc., and therefore the performance of the wireless energy transfer system.

In a resonator comprising a block or core of magnetic material, heat may be generated in the magnetic material due to hysteresis losses and to resistive losses resulting from induced eddy currents. Both effects depend on the magnetic flux density in the material, and both can create significant amounts of heat, especially in regions where the flux density or eddy currents may be concentrated or localized. In addition to the flux density, the frequency of the oscillating magnetic field, the magnetic material composition and losses, and the ambient or operating temperature of the magnetic material may all impact how hysteresis and resistive losses heat the material.

In embodiments, the properties of the magnetic material such as the type of material, the dimensions of the block, and the like, and the magnetic field parameters may be chosen for specific operating power levels and environments to minimize heating of the magnetic material. In some embodiments, changes, cracks, or imperfections in a block of magnetic material may increase the losses and heating of the magnetic material in wireless power transmission applications.

For magnetic blocks with imperfections, or that are comprised of smaller size tiles or pieces of magnetic material arranged into a larger unit, the losses in the block may be uneven and may be concentrated in regions where there are inhomogeneities or relatively narrow gaps between adjacent tiles or pieces of magnetic material. For example, if an irregular gap exists in a magnetic block of material, then the effective reluctance of various magnetic flux paths through the material may be substantially irregular and the magnetic field may be more concentrated in portions of the block where the magnetic reluctance is lowest. In some cases, the effective reluctance may be lowest where the gap between tiles or pieces is narrowest or where the density of imperfections is lowest. Because the magnetic material guides the magnetic field, the magnetic flux density may not be substantially uniform across the block, but may be concentrated in regions offering relatively lower reluctance. Irregular concentrations of the magnetic field within a block of magnetic material may not be desirable because they may result in uneven losses and heat dissipation in the material.

Figure 15:
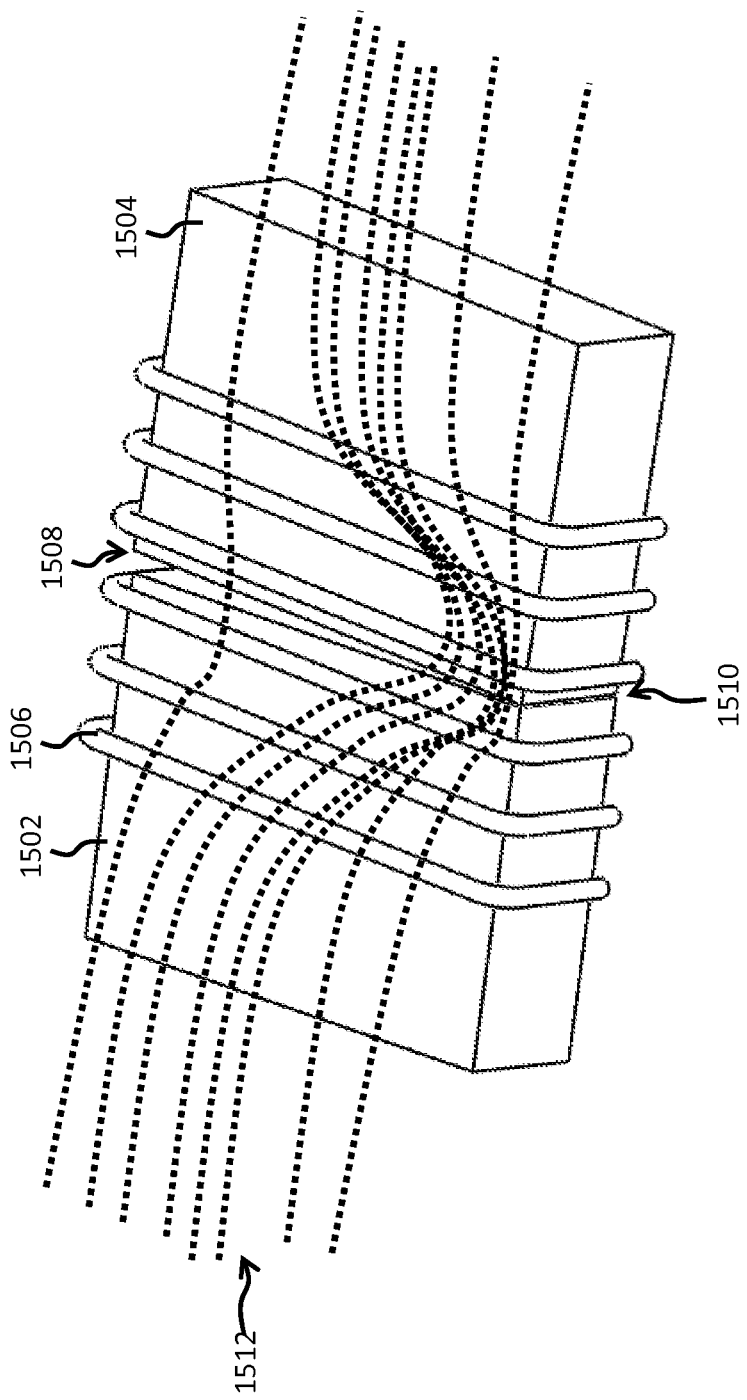
FIG. 15 is a diagram of a resonator showing possible non-uniform magnetic field distributions due to irregular spacing between tiles of magnetic material.

For example, consider a magnetic resonator comprising a conductor 1506 wrapped around a block of magnetic material composed of two individual tiles 1502, 1504 of magnetic material joined such that they form a seam 1508 that is perpendicular to the axis of the conductor 1506 loops as depicted in FIG. 15. An irregular gap in the seam 1508 between the tiles of magnetic material 1502, 1504 may force the magnetic field 1512 (represented schematically by the dashed magnetic field lines) in the resonator to concentrate in a sub region 1510 of the cross section of the magnetic material. Since the magnetic field will follow the path of least reluctance, a path including an air gap between two pieces of magnetic material may create an effectively higher reluctance path than one that traverses the width of the magnetic material at a point where the pieces of magnetic materials touch or have a smaller air gap. The magnetic flux density may therefore preferentially flow through a relatively small cross area of the magnetic material resulting in a high concentration of magnetic flux in that small area 1510.

In many magnetic materials of interest, more inhomogeneous flux density distributions lead to higher overall losses. Moreover, the more inhomogeneous flux distribution may result in material saturation and cause localized heating of the area in which the magnetic flux is concentrated. The localized heating may alter the properties of the magnetic material, in some cases exacerbating the losses. For example, in the relevant regimes of operation of some materials, hysteresis and resistive losses increase with temperature. If heating the material increases material losses, resulting in more heating, the temperature of the material may continue to increase and even runaway if no corrective action is taken. In some instances, the temperature may reach 100 C or more and may degrade the properties of the magnetic material and the performance of wireless power transfer. In some instances, the magnetic materials may be damaged, or the surrounding electronic components, packaging and/or enclosures may be damaged by the excessive heat.

In embodiments, variations or irregularities between tiles or pieces of the block of magnetic material may be minimized by machining, polishing, grinding, and the like, the edges of the tiles or pieces to ensure a tight fit between tiles of magnetic materials providing a substantially more uniform reluctance through the whole cross section of the block of magnetic material. In embodiments, a block of magnetic material may require a means for providing a compression force between the tiles to ensure the tiles are pressed tight together without gaps. In embodiments, an adhesive may be used between the tiles to ensure they remain in tight contact.

In embodiments the irregular spacing of adjacent tiles of magnetic material may be reduced by adding a deliberate gap between adjacent tiles of magnetic material. In embodiments a deliberate gap may be used as a spacer to ensure even or regular separations between magnetic material tiles or pieces. Deliberate gaps of flexible materials may also reduce irregularities in the spacings due to tile movement or vibrations. In embodiments, the edges of adjacent tiles of magnetic material may be taped, dipped, coated, and the like with an electrical insulator, to prevent eddy currents from flowing through reduced cross-sectional areas of the block, thus lowering the eddy current losses in the material. In embodiments a separator may be integrated into the resonator packaging. The spacer may provide a spacing of 1 mm or less.

In embodiments, the mechanical properties of the spacer between tiles may be chosen so as to improve the tolerance of the overall structure to mechanical effects such as changes in the dimensions and/or shape of the tiles due to intrinsic effects (e.g., magnetostriction, thermal expansion, and the like) as well as external shocks and vibrations. For example, the spacer may have a desired amount of mechanical give to accommodate the expansion and/or contraction of individual tiles, and may help reduce the stress on the tiles when they are subjected to mechanical vibrations, thus helping to reduce the appearance of cracks and other defects in the magnetic material.

In embodiments, it may be preferable to arrange the individual tiles that comprise the block of magnetic material to minimize the number of seams or gaps between tiles that are perpendicular to the dipole moment of the resonator. In embodiments it may be preferable to arrange and orient the tiles of magnetic material to minimize the gaps between tiles that are perpendicular to the axis formed by the loops of a conductor comprising the resonator.

Figure 16:
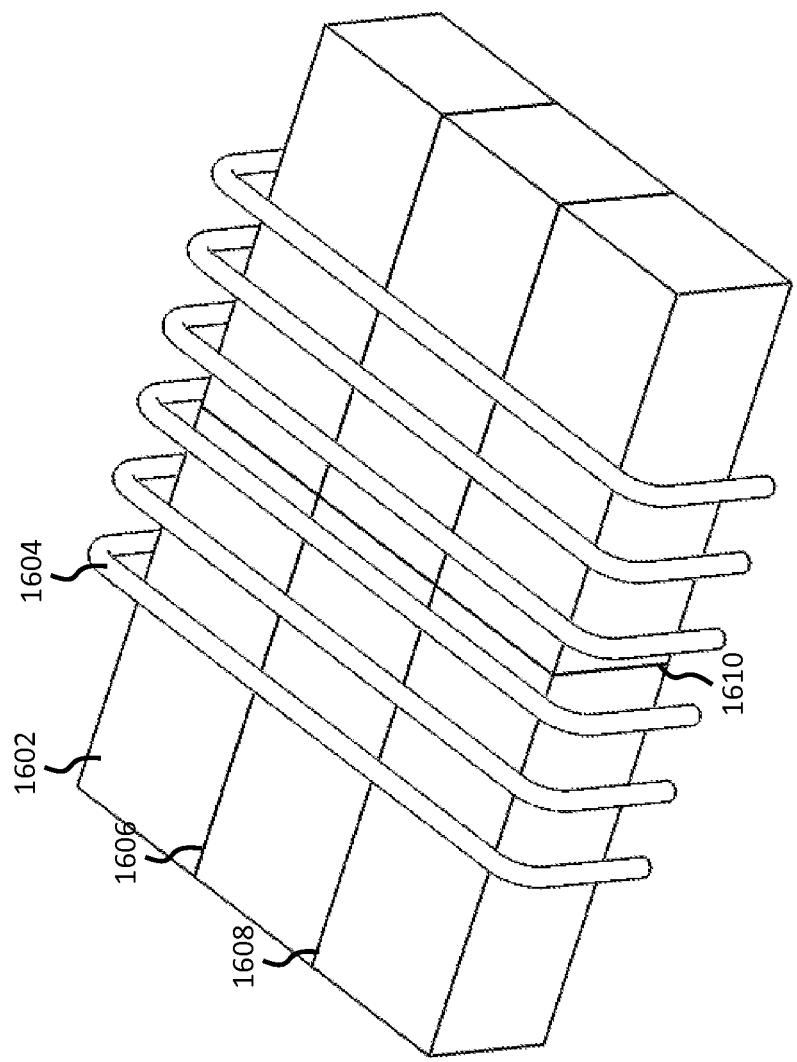
FIG. 16 is a resonator with an arrangement of tiles in a block of magnetic material that may reduce hotspots in the magnetic material block.

For example, consider the resonator structure depicted in FIG. 16. The resonator comprises a conductor 1604 wrapped around a block of magnetic material comprising six separate individual tiles 1602 arranged in a three by two array. The arrangement of tiles results in two tile seams 1606, 1608 when traversing the block of magnetic material in one direction, and only one tile seam 1610 when traversing the block of magnetic material in the orthogonal direction. In embodiments, it may be preferable to wrap the conductor wire 1604 around the block of magnetic material such that the dipole moment of the resonator is perpendicular to the fewest number of tile seams. The inventors have observed that there is relatively less heating induced around seams and gaps 1606, 1608 that are parallel to the dipole moment of the resonator. Seams and gaps that run perpendicular to the dipole moment of the resonator may also be referred to as critical seams or critical seam areas. It may still be desirable, however, to electrically insulate gaps that run parallel to the dipole moment of the resonator (such as 1606 and 1608) so as to reduce eddy current losses. Uneven contact between tiles separated by such parallel gaps may cause eddy currents to flow through narrow contact points, leading to large losses at such points.

In embodiments, irregularities in spacing may be tolerated with adequate cooling of the critical seam areas to prevent the localized degradation of material properties when the magnetic material heats up. Maintaining the temperature of the magnetic material below a critical temperature may prevent a runaway effect caused by a sufficiently high temperature. With proper cooling of the critical seam area, the wireless energy transfer performance may be satisfactory despite the additional loss and heating effects due to irregular spacing, cracks, or gaps between tiles.

Effective heat sinking of the resonator structure to prevent excessive localized heating of the magnetic material poses several challenges. Metallic materials that are typically used for heatsinks and thermal conduction can interact with the magnetic fields used for wireless energy transfer by the resonators and affect the performance of the system. Their location, size, orientation, and use should be designed so as to not excessively lower the perturbed Q of the resonators in the presence of these heatsinking materials. In addition, owing to the relatively poor thermal conductivity of magnetic materials such as ferrites, a relatively large contact area between the heatsink and the magnetic material may be required to provide adequate cooling which may require placement of substantial amount of lossy materials close to the magnetic resonator.

In embodiments, adequate cooling of the resonator may be achieved with minimal effect on the wireless energy transfer performance with strategic placement of thermally conductive materials. In embodiments, strips of thermally conductive material may be placed in between loops of conductor wire and in thermal contact with the block of magnetic material.

One exemplary embodiment of a resonator with strips of thermally conductive material is depicted in FIG. 17. FIG. 17A shows the resonator structure without the conducting strips and with the block of magnetic material comprising smaller tiles of magnetic material forming gaps or seams. Strips of thermally conductive 1708 material may be placed in between the loops of the conductor 1702 and in thermal contact with the block of magnetic material 1704 as depicted in FIGS. 17B and 17C. To minimize the effects of the strips on the parameters of the resonator, in some embodiments it may be preferable to arrange the strips parallel to the loops of conductor or perpendicular to the dipole moment of the resonator. The strips of conductor may be placed to cover as much or as many of the seams or gaps between the tiles as possible especially the seams between tiles that are perpendicular to the dipole moment of the resonator.

In embodiments the thermally conductive material may comprise copper, aluminum, brass, thermal epoxy, paste, pads, and the like, and may be any material that has a thermal conductivity that is at least that of the magnetic material in the resonator (~5 W/(K–m) for some commercial ferrite materials). In embodiments where the thermally conductive material is also electrically conducting, the material may require a layer or coating of an electrical insulator to prevent shorting and direct electrical contact with the magnetic material or the loops of conductor of the resonator.

In embodiments the strips of thermally conductive material may be used to conduct heat from the resonator structure to a structure or medium that can safely dissipate the thermal energy. In embodiments the thermally conductive strips may be connected to a heat sink such as a large plate located above the strips of conductor that can dissipate the thermal energy using passive or forced convection, radiation, or conduction to the environment. In embodiments the system may include any number of active cooling systems that may be external or internal to the resonator structure that can dissipate the thermal energy from the thermally conducting strips and may include liquid cooling systems, forced air systems, and the like. For example, the thermally conducting strips may be hollow or comprise channels for coolant that may be pumped or forced through to cool the magnetic material. In embodiments, a field deflector made of a good electrical conductor (such as copper, silver, aluminum, and the like) may double as part of the heatsinking apparatus. The addition of thermally and electrically conducting strips to the space between the magnetic material and the field deflector may have a marginal effect on the perturbed Q, as the electromagnetic fields in that space are typically suppressed by the presence of the field deflector. Such conducting strips may be thermally connected to both the magnetic material and the field deflector to make the temperature distribution among different strips more homogeneous.

In embodiments the thermally conducting strips are spaced to allow at least one loop of conductor to wrap around the magnetic material. In embodiments the strips of thermally conductive material may be positioned only at the gaps or seams of the magnetic material. In other embodiments, the strips may be positioned to contact the magnetic material at substantially throughout its complete length. In other embodiments, the strips may be distributed to match the flux density within the magnetic material. Areas of the magnetic material which under normal operation of the resonator may have higher magnetic flux densities may have a higher density of contact with the thermally conductive strips. In embodiments depicted in FIG. 17A) for example, the highest magnetic flux density in the magnetic material may be observed toward the center of the block of magnetic material and the lower density may be toward the ends of the block in the direction of the dipole moment of the resonator.

To show how the use of thermally conducting strips helps to reduce the overall temperature in the magnetic material as well as the temperature at potential hot spots, the inventors have performed a finite element simulation of a resonator structure similar to that depicted in FIG. 17C. The structure was simulated operating at a frequency of 235 kHz and comprising a block of EPCOS N95 magnetic material measuring 30 cm×30 cm×5 mm excited by 10 turns of litz wire (symmetrically placed at 25 mm, 40 mm, 55 mm, 90 mm and 105 mm from the plane of symmetry of the structure) carrying 40 A of peak current each, and thermally connected to a 50 cm×50 cm×4 mm field deflector by means of three 3×¾×1' hollow square tubes (⅛" wall thickness) of aluminum (alloy 6063) whose central axes are placed at −75 mm, 0 mm, and +75 from the symmetry plane of the structure. The perturbed Q due to the field deflector and hollow tubes was found to be 1400 (compared to 1710 for the same structure without the hollow tubes). The power dissipated in the shield and tubes was calculated to be 35.6 W, while that dissipated in the magnetic material was 58.3 W. Assuming the structure is cooled by air convection and radiation and an ambient temperature of 24° C., the maximum temperature in the structure was 85° C. (at points in the magnetic material approximately halfway between the hollow tubes) while the temperature in parts of the magnetic material in contact with the hollow tubes was approximately 68° C. By comparison, the same resonator without the thermally conducting hollow tubes dissipated 62.0 W in the magnetic material for the same excitation current of 40 W peak and the maximum temperature in the magnetic material was found to be 111° C.

The advantage of the conducting strips is more apparent still if we introduce a defect in a portion of the magnetic material that is in good thermal contact with the tubes. An air gap 10 cm long and 0.5 mm placed at the center of the magnetic material and oriented perpendicular to the dipole moment increases the power dissipated in the magnetic material to 69.9 W (the additional 11.6W relative to the previously discussed no-defect example being highly concentrated in the vicinity of the gap), but the conducting tube ensures that the maximum temperature in the magnetic material has only a relative modest increase of 11° C. to 96° C. In contrast, the same defect without the conducting tubes leads to a maximum temperature of 161° C. near the defect. Cooling solutions other than convection and radiation, such as thermally connecting the conducting tubes body with large thermal mass or actively cooling them, may lead to even lower operational temperatures for this resonator at the same current level.

In embodiments thermally conductive strips of material may be positioned at areas that may have the highest probability of developing cracks that may cause irregular gaps in the magnetic material. Such areas may be areas of high stress or strain on the material, or areas with poor support or backing from the packaging of the resonator. Strategically positioned thermally conductive strips may ensure that as cracks or irregular gaps develop in the magnetic material, the temperature of the magnetic material will be maintained below its critical temperature. The critical temperature may be defined as the Curie temperature of the magnetic material, or any temperature at which the characteristics of the resonator have been degraded beyond the desired performance parameters.

In embodiments the heastsinking structure may provide mechanical support to the magnetic material. In embodiments the heatsinking structure may be designed to have a desired amount of mechanical give (e.g., by using epoxy, thermal pads, and the like having suitable mechanical properties to thermally connect different elements of the structure) so as to provide the resonator with a greater amount of tolerance to changes in the intrinsic dimensions of its elements (due to thermal expansion, magnetostriction, and the like) as well as external shocks and vibrations, and prevent the formation of cracks and other defects.

In embodiments where the resonator comprises orthogonal windings wrapped around the magnetic material, the strips of conducting material may be tailored to make thermal contact with the magnetic material within areas delimited by two orthogonal sets of adjacent loops. In embodiments a strip may contain appropriate indentations to fit around the conductor of at least one orthogonal winding while making thermal contact with the magnetic material at least one point. In embodiments the magnetic material may be in thermal contact with a number of thermally conducting blocks placed between adjacent loops. The thermally conducting blocks may be in turn thermally connected to one another by means of a good thermal conductor and/or heatsinked.

Throughout this description although the term thermally conductive strips of material was used as an exemplary specimen of a shape of a material it should be understood by those skilled in the art that any shapes and contours may be substituted without departing from the spirit of the inventions. Squared, ovals, strips, dots, elongated shapes, and the like would all be within the spirit of the present invention.

Communication in a Wireless Energy Transfer System

A wireless energy transfer system may require a verification step to ensure that energy is being transferred from a designated source to a designated device. In a wireless energy transfer system, a source and a device do not require physical contact and may be separated by distances of centimeters or more. In some configurations with multiple sources or multiple devices that are within the wireless power transfer range of one another it may be necessary to determine or verify the source and device that are transferring power between each other.

Verification of an energy transfer may be important when an out-of-band communication channel is used in the wireless energy transfer system. An out-of-band communication channel may be used to transfer data between different components of the wireless energy transfer system. Communication between a source and a device or between multiple devices, sources, and the like may be used to coordinate the wireless energy transfer or to adjust the parameters of a wireless energy transfer system to optimize efficiency, power delivery, and the like.

In some embodiments all of the signaling and communication may be performed using an in-band communication channel that uses the same fields as are used for energy transfer. Using only the in-band communication channel may have the advantage of not requiring a separate verification step. In some embodiments however, a separate out-of-band communication channel may be more desirable. An out-of-band communication channel may be less expensive and support higher data rates. An out-of-band communication channel that does not use near-field communication may support longer distance allowing resonator discovery. Likewise a separate out-of-band communication channel may not require power to be applied to the resonators and communication and likewise communication may occur without disruption of the power transfer.

An out-of-band communication channel is a channel that does not use the magnetic fields used for energy transfer by the resonators. The communication channel may use a separate antenna and a separate signaling protocol that is disjoint from the energy transfer resonator and magnetic fields. An out of band communication channel that does not use the resonator or modulate the fields used for energy transfer may have a different range or effective distance than the effective or useful energy transfer range of the system. An of out-band communication channel may use or be based on Bluetooth, WiFi, Zigbee technology and the like and may be effective over several or even several hundred or more meters while the wireless energy transfer may have an effective range of several or even 30 or more centimeters. This difference in range, performance, or capability may affect the coordination of the wireless energy transfer system.

Figure 18:
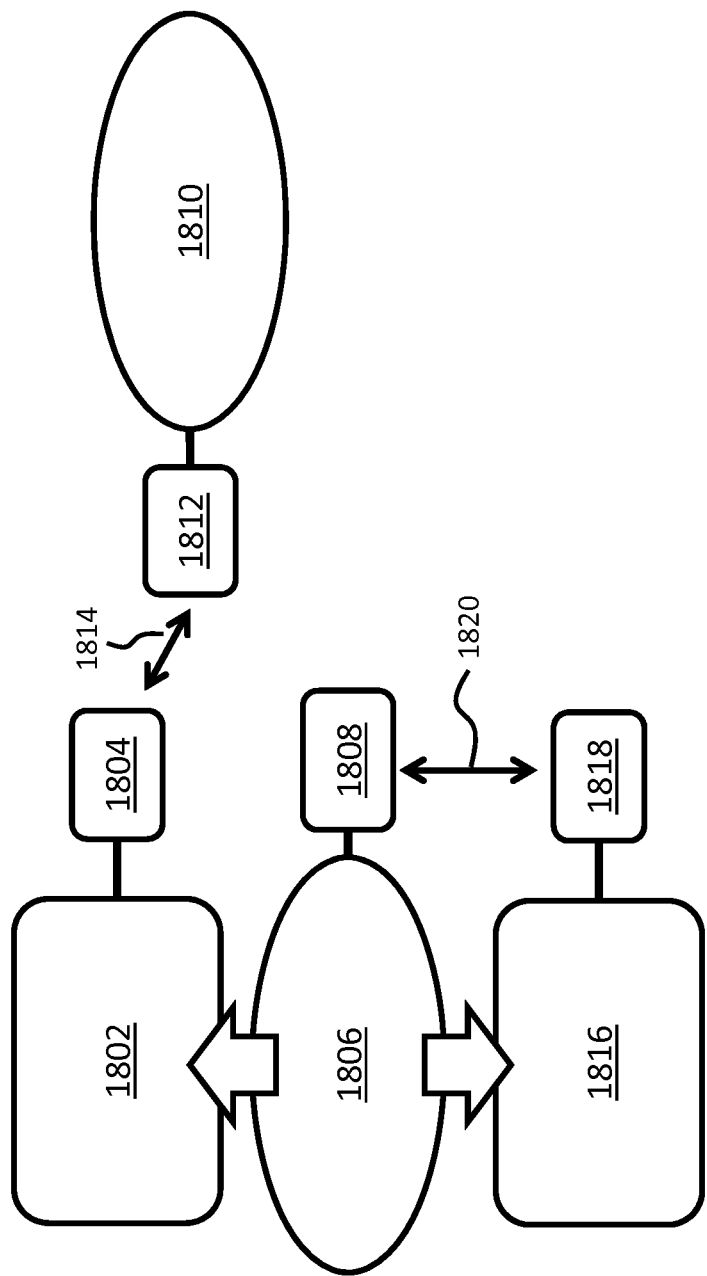
FIG. 18 is a diagram of communication and energy transfer in a multisource system.

For example, consider the arrangement of a wireless energy system shown in FIG. 18 comprising a two device resonators 1802, 1816 each with an out-of-band communication module 1804, 1818 respectively and two source resonators 1806, 1810 each with their own out-of-band communication modules 1808, 1812 respectively. The system may use the out-of-band communication channel to adjust and coordinate the energy transfer. The communication channel may be used to discover or find resonators in the proximity, to initiate power transfer, and to communicate adjustment of operating parameters such as power output, impedance, frequency, and the like of the individual resonators.

In some situations the device resonator may incorrectly communicate with one source but receive energy from another source resonator. The disparity between the energy transfer channel and the communication channel may create performance, safety, and reliability issues since the communication that is used to coordinate the energy transfer, i.e. communicate operating point adjustment of the resonators, may have no effect on the parameters of the wireless energy transfer channel.

In one instance a device resonator 1802 may be in close proximity with strong coupling to only one of the source resonators 1806 as shown in FIG. 18 with weak coupling to the other source resonator 1810 that is located further away from the device resonator 1802. In some instances, due to interference, obstruction, and the like the out-of-band communication signal may be not functioning for the source 1806 and device 1802 pair with the stronger coupling between the resonators used for energy transfer than for a source 1810 and device 1802 pair with the weaker coupling between the resonators. If another device 1816 initiates wireless energy transfer with the source 1806 the device 1802 may receive power from a source in close proximity 1806 while having an out of band communication channel 1814 with a source 1810 that is further away. Any attempt by the device 1802 to adjust the energy transfer will therefore by unsuccessful since the device 1802 does not have communication with the source from which it is receiving energy.

Due to this disconnect between the communication and control channel and the energy transfer channel other system level reliability and control problems may develop and may lead to security and stability vulnerabilities. There may be a need for a separate verification step of the wireless energy transfer channel. As those skilled in the art will recognize the example is just but one example that illustrates the need but many configurations and arrangements of the system may benefit from an explicitly or implicitly energy transfer verification step.

In embodiments, these potential problems may be avoided by providing an additional verification step that ensures that the energy transfer channel and the communication channels are used by a source or a device are associated with the same external source or device.

In embodiments the verification step may comprise information exchange or signaling of through the wireless energy transfer channel A verification step comprising communication or information exchange using the energy transfer channel, or fields of the energy transfer channel may be used to verify the corresponding accuracy of the out-of-band communication channel.

In embodiments with an out-of-band communication channel the verification step may be implicit or explicit. In some embodiments verification may be implicit. In embodiments an energy transfer channel may be implicitly verified by monitoring and comparing the behavior of the energy transfer channel to expected behavior or parameters in response to the out-of-band information exchange. An energy transfer channel may be implicitly verified by monitoring the behavior and parameters of the energy transfer channel in response to the out-of-band communication. For example, after an out-of-band communication exchange which is expected to increase energy transfer the parameters of the wireless energy transfer channel and resonators used for the wireless energy transfer may be monitored. An observed increase of delivered power at the device may used to infer that the out-of-band communication channel and the energy transfer channel are correctly identified.

In embodiments an implicit verification step may involve monitoring any number of the parameters of the wireless energy transfer or parameters of the resonators and components used in the wireless energy transfer. In embodiments the currents, voltages, impedance, frequency, efficiency, temperature, and the like may be monitored and compared to expected values, trends, changes and the like as a result of an out-of-band communication exchange.

In embodiments a source or a device unit may keep a table of measured parameters and expected values, trends, changes, to these parameters as a consequence of a communication exchange. A source of a device may store a history of communications and observed parameter changes that may be used to verify the energy transfer channel. In some cases a single unexpected parameter change due to a communication exchange may be not be conclusive enough to determine is the out-of-band channel is incorrectly paired. In some embodiments the history of parameter changes may be scanned or monitored over several or many communication exchanges to perform verification.

Figure 19B:
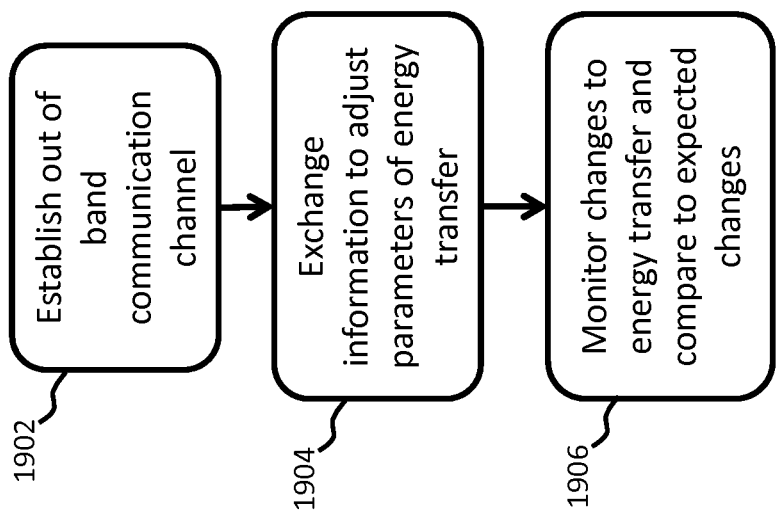
FIG. 19A and FIG. 19B are diagrams showing a method for energy verification.
Figure 19A:
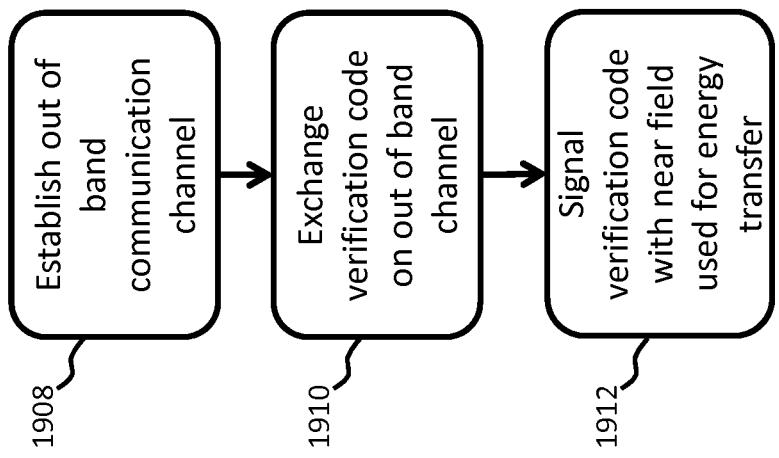

An example algorithm showing the series of steps which may be used to implicitly verify an energy transfer channel in a wireless energy transfer system using out-of-band communication is shown in FIG. 19A. In the first step 1902 an out-of-band communication channel between a source and a device is established. In the next step 1904 the source and device may exchange information as regarding adjusting the parameters of the wireless energy transfer or parameters of the components used for wireless energy transfer. The information exchange on the out-of-band communication channel may be a normal exchange used in normal operation of the system to control and adjust the energy transfer. In some systems the out-of-band communication channel may be encrypted preventing eavesdropping, impersonation, and the like. In the next step 1906 the source and the device or just a source or just a device may monitor and keep track of any changes to the parameters of the wireless energy transfer or any changes in parameters in the components used in the energy transfer. The tracked changes may be compared against expected changes to the parameters as a consequence of any out-of-band communication exchanges. Validation may be considered failed when one or many observed changes in parameters do not correspond to expected changes in parameters.

In some embodiments of wireless energy transfer systems verification may be explicit. In embodiments a source or a device may alter, dither, modulate, and the like the parameters of the wireless energy transfer or the parameters of the resonators used in the wireless energy transfer to communicate or provide a verifiable signal to a source or device through the energy transfer channel. The explicit verification may involve changing, altering, modulating, and the like some parameters of the wireless energy transfer or the parameters of the resonators and components used in the energy transfer for the explicit purpose of verification and may not be associated with optimizing, tuning, or adjusting the energy transfer.

The changing, altering, modulating, and the like some parameters of the wireless energy transfer or the parameters of the resonators and components used in the energy transfer for the purpose of signaling or communicating another wireless energy resonator or component may be referred to as in-band communication. In-band communication may be characterized by its use of the fields or structures used for energy transfer. In embodiments, the in-band communication channel may be implemented as part of the wireless energy transfer resonators and components by modulating the parameters of the magnetic fields or the resonators used for wireless energy transfer. Information may be transmitted from one resonator to another by changing the parameters of the resonators. Parameters such as inductance, impedance, resistance, and the like may be dithered or changed by one resonator. These changes in impedance may affect the impedance, resistance, or inductance of other resonators around the signaling resonator. The changes may manifest themselves as corresponding dithers of voltage, current, and the like on the resonators which may be detected and decoded into messages. In embodiments in-band communication may involve altering, changing, modulating, and the like the power level, frequency, and the like of the magnetic fields used for energy transfer.

In one embodiment the explicit in-band verification may be performed after an out-of-band communication channel has been established. Using the out-of-band communication channel a source and a device may exchange information as to the power transfer capabilities and in-band signaling capabilities. Wireless energy transfer between a source and a device may then be initiated. The source or device may request or challenge the other source or device to signal using the in-band communication channel to verify the connection between the out-of-band and communication channel and the energy transfer channel. The channel is verified when the agreed signaling established in the out-of-band communication channel is observed at the in-band communication channel.

In embodiments verification may be performed only during specific or pre-determined times of an energy protocol such as during energy transfer startup. In other embodiments explicit verification step may be performed periodically during the normal operation of the wireless energy transfer system. The verification step may be triggered when the efficiency or characteristics of the wireless power transfer change which may signal that the physical orientations have changed. In embodiments the communication controller may maintain a history of the energy transfer characteristic and initiate a verification of the transfer that includes signaling using the resonators when a change in the characteristics is observed. A change in the energy transfer characteristics may be observed in the efficiency of the energy transfer, in the impedance, voltage, current, and the like of the resonators, or components of the resonators and power and control circuitry.

Those skilled in the art will appreciate a signaling and communication channel capable of transmitting messages may be secured with any number of encryption, authentication, and security algorithms. In embodiments the out-of-band communication may be encrypted and the secured communication channel may be used to transmit random sequences for verification in the in-band channel. In embodiments the in-band communication channel may be encrypted, randomized, or secured by any known security and cryptography protocols and algorithms. The security and cryptography algorithms may be used to authenticate and verify compatibility between a source and device and may use a public key infrastructure (PKI) and secondary communication channels for authorization and authentication.

In embodiments of energy transfer system between a source and a device a device may verify the energy transfer channel to ensure it is receiving energy from the desired or assumed source. A source may verify the energy transfer channel to ensure energy is being transferred to the desired or assumed source. In some embodiments the verification may be bidirectional and a source and device may both verify their energy transfer channels in one step or protocol operation.

An example algorithm showing the series of steps which may be used to explicitly verify an energy transfer channel in a wireless energy transfer system using out-of-band communication is shown in FIG. 19B. In the first step 1908 an out-of-band communication channel between a source and a device is established. In the next step 1910 the source and device may coordinate or agree on a signaling protocol, method, scheme, and the like that may be transmitted through the wireless energy transfer channel. To prevent eavesdropping and provide security the out-of-band communication channel may be encrypted and the source and device may follow any number of known cryptographic authentication protocols. In a system enabled with cryptographic protocols the verification code may comprise a challenge-response type exchange which may provide an additional level of security and authentication capability. A device, for example, may challenge the source to encrypt a random verification code which it sends to the source via the out-of-band communication channel using a shared secret encryption key or a private key. The verification code transmitted in the out-of-band communication channel may then be signaled 1912 through the in-band communication channel. In the case where the source and device are enabled with cryptographic protocols the verification code signaled in the in-band communication channel may be encrypted or modified by the sender with a reversible cryptographic function allowing the receiver to further authenticate the sender and verify that the in-band communication channels are linked with the same source or device associated with the out-of-band communication channel.

In situations when the verification fails a wireless energy transfer system may try to retry validation. In some embodiments the system may try to re-validate the wireless energy transfer channel by exchanging another verification sequence for resignaling using the in-band communication channel. In some embodiments the system may change or alter the sequence or type of information that is used to verify the in-band communication channel after attempts to verify the in-band communication channel have failed. The system may change the type of signaling, protocol, length, complexity and the like of the in-band communication verification code.

In some embodiments, upon failure of verification of the in-band communication channel and hence the energy transfer channel, the system may adjust the power level, the strength of modulation, frequency of modulation and the like of the signaling method in the in-band communication channel. For example, upon failure of verification of a source by a device the system may attempt to perform the verification at a higher energy transfer level. The system may increase the power output of the source generating stronger magnetic fields. In another example, upon failure of verification of a source by a device the source that communicated the verification code to the device by changing the impedance of its source resonator may increase or even double the amount of change in the impedance of the source resonator for the signaling.

In embodiments upon failure of verification of the energy transfer channel the system my try to probe, find, or discover other possible sources or devices using the out-of-band communication channel. In embodiments the out-of-band communication channel may be used to find other possible candidates for wireless energy transfer. In some embodiments the system may change or adjust the output power or the range of the out-of-band communication channel to help minimize false pairings.

The out-of-band communication channel may be power modulated to have several modes, long range mode to detect sources and a short range or low power mode to ensure the communication is with an another device or source that is in close proximity. In embodiments the out-of-band communication channel may be matched to the range of the wireless channel for each application. After failure of verification of the energy transfer channel the output power of the out-of-band communication channel may be slowly increased to find other possible sources or devices for wireless energy transfer. As discussed above, an out-of-band communication channel may exhibit interferences and obstructions that may be different from the interferences and obstructions of the energy transfer channel and sources and devices that may require higher power levels for out-of-band communication may be in close enough proximity to allow wireless energy transfer.

In some embodiments the out-of-band communication channel may be directed, arranged, focused using shielding or positioning to be only effective in a confined area (i.e., under a vehicle), to ensure it is only capable of establishing communication with another source or device that is in close enough proximity, position, and orientation for energy transfer.

In embodiments the system may use one or more supplemental sources of information to establish an out-of-band communication channel or to verify an in-band energy transfer channel. For example, during initial establishment of an out-of-band communication channel the locations of the sources or devices may be compared to known or mapped locations or a database of locations of wireless sources or devices to determine the most probable pair for successful energy transfer. Out-of-band communication channel discovery may be supplemented with GPS data from a GPS receiver, data from positioning sensors and the like.

Photovoltaic (PV) Panels with Wireless Energy Transfer

We describe a system that may use a source resonator, and a capture resonator, to wirelessly transfer power from an exterior solar PV panel to an interior capture module or to other solar PV panels. In embodiments a solar PV panel has one or more resonators that transfer the solar generated power from the solar PV panel to one or more resonators that may be part of another solar PV panel, or may be inside a building, vehicle, boat, and the like, or part of a mounting structure of the panel.

In embodiments one or more resonators may be integrated into the solar PV panel assembly. Resonators may be integrated into the perimeter of the panel or they may be designed to fit under the photovoltaic element of the panel. The resonators may be designed and oriented to generate a magnetic field that is substantially perpendicular to the plane of the PV panel to allow efficient coupling with resonators that may be placed behind the panel. In embodiments the integrated resonators in the PV panel may be designed and positioned such that the magnetic field is substantially parallel to the surface of the panel allowing efficient coupling with like resonators that are on the sides of the panel. In other embodiments resonators may be designed and oriented to generate a magnetic field that is substantially omnidirectional. In embodiments with integrated resonators, no physical or direct electrical contacts are required.

Figure 20:
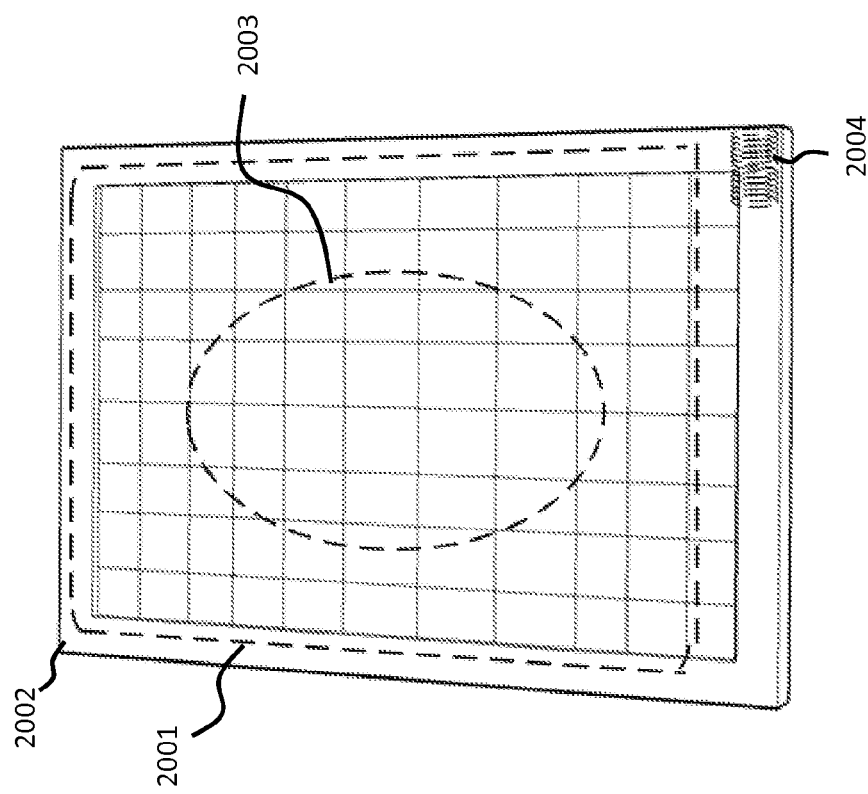
FIG. 20 is a diagram of a solar PV panel with several integrated resonators.

FIG. 20 shows a diagram of a rectangular PV panel 2002 with outlines of three integrated resonators showing several possible resonator orientations and locations. A resonator may be integrated into the perimeter 2001 of the panel. Resonators may be placed inside the or behind the PV panel in any location 2003 and may have various sizes and orientations such as the resonator 2004 which is oriented such that the magnetic field is directed out of the corner of the panel. Although not shown in the figure, the resonators may include appropriate shielding and magnetic field guides to reduce perturbations and loses from the resonators.

Figure 21:
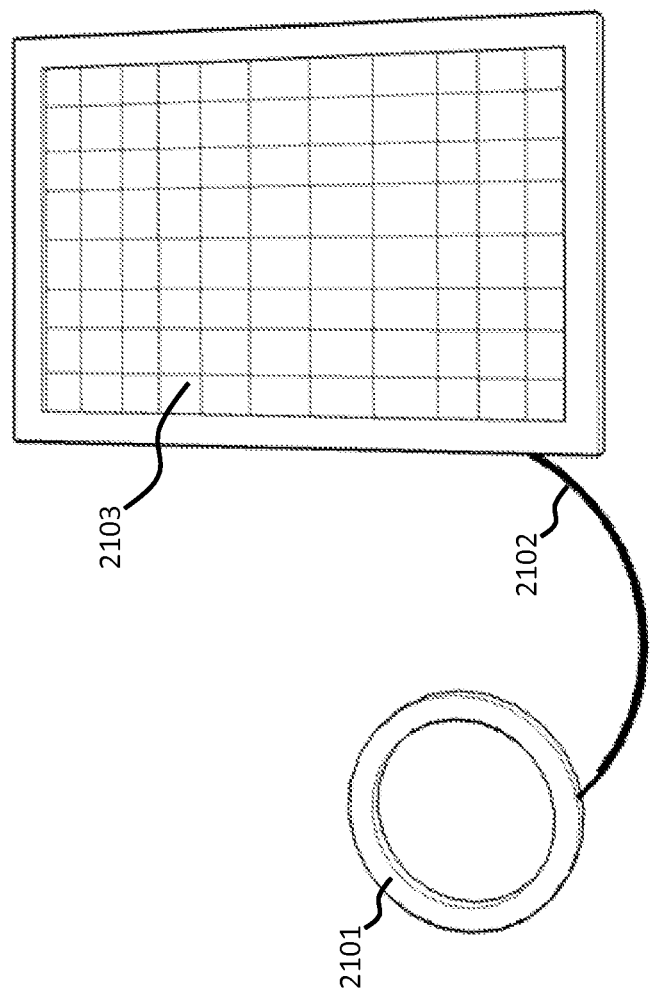
FIG. 21 is a diagram of a solar PV panel with an external resonator attached by a cable.

In embodiments a resonator of the PV panel may be outside of the main panel body assembly. A cable or a wired connector may attach the PV panel to the resonator. In this embodiment the location and orientation of the resonator may be chosen and altered independently of the position of the PV panel and may allow more flexibility in mounting and positioning of the system. In this embodiment the resonator of the PV panel may be aligned with the receiving resonator without having to move the PV panel. FIG. 21 shows an embodiment of a PV panel 2103 with an external resonator 2101 that is wired 2102 to the PV panel.

In embodiments a PV panel may contain more than one resonator. A PV panel may contain one or more internal resonators and may have one or more external resonators. The resonators may be aligned and positioned in different orientations to allow energy transfer to resonators places in various orientations and positions relative to the PV panel. In embodiments multiple resonators of the PV panel may be used simultaneously to transfer and receive power from other resonators. For example, one resonator of a PV panel may be used to receive power from another PV panel and use one of its other resonators to transfer power to a device or a resonator inside a building. A PV panel system may employ various panel designs each with possibly different resonator configurations.

In panels with integrated resonators the panels may not require any holes, feedthroughs, wiring, or connectors. Electronics that control the PV panel and the resonators may all be integrated into the panel. The panel can thus be made completely enclosed and waterproof providing complete protection against moisture, dust, dirt, insects, and the like. In some embodiments the enclosure of the PV panel may preferably be composed partially or completely of magnetically permeable materials to allow efficient magnetic coupling and minimize losses in the energy transfer. In some embodiments, magnets may be used to hold PV panels comprising magnetically permeable materials in place. The PV panels may be of any size, shape, and dimension and are not limited to the geometries pictured. Resonators and PV panels may be of any geometry, for example they may be shaped to follow the contours of a vehicle. Resonators and PV panels may be flexible or hinged and may be designed such that they can be rolled into a tube or folded when not in use.

In accordance with the presence invention power may be wirelessly transferred from the PV panel resonators to resonators powering devices or to resonators that are coupled to the electrical network of a building, vehicle, and the like.

In one embodiment, PV panels with resonators may be used to directly and wirelessly power devices. Devices capable of coupling to the magnetic resonators of the PV panels can wirelessly receive energy to power their electronics or recharge batteries. Device resonators can be tuned to couple to the resonators of the PV panels. PV panels with integrated or external resonators for wireless power transfer may be deployed in many environments and applications. The PV panel may be attached or placed either permanently or temporarily on vehicles, buildings, tool boxes, planes, and other structures to provide wireless power from solar energy. With wireless power transfer no wiring is required to connect devices to the PV panel and hence the PV panel can be easily installed or placed in areas that require power.

Figure 22:
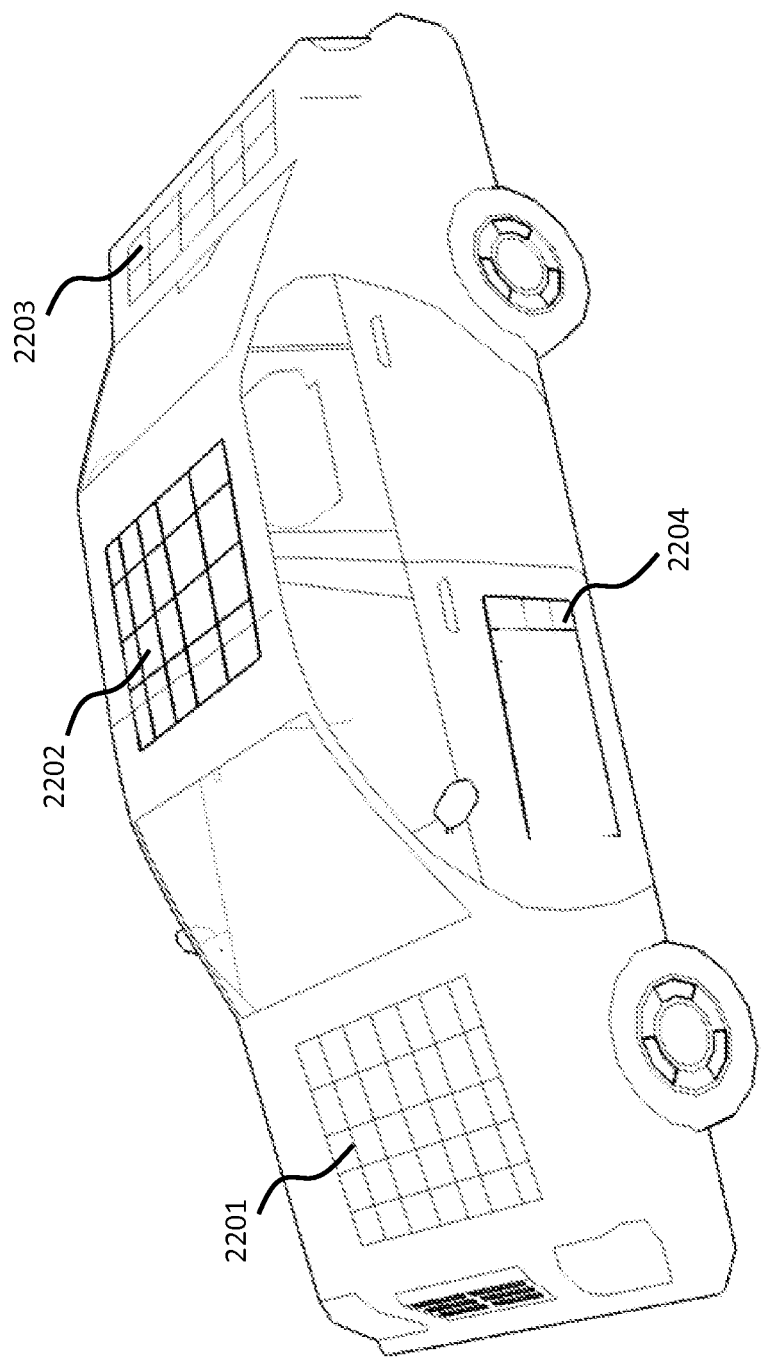
FIG. 22 is a diagram of a vehicle with solar PV panels with wireless power transfer.

For example, as shown in FIG. 22 a PV panel with the described wireless power transfer resonators may be attached to the roof 2202, trunk 2203, side panel 2204, or hood 2201 of a vehicle. The energy from the PV panel may be wirelessly transferred through the roof, trunk, side panel, or hood of the vehicle by the resonator of the PV panel into the vehicle to power or charge electronics within the vehicle. Devices with resonators can directly couple to the resonator of the PV panel and receive power. Devices such as mobile handsets, laptops, gaming consoles, GPS devices, electric tools, and the like can be charged or power wirelessly by energy derived from solar power despite the devices being in a dark, enclosed space of a vehicle without requiring wiring. PV panels with wireless power transfer may be attached to the top or above the bed of a pick-up truck for example, allowing wireless charging of batteries or battery powered tools that may be stored in the back of the truck.

In another example, PV panels may be mounted on the exterior of a car. A capture resonator inside the vehicle, under the roof, the hood, or the trunk of the vehicle that is coupled to the electrical system of the vehicle can capture the energy from the resonator of the PV panel. The solar energy can be used to power the vehicle, recharge batteries, or power other peripherals of the vehicle. With wireless power transfer the PV panels can be installed or retrofitted to the vehicle without having to make any hard-wired connections between the panel and the vehicle simplifying the installation and allowing quick removal if necessary.

Figure 23:
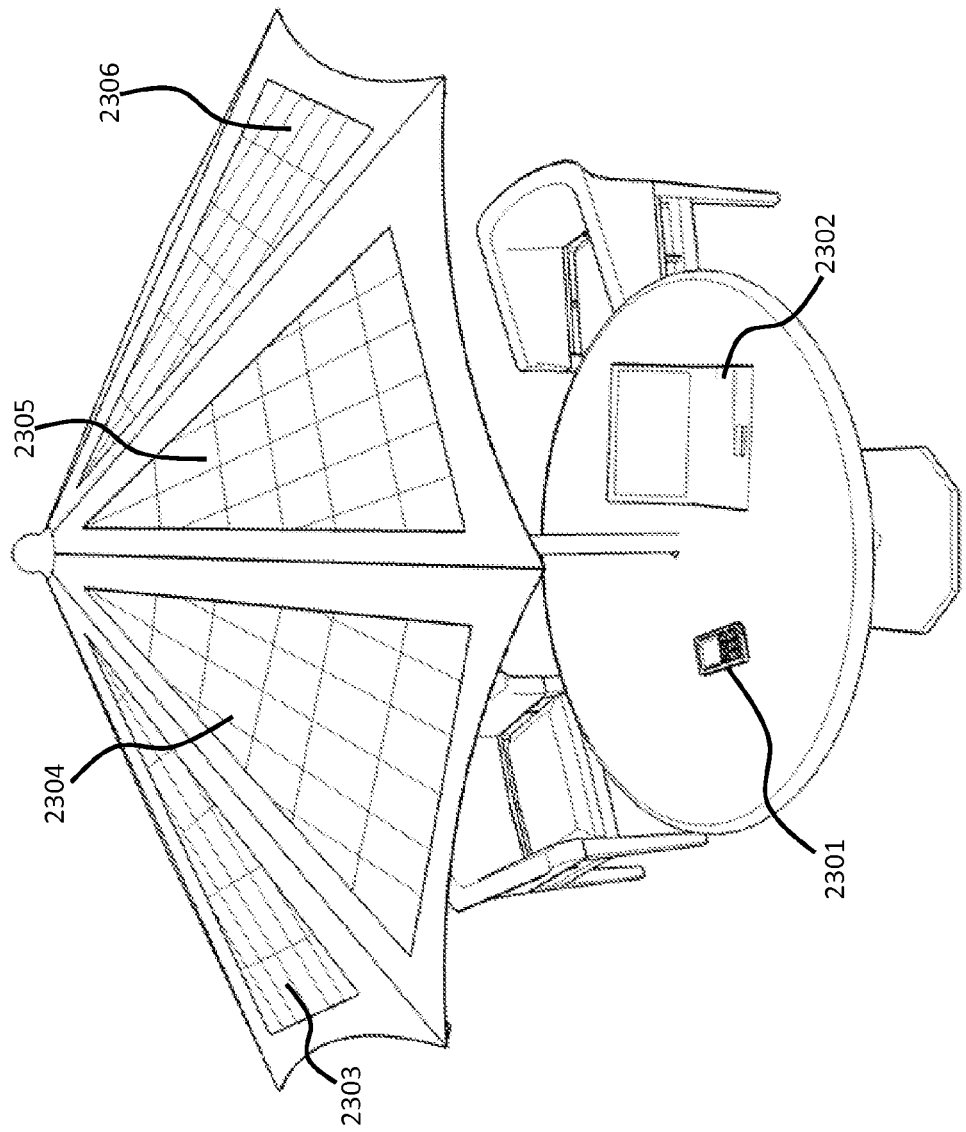
FIG. 23 is a diagram of a sun umbrella with solar PV panels with wireless power resonators that can provide power to devices under the umbrella.

In another example, PV panels with wireless power transmission may be integrated into the top of an awning or a sun umbrella as shown in FIG. 23. PV panels on top of an umbrella 2303, 2304, 2305, 2306 with internal or external resonators may transfer power to enabled devices such as laptops 2302 or mobile handsets 2301 that are located the shade below the umbrella or awning.

In other embodiments, PV panels with wireless power transfer may be used transfer power to a resonator that is directly coupled to a wired power distribution or electrical system of a house, vehicle, and the like without requiring any direct contact between the exterior PV panels and the internal electrical system. For example, a solar PV panel with the above described resonators may be mounted directly onto the exterior of a building, vehicle, and the like. A resonator may be mounted inside the building, vehicle, and the like which can be connected to the electrical system of the structure. The resonator on the interior can receive power from the PV panels on the exterior and transfer the energy to the electrical system of the structure allowing powering of devices connected to the power system. In embodiments, the power received by the resonator from the PV panels can be conditioned in a way that allows it to be transferred to the electrical grid. For example, one or more capture resonators may provide electrical power to an inverter, said inverter then providing power to the electrical grid.

Figure 24:
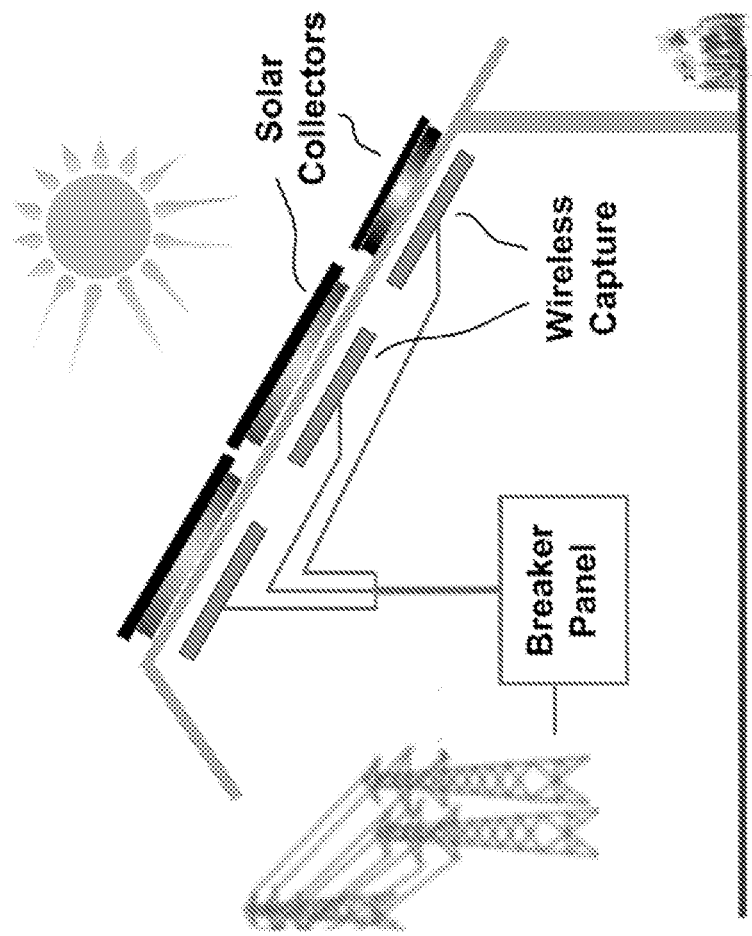
FIG. 24 is a diagram of an embodiment of rooftop solar PV panels with wireless power transfer.

For example, as shown in a diagram in FIG. 24, PV panels with wireless power transfer may be mounted on the exterior roof of a building. A resonator that is coupled to the electrical system of the building may be mounted on the interior underside of the roof behind the PV panel. Power may be transferred from the exterior PV panel to the interior electrical system of the building without requiring any drilling or penetration of the exterior of the building for wiring. Solar power from the PV panels may then be utilized by electric devices connected to the wired electrical system of the building. Captured electrical energy from the PV panels may also be provided to a breaker panel which may be attached to the electrical grid.

PV panels with wireless power transfer may simplify installation and connection of multiple PV panels. Wireless power transfer may be utilized for connection and capture power from several PV panels that may be part of a system.

Figure 25:
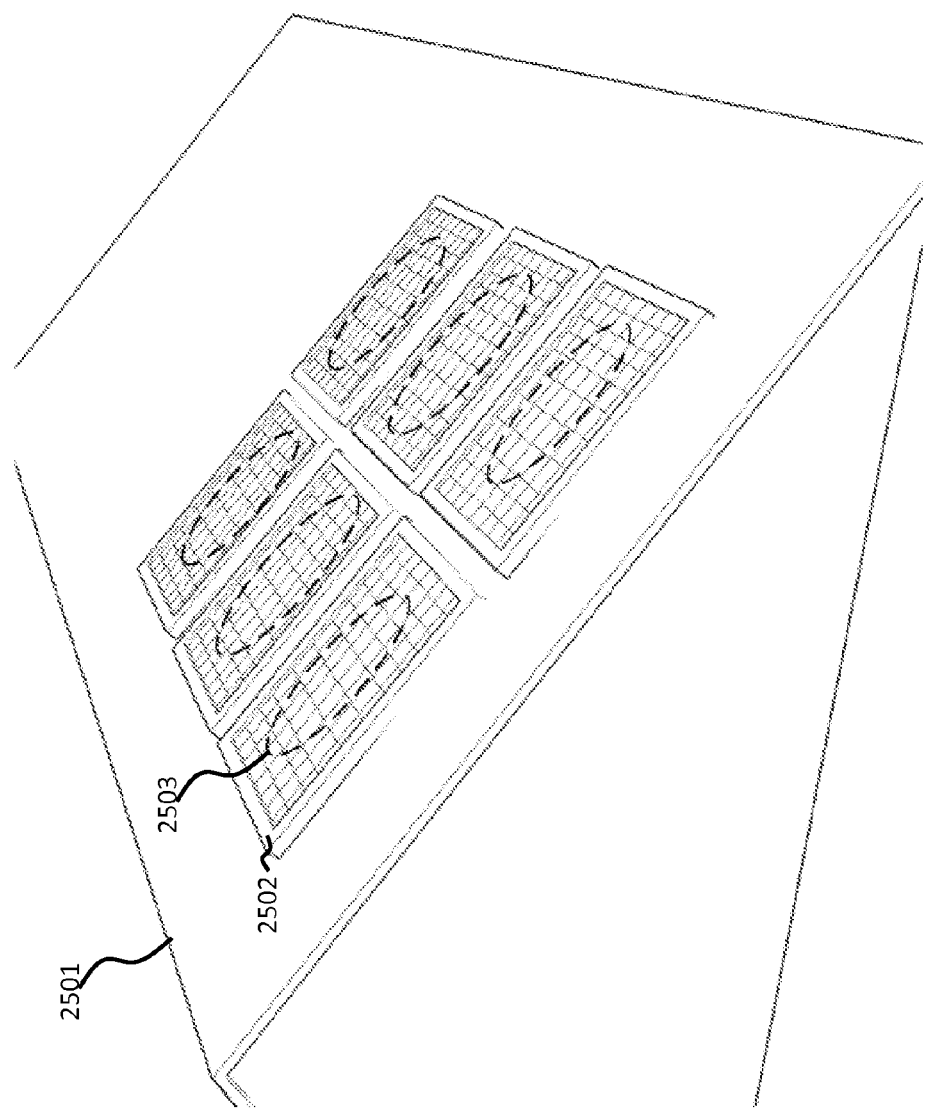
FIG. 25 is a diagram of a rooftop solar PV panel system with independent resonators.

In one embodiment with multiple PV panels, each panel may have one or more resonators that transmit power to a device or to a corresponding resonator that is coupled to a wired electric system. PV panels placed on the exterior roof of a building, for example, may each have a corresponding capture resonator on the interior of the building that is coupled to electrical system. PV panels placed on the exterior of a car, for example, may each power couple to various device resonators inside the vehicle. In such embodiments each PV panel is independent of other PV panels. A diagram of an example rooftop configuration of such a system is shown in FIG. 25. Each PV panel 2502 in the figure has resonators 2503 that can transmit energy directly through the roof 2501 to a resonator mounted inside the building (not shown).

Figure 26:
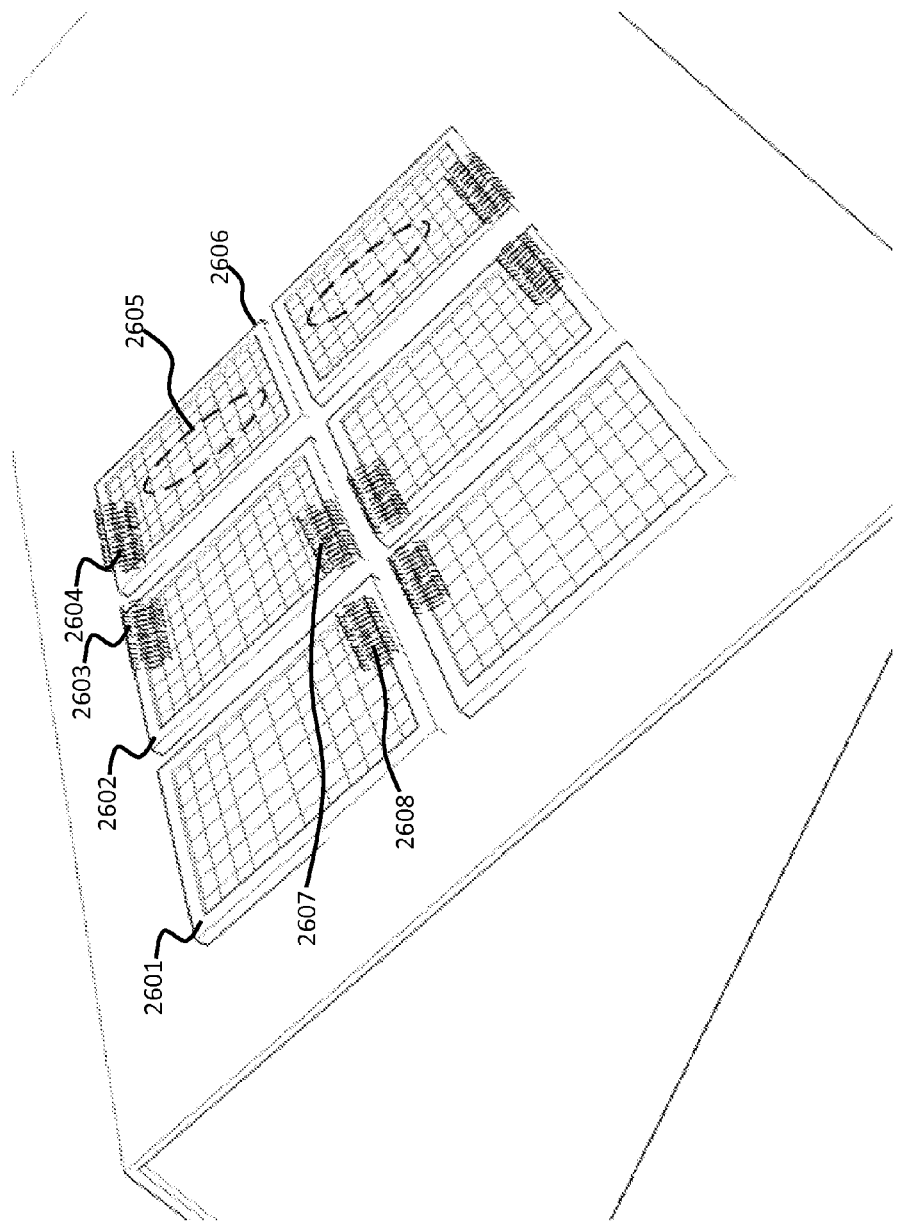
FIG. 26 is a diagram of a rooftop solar PV panel system with wireless power transfer between panels.

In another embodiment with multiple PV panels, the panels may utilize wireless power transfer between each other to transfer or collect power to/from one or more of designated panels. In this embodiment only a few designated panels are able to transmit power to devices or resonators that are coupled to an electrical system. The energy is gathered and transmitted in one or several points. In such embodiments adjacent PV panels are dependent on each other, but may be easily installed or replaced when faulty since no wiring between panels or electrical system is required. A diagram of an example rooftop configuration of such a system is shown in FIG. 26. One or more panels 2606 have resonators 2605 that can transfer energy to a resonator inside the building. Energy from other resonators may be transferred wirelessly from panel to panel until it reaches the panel that is capable of transmitting the energy into the building. For example in FIG. 26, panel 2601 may transfer energy to its adjacent panel 2602 via their coupled resonators 2607, 2608. Likewise panel 2602 may transfer its energy and the energy from panel 2601 to panel 2606 via coupled resonators 2603, 2604. Panel 2606 may then transfer the energy originating from panels 2601, 2602, 2606 to a resonator inside the building (not shown).

Figure 27:
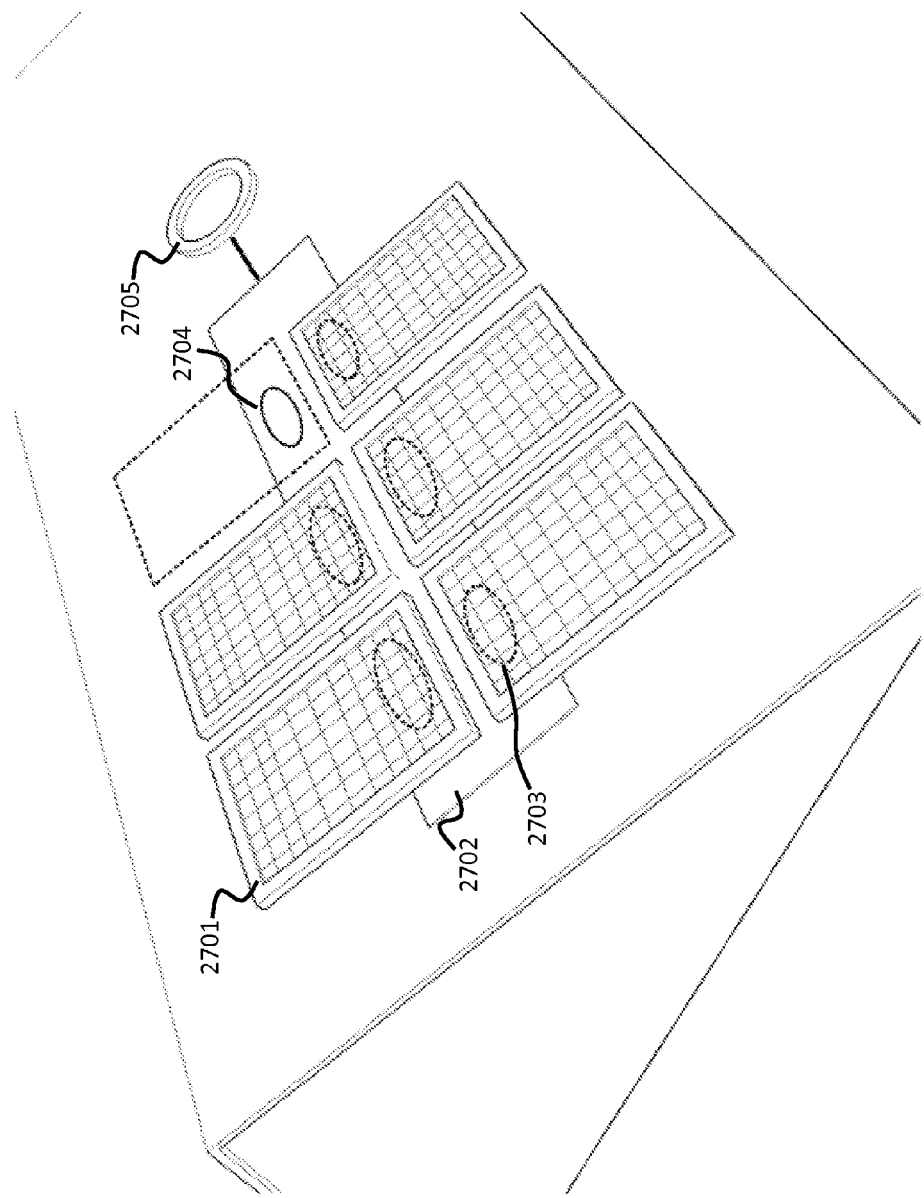
FIG. 27 is a diagram of a rooftop solar PV panel system with a connecting strip that wirelessly transfers power from several solar PV panels to one resonator.

In another embodiment with multiple PV panels, an additional connection structure that wirelessly receives power from multiple panels can be used. A structure of resonators may be mounted into a mounting strip that is placed beneath or next to PV panels. Resonators of the PV panel may wirelessly transfer their energy to the resonators on the strip. One or a few resonators connected to the strip can be used to transfer the power from all the panels to devices or to an interior resonator coupled to an electronic system. In such a system, once a resonator strip is installed panels may be removed or added to the system by securing the panels on or near the connection structure. A diagram of an example rooftop configuration of such a system is shown in FIG. 27. A structure of resonators 2702, shaped as a flat elongated strip may be attached to the roof of a building. A PV panel 2701 with a resonator 2703 may transfer energy to the strip. The strip may then use a single resonator 2705 that is coupled to a resonator inside the building (not shown) to transfer the energy of all the panels to the interior without any wires. A panel may be added or removed from the system by simply placing the panel on top of the strip.

In yet another embodiment multiple panels can be physically wired together to a resonator that can transmit their power wirelessly to devices wired or coupled to other resonators on the interior of a building or vehicle.

With all of the above configurations using wireless power transfer, significantly simpler installation of PV panels is possible because power may be transmitted wirelessly from the panel to a capture resonator in the building or vehicle, eliminating all outside wiring, connectors, and conduits, and any holes through the roof or walls of the structure. Wireless power transfer used with solar cells may have a benefit in that it can reduced roof danger since it eliminates the need for electricians to work on the roof to interconnect panels, strings, and junction boxes. Installation of solar panels integrated with wireless power transfer may require less skilled labor since fewer electrical contacts need to be made. Less site specific design may be required with wireless power transfer since the technology gives the installer the ability to individually optimize and position each solar PV panel, significantly reducing the need for expensive engineering and panel layout services.

With wireless power transfer, PV panels may be deployed temporarily, and then moved or removed, without leaving behind permanent alterations to the surrounding structures. They may be placed out in a yard on sunny days, and moved around to follow the sun, or brought inside for cleaning or storage, for example. For backyard or mobile solar PV applications, an extension cord with a wireless energy capture device may be thrown on the ground or placed near the solar unit. The capture extension cord can be completely sealed from the elements and electrically isolated, so that it may be used in any indoor or outdoor environment.

With wireless power transfer no wires or external connections may be necessary to the PV solar panels and they can be completely weather sealed. Significantly improved reliability and lifetime of electrical components in the solar PV power generation and transmission circuitry can be expected since the weather-sealed enclosures can protect components from UV radiation, humidity, weather, dust, and the like. With wireless power transfer and weather-sealed enclosures it may be possible to use less expensive components since they will no longer be directly exposed to external factors and weather elements and it may reduce the cost of PV panels. Likewise PV panels with wireless power transfer can be more generic and more portable since the PV panels do not require a fixed hardwired connection.

In embodiments power transfer between the PV panels and the capture resonators inside a building or a vehicle may be bidirectional. Energy may be transmitted from the house grid to the PV panels to provide power when the panels do not have enough energy for self calibration, alignment, or maintenance tasks. Reverse power flow can be used to power heating elements that can melt snow from the panels, or power motors that will position the panels in a more favorable position with respect to the light source. Once the snow is melted or the panels are repositioned energy can be transfer from the PV panels.

In some embodiments, the source electronics that are coupled to the source resonator may comprise at least one half-bridge or full-bridge switching amplifier. The capture electronics that are coupled to the capture resonator may comprise at least one half-bridge or full-bridge rectifier further comprising power transistors. These embodiments allow wireless power transfer from an energy source connected to the source electronics to be delivered to a load connected to the capture electronics. Note that both the source and capture electronics employ half-bridge or full-bridge switching circuits. Therefore, these embodiments also allow wireless power transfer in the reverse direction where an energy source that is connected to the capture electronics can transfer energy to a load connected to the source electronics. This enables, for example, transferring and retrieving energy wirelessly from an energy storage medium such as a battery, fly wheel, capacitor, inductor, and the like. It also enables reverse power flow to a wirelessly enabled PV panel for melting snow, as described above.

The resonators and the wireless power transfer circuitry may include tuning and safety mechanisms. In embodiments PV panels with wireless power transfer may include auto-tuning on installation to ensure maximum and efficient power transfer to the wireless collector. For example, variations in roofing materials or variations in distances between the PV panels and the wireless power collector in different installations may affect the performance or perturb the properties of the resonators of the wireless power transfer. To reduce the installation complexity the wireless power transfer components may include a tuning capability to automatically adjust their operating point to compensate for any effects due to materials or distance. Frequency, impedance, capacitance, inductance, duty cycle, voltage levels and the like may be adjusted to ensure efficient and safe power transfer.

Figure 28A:
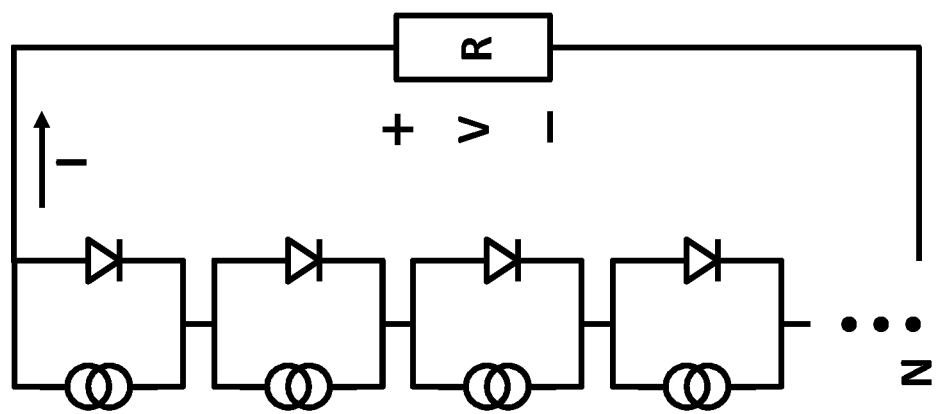
FIG. 28A shows a circuit model for a series of PV panels and FIG. 28B shows typical PV panel operating characteristics.
Figure 28B:
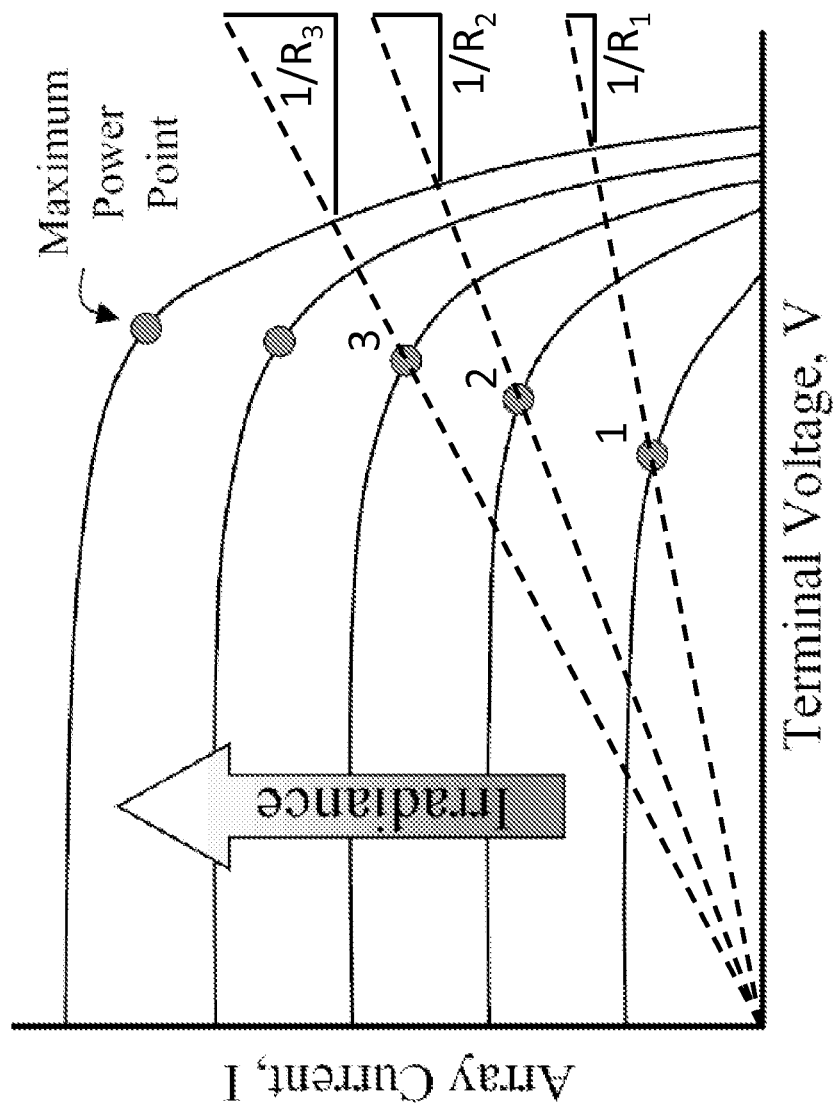

The resonators and wireless power transfer circuitry may include tuning that ensures maximum power extraction from the PV panels as well as efficient wireless transfer of the extracted power. In embodiments, the wireless power transfer circuitry may be configured for energy transfer between resonators while also applying an equivalent load resistance to a PV panel for optimal energy extraction. Such a wireless source can efficiently transfer energy from a PV panel to a wireless capture device over a wider range of environmental conditions than is currently possible. For example, as the solar illumination level (or equivalently irradiance) increases during the morning, the impedance applied to the output of the PV panel would decrease in a manner that maximizes power extraction from the PV panel. Such a wireless energy source is referred to herein as a "wireless energy maximum power point tracker (WEMPPT)." For example, FIG. 28A depicts a solar panel comprising a plurality of photovoltaic junctions connected in series. For simplicity, each photovoltaic junction is represented by the parallel combination of a current source and a diode. A more realistic model would include series and shunt resistances, diode variations, and the like. The voltage V and current I generated by the panel depend, in part, on the solar irradiance, and on the equivalent resistance R presented to the output of the panel. FIG. 28B shows several exemplary curves for parametric variation of R and different solar illumination levels. Also depicted in FIG. 28B are the points on the curves where the maximum power can be extracted from the PV panel by a given load resistance R. This is the value of R that a maximum power point tracker (MPPT) should present to the panel.

Figure 29:
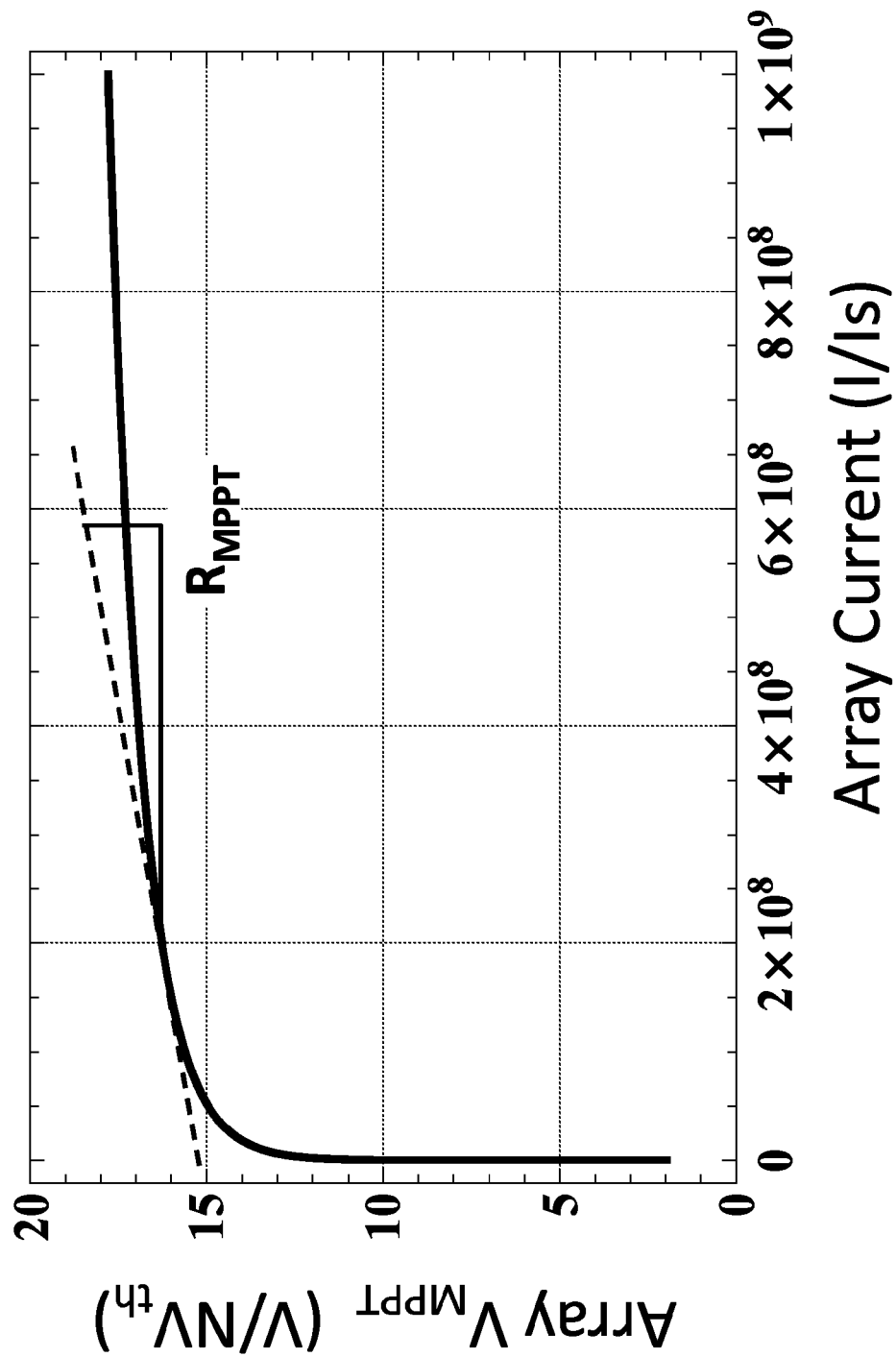
FIG. 29 shows a plot of array voltage versus array current.
Figure 30:
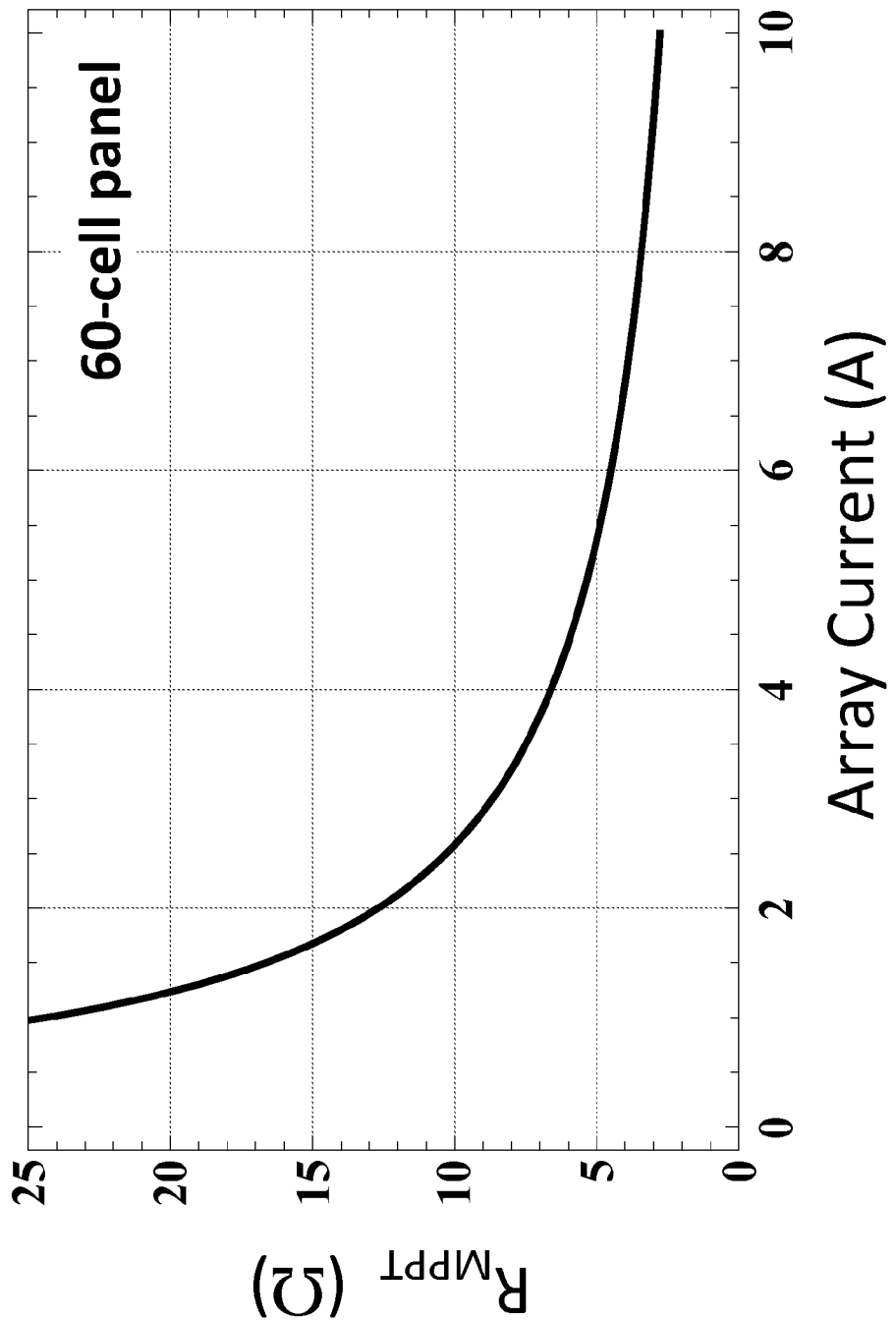
FIG. 30 shows PV panel resistance and current characteristics.

For the circuit model depicted in FIG. 28A, the current flowing into the resistance R $$I_{solar} - I_s\left(e^{\frac{V}{NV_{th}}} - 1\right),$$

where $I_{solar}$ is the solar-generated current, V is the voltage across the panel, N is the number of cells in the panel, $I_s$ is the reverse saturation current, and $V_{th}$ is approximately 0.026 V at a temperature of 25 C. The power extracted from the panel that can be wirelessly transferred is simply $V \times I_{solar}$. The root of the derivative of power with respect to V, results in the maximum power point voltage:

$$V_{MPPT} = NV_{th}[W(e(I_{solar}+I_s)/I_s)-1], \quad (4)$$

where W(z) is the Lambert W-function or product-log function, defined by inverse function for $z=W(z)e^{w(z)}$. FIG. 29 shows a plot of the maximum power point voltage as a function of the PV panel or array current. For this example, the resistance for maximum power that should be presented by the WEMPPT to the PV panel is the slope of the curve shown in FIG. 29. FIG. 30 shows this resistance and how it varies with solar illumination for an exemplary panel with 60 cells, 1 m² area, and room temperature operation. For example, with 1 kW/m² irradiance, the array current would be approximately 8 A and the optimum resistance would be 4Ω. If the irradiance were to drop to 0.2 kW/m² then the optimum resistance would be 12.5Ω. In one embodiment, a wireless power source may only present a fixed resistance to the PV panel. A loss of efficiency may then occur. For the example above, the efficiency at 0.2 kW/m² irradiance would be more than a factor of four lower than for 1 kW/m²—which would result in more than a factor of 20 reduction in extracted power. In another embodiment, using the WEMPPT configuration would preserve the efficiency for the irradiances in the example so that the extracted power is substantially proportional to the solar irradiance.

Figure 31A:
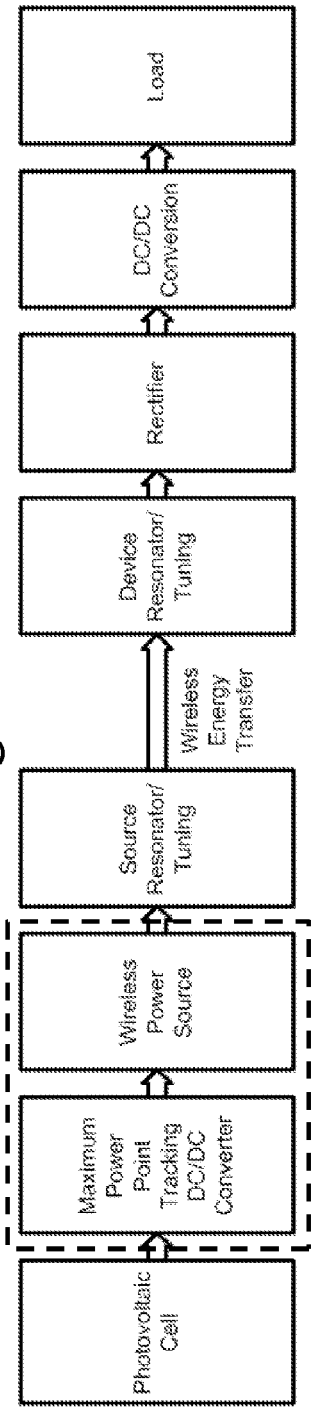
FIGS. 31A-31C shows block diagrams of wireless energy transfer systems adapted for a PV panel.
Figure 31B:
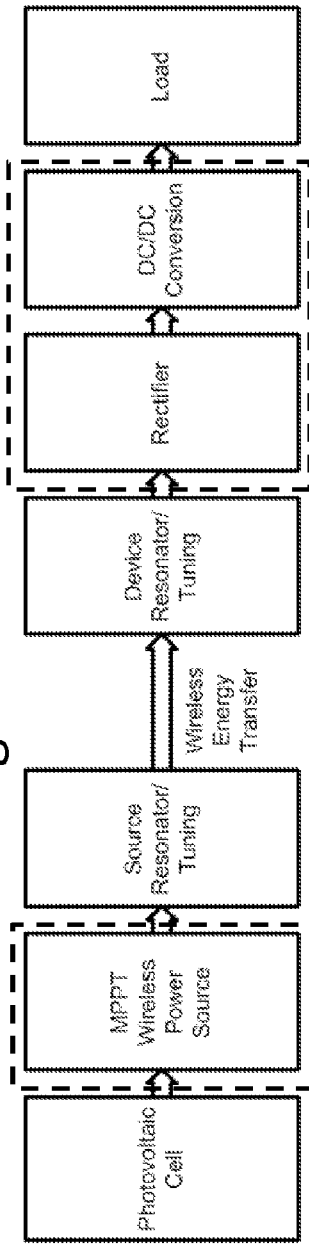
Figure 31C:
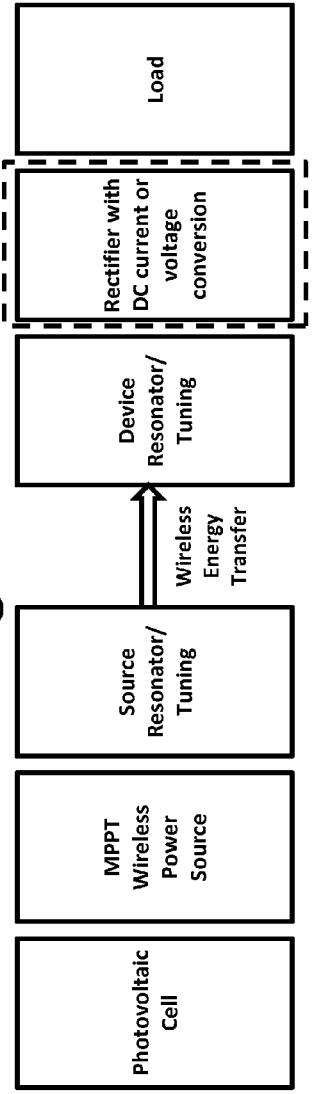

In embodiments, a wireless energy source can be connected to the output of a conventional MPPT circuit that may include a DC-to-DC converter and that is connected to a PV panel. FIG. 31A shows one such embodiment. In this embodiment loss of system efficiency may occur because of power dissipation in both the MPPT circuit and the wireless energy source. FIG. 31B shows a more efficient embodiment where a wireless energy source can mimic the behavior of a separate MPPT circuit without incurring the additional efficiency loss of a separate MPPT circuit. FIG. 31C shows another embodiment where a wireless energy capture circuit provides efficient wireless energy capture as well as a controlled output level of current or voltage. In embodiments, such a circuit, labeled "Rectifier with DC current or voltage conversion" in FIG. 31C, can be realized with a half-bridge or full-bridge switching circuit. In embodiments, the rectifier adjusts the duty cycle and/or the phase angle of the PWM waveform in the device (and/or the source) to affect wireless energy capture and voltage or current regulation. The rectifier may also adjust the switching times of the switches relative to the oscillating current flowing through the device resonator to efficiently capture wireless energy and also maintain voltage or current control.

PV panels with WEMPPTs may simplify installation of strings of panels where different panels in the string experience different levels of irradiance or different environmental conditions. Strings of series-connected PV panels are useful for developing higher output voltage than a single panel can provide. A high output voltage may be more compatible with load devices such as grid-tied inverters, off-grid inverters, charge controllers for battery chargers, and the like. In embodiments, a plurality of PV panels, each with an associated WEMPPT, may be placed on a roof top or other external surface and exposed to illumination of varying levels between panels. Under the roof or at the internal surface, a plurality of energy capture devices may receive wireless energy from the sources and have their outputs combined. FIG. 32 depicts an embodiment where the outputs of device resonators 3224, 3226, 3228, 3230, 3232 receiving wireless energy from source resonators of the PV cells 3202, 3204, 3206, 3208, 3210 are combined into a string under the roof. In embodiments, the outputs of the capture devices are combined in series to boost the net voltage. In embodiments, the capture devices include current or voltage regulation 3212, 3214, 3216, 3218, 3220 and their outputs are combined in series to create a higher voltage with a regulated current or voltage 3222. In embodiments, the capture devices include current or voltage regulation 3212, 3214, 3216, 3218, 3220 and their output are combined in parallel to create a higher current with a regulated current or voltage 3222.

Figure 33:
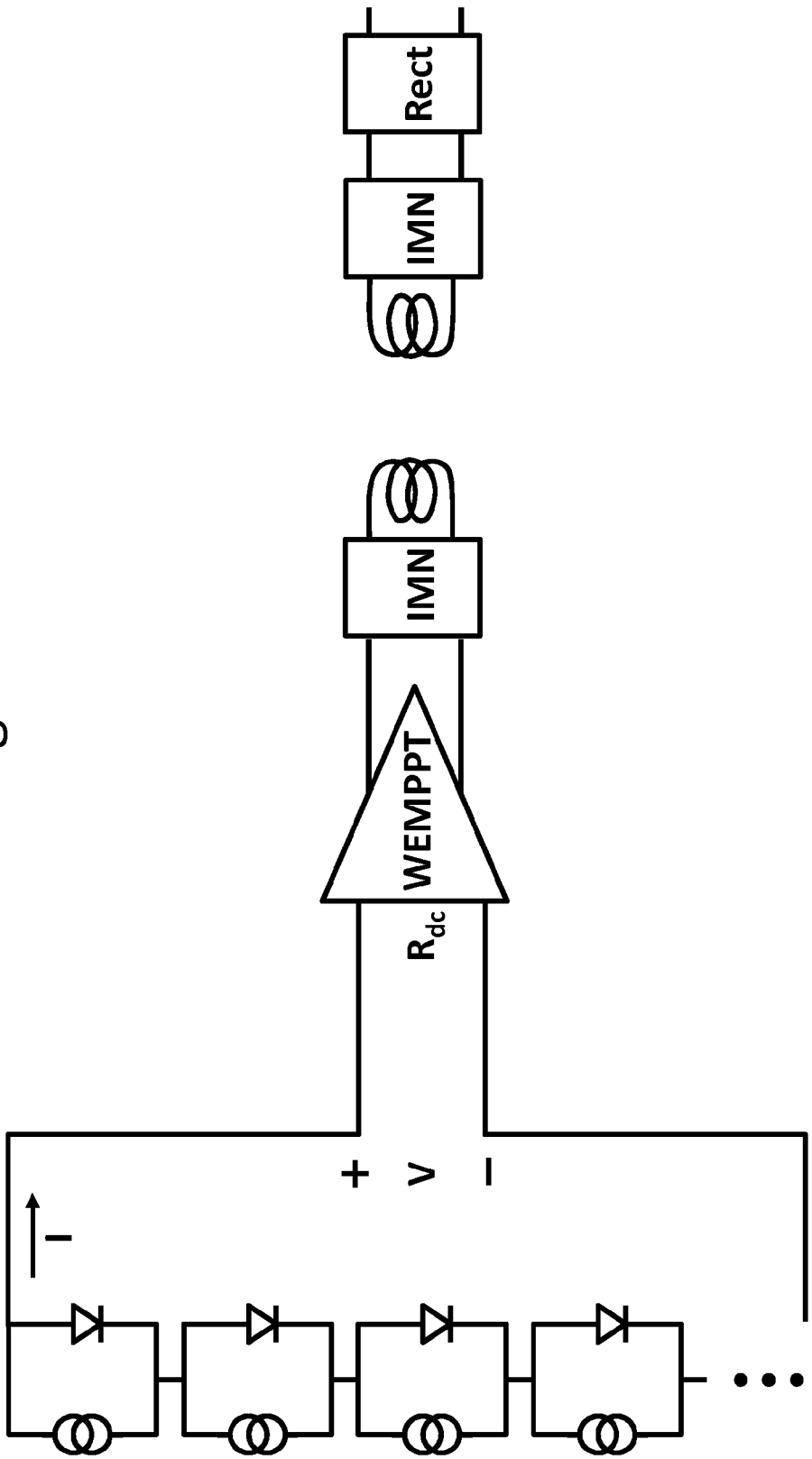
FIG. 33 is diagram of a wireless energy transfer system with PV panels.

In embodiments, WEMPPT configuration may be realized in a wireless energy source comprising a switching amplifier with automatic adjustment of the phase angle of the switching times for the transistors in the amplifier. The relationship in time between when the switches are opened and when the current flowing through the switches changes direction is what determines one phase angle, herein referred to as $\phi$. Another phase angle, herein referred to as $\gamma$, describes the relationship between when the diodes shunting the switches conduct and when the switches are closed. This provides two degrees of freedom for adjusting the characteristics of the energy source in a way that is advantageous both for energy extraction from a PV panel, and for efficient wireless transmission of said extracted energy. More specifically, the amplifier depicted in FIG. 33 can present an optimum resistance $R_{dc}$ to the PV panel while simultaneously presenting a substantially matched AC output impedance to the impedance matching network (IMN). This allows the extracted energy to be efficiently transferred through the source loop to the device loop and through the device IMN and to the rectifier.

Figure 34:
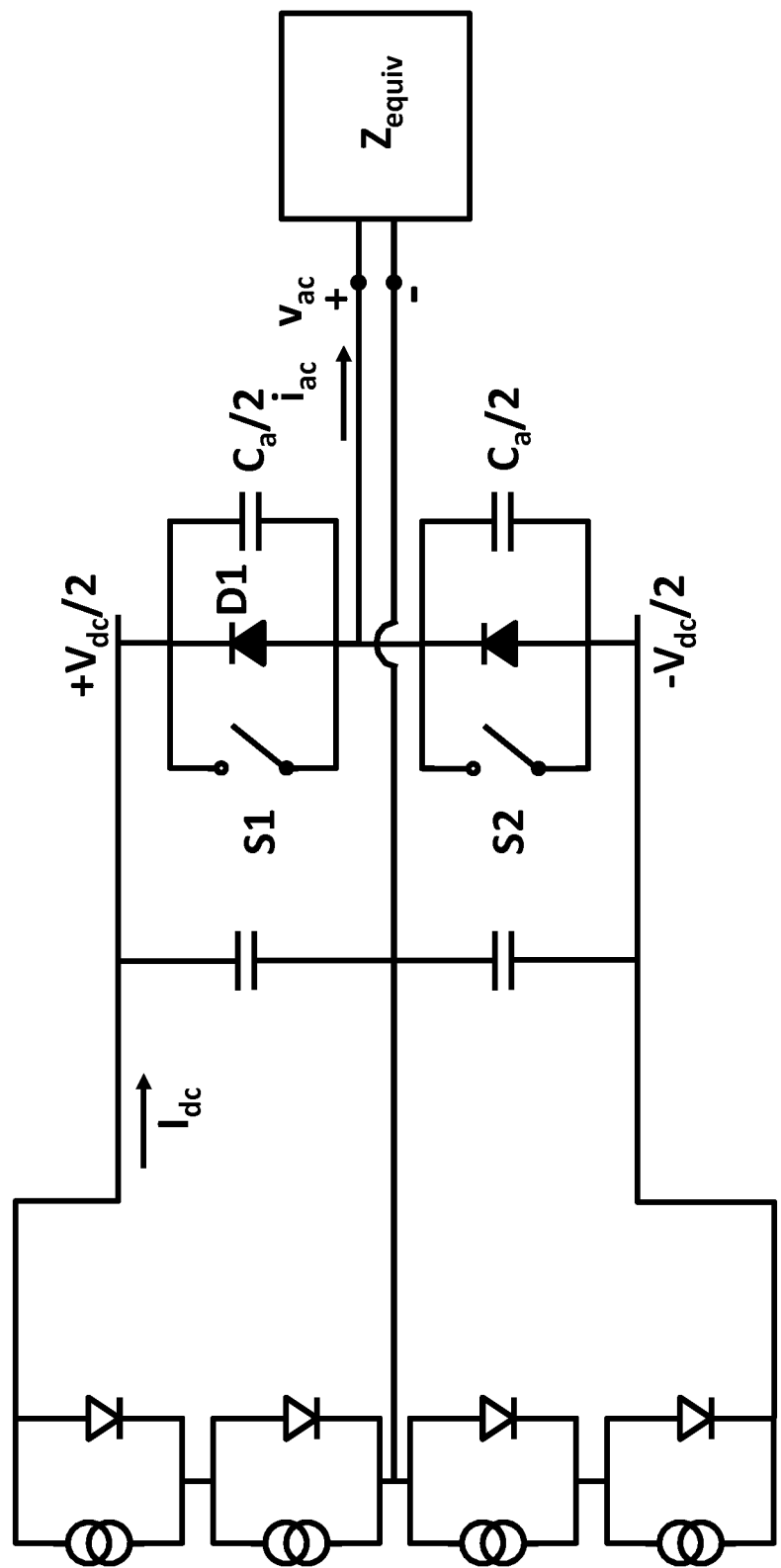
FIG. 34 is diagram of an amplifier for wireless energy transfer system with PV panels.
Figure 35A:
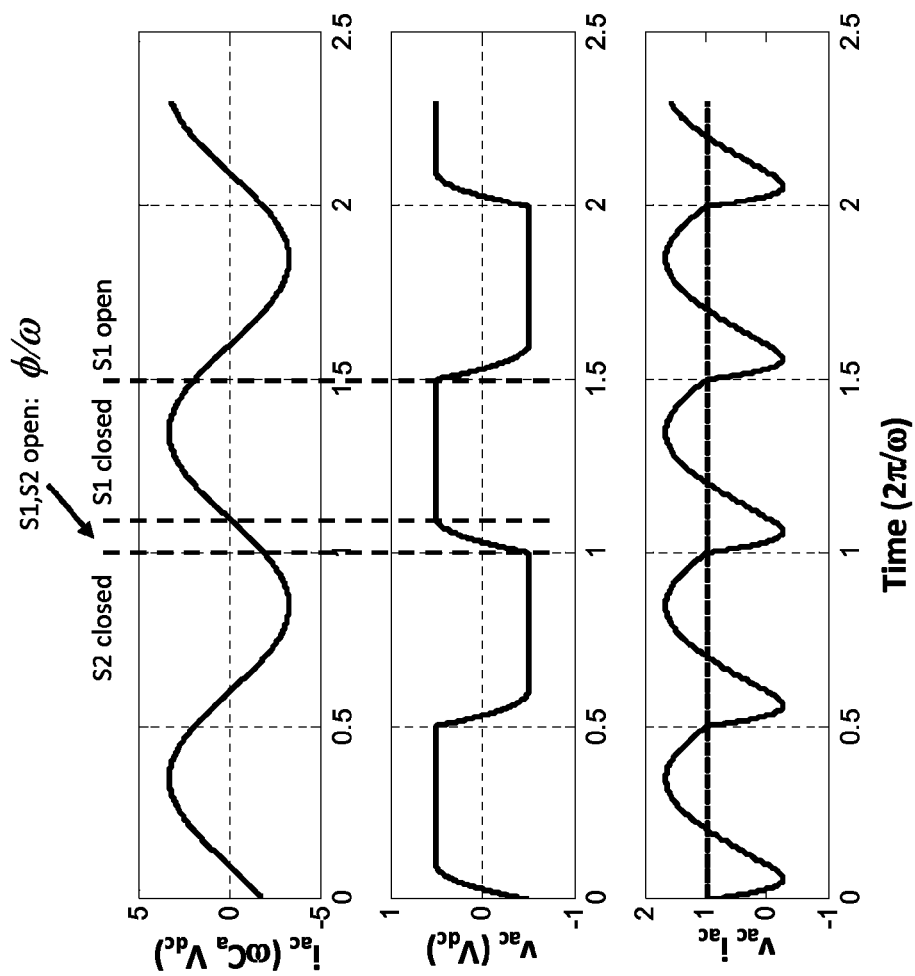
FIGS. 35A and 35B shows voltage and current diagrams during operation of an amplifier.
Figure 35B:
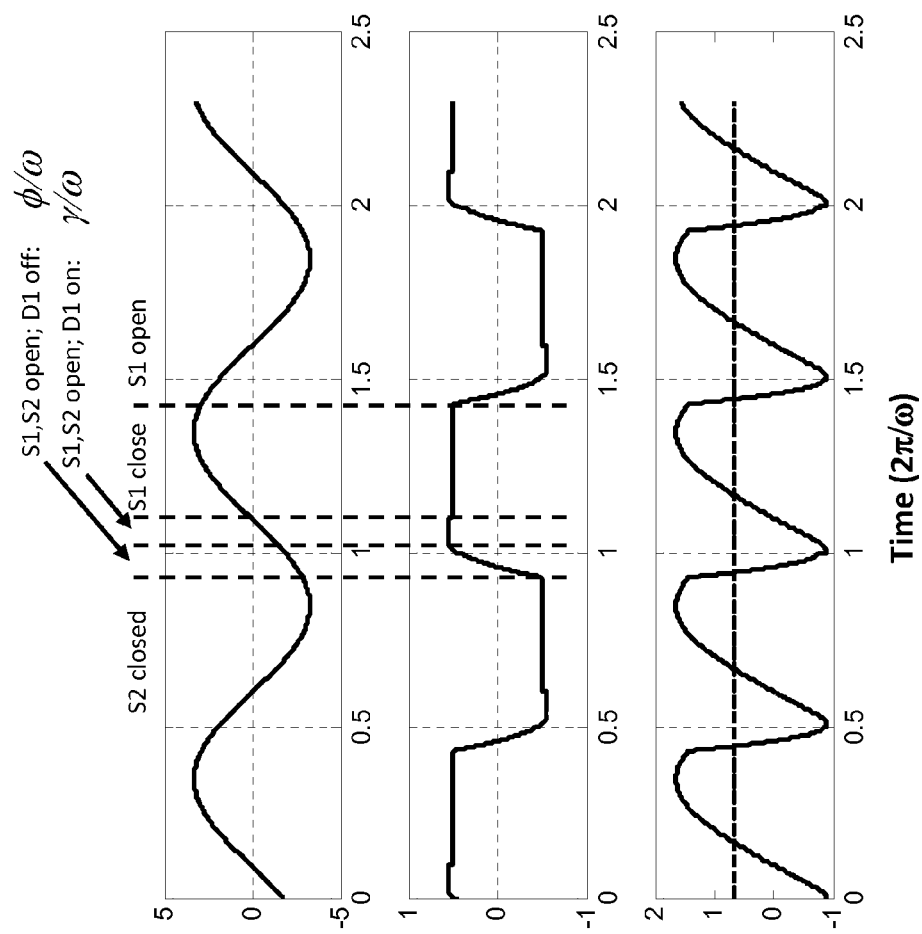
Figure 36:
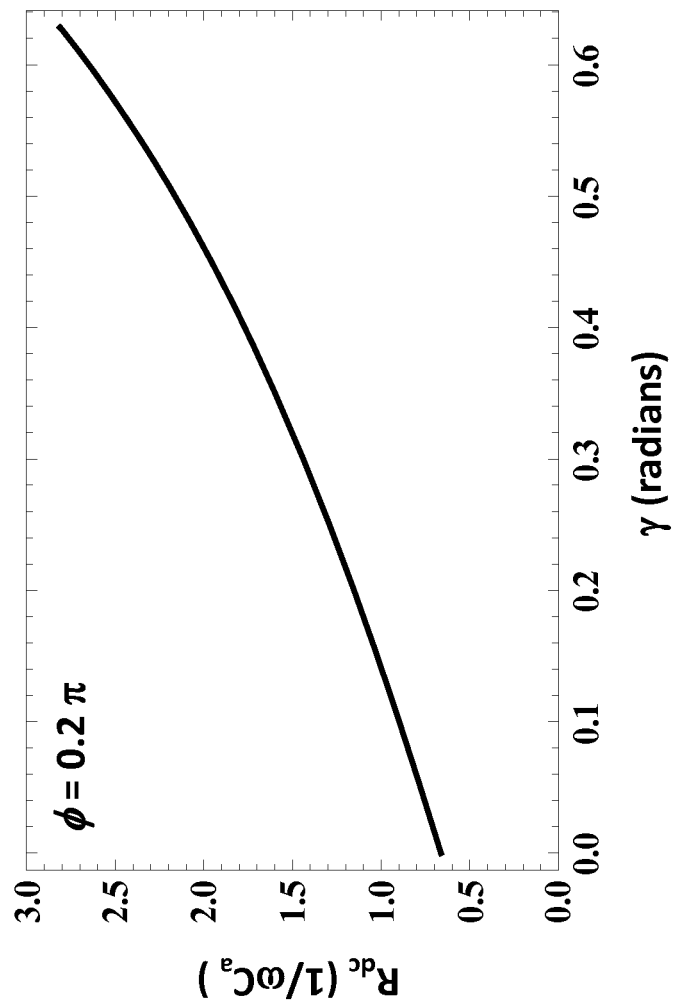
FIG. 36 shows characteristics of the impedance of the wireless source.

FIG. 34 shows an example of a half-bridge amplifier that can be used to provide an optimum resistance $R_{dc}$ to a PV panel. Exemplary waveforms for such an amplifier are depicted in FIGS. 35A and 35B for two different timing configurations for operating switches S1 and S2. FIG. 35A shows an example of a timing configuration for realizing high-efficiency AC waveforms. Note how the switch S1 is closed at the precise moment when the current $i_{ac}$ changes sign and also when the voltage $v_{ac}$ reaches $V_{dc}/2$. While closing, the switch S1 is said to experience zero-current and zero-voltage switching. A short time before, defined as $\phi/\Omega$, the switch S2 was opened and experienced zero-voltage switching. A half-period after S2 was opened, S1 opens and also experiences zero-voltage switching. These conditions result in nearly zero dissipation in the switches. The high-efficiency switching can be realized for different designs with various values of $\phi/\Omega$, while providing a degree of freedom for impedance matching to various ac loads for wireless energy transmission. An additional degree of freedom is needed to adjust the dc resistance presented to the PV panel. One such degree of freedom is depicted in FIG. 35B which shows how S2 can be opened slightly earlier than depicted in FIG. 35A. The value of $v_{ac}$ then reaches $V_{dc}/2$ before S1 closes and the current $i_{ac}$ then flows through the diode D1 (turning it on) until the current crosses zero. The diode D1 stays on for a time $\gamma/\omega$ at which time the switch S1 closes under a nearly zero-voltage condition. Note that zero-current switching is sacrificed, although near-zero-voltage switching is preserved because of the diodes. This still results in high-efficiency operation. Adjusting the value of $\gamma/\omega$ provides an additional degree of freedom for adjusting the dc resistance presented to the PV panel. FIG. 36 shows a specific example of how the dc resistance can be changed by a factor of 4 by adjusting the value of the phase $\gamma$ for a fixed value of the phase $\phi$. For the circuit depicted in FIG. 34, an equation that relates the dc resistance to the phase $\gamma$ can be written as $$R_{dc} = (2\pi/\omega C)(\cos\gamma - \cos(\gamma+\phi))/(\cos\gamma + \cos(\gamma+\phi)). \tag{5}$$

Figure 37:
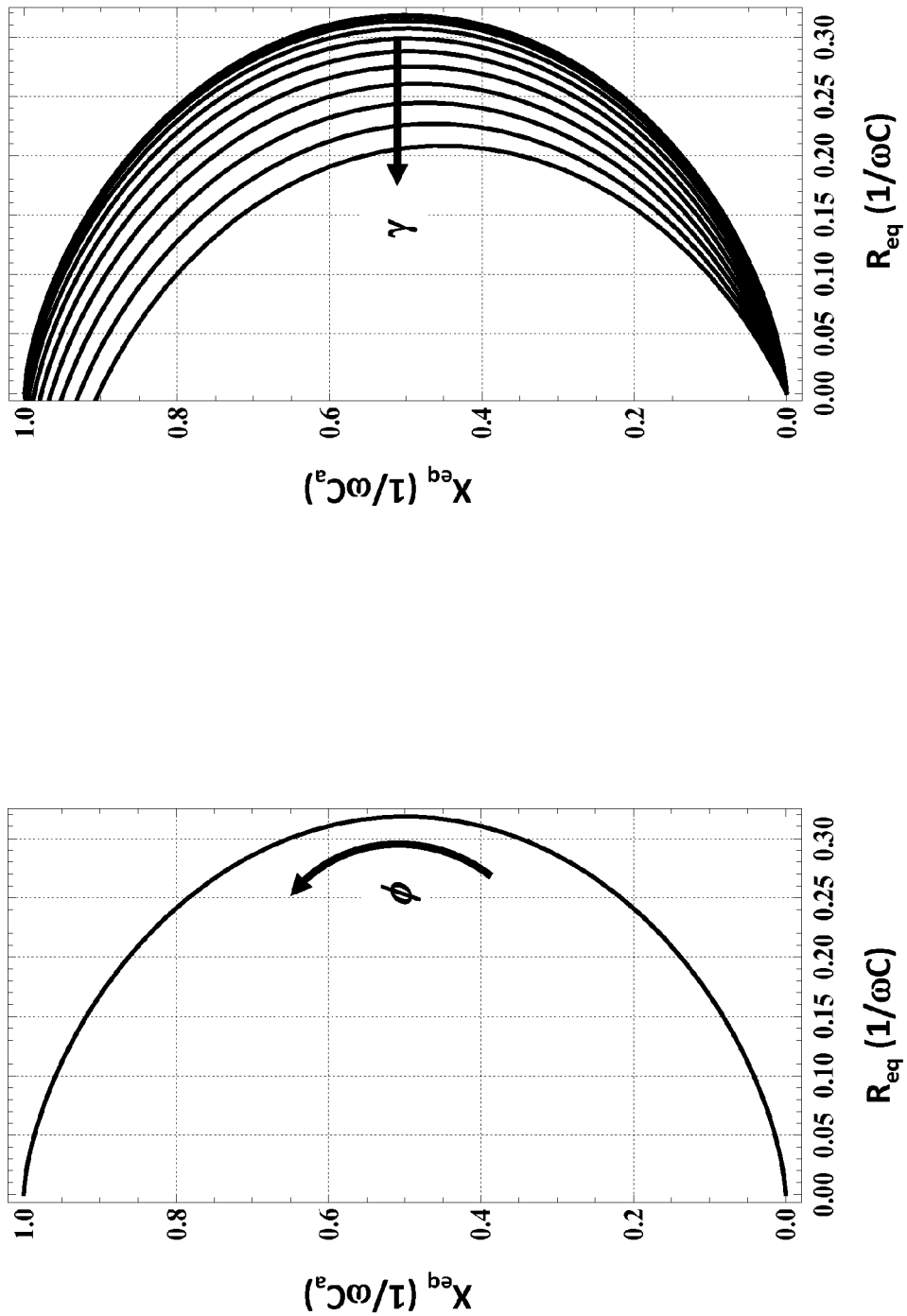
FIGS. 37A and 37B shows characteristics of the impedance of the wireless source.

As the phase $\gamma$ is adjusted, the AC output impedance of the amplifier changes as well. FIG. 37A shows the dependence of the output impedance on the phase $\phi$. FIG. 37B shows how the output impedance additionally depends on the phase $\gamma$. In embodiments, phases $\phi$ and $\gamma$ are chosen in combinations that optimize $R_{dc}$ presented to the PV panel as well as the AC impedance presented to the impedance matching network. In embodiments, the phase $\gamma$ is adjusted in combination with circuit elements such as capacitors, inductors, and resistors in the impedance matching network to optimize $R_{dc}$ presented to the PV panel as well as the AC impedance presented to the source resonator.

Figure 38:
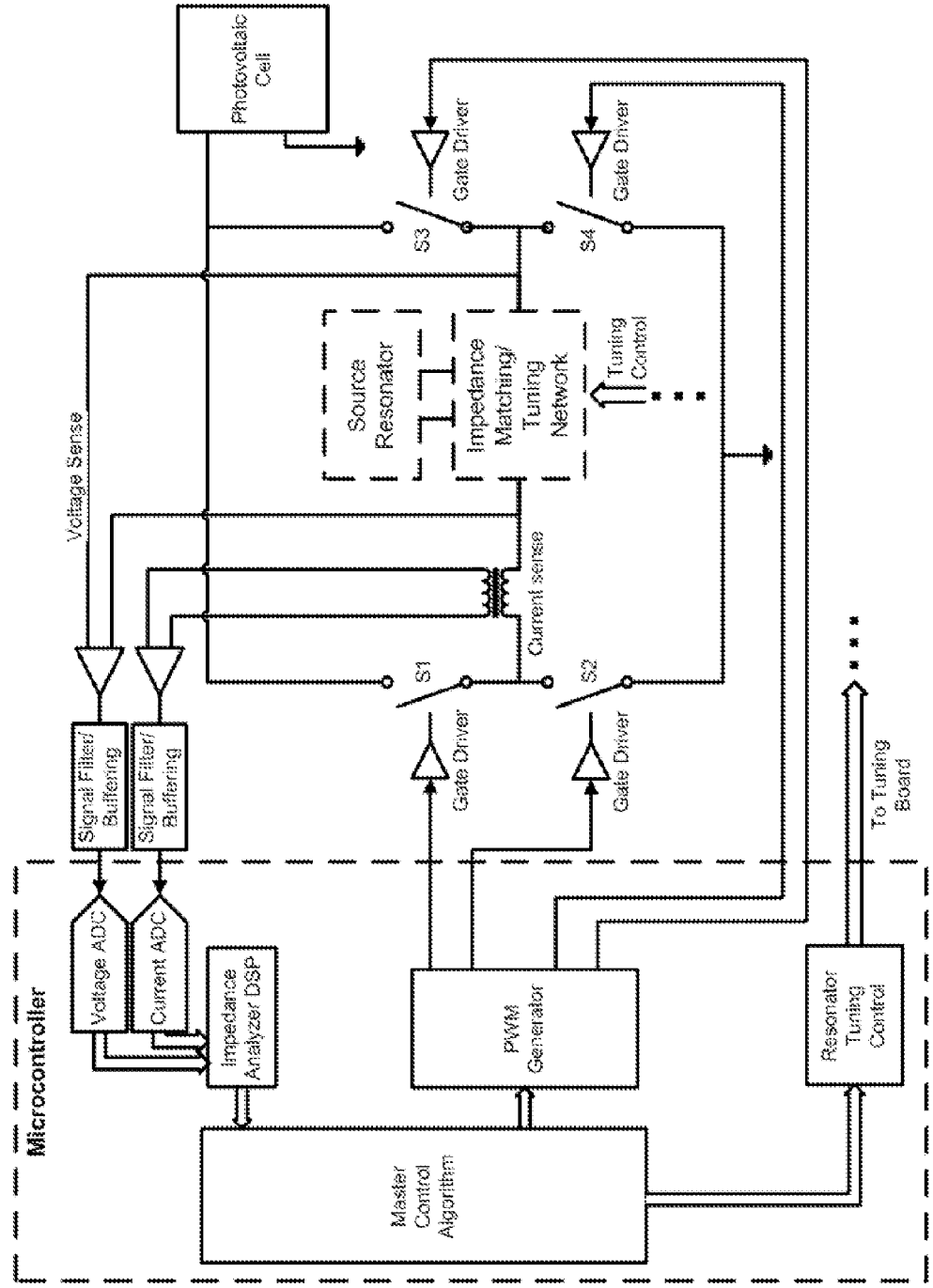
FIG. 38 shows a wireless energy transfer source with a PV cell.

In other embodiments, WEMPPT configurations may be realized in a wireless energy source comprising circuit elements such as capacitors, inductors, and resistors by adding automatic adjustment of said circuit elements in response to changing environmental conditions. Said circuit elements may be part of any of the amplifier, impedance matching network, and/or resonator. In other embodiments, WEMPPT configurations may include circuit elements that can be tuned as well as switching times for the transistors that can be adjusted. FIG. 38 depicts one exemplary embodiment with a master control algorithm. The master control algorithm evaluates inputs such as the current and voltage waveforms flowing through the impedance matching network and source coil combination. The algorithm uses processing of said inputs to determine, for example, a more optimal DC impedance to present to the PV cell and/or a more favorable AC impedance to present to the impedance matching network. The algorithm controls a means of adjusting the PWM waveform and/or a means of adjusting a tuning network so that the more optimal impedances may be realized.

Figure 39:
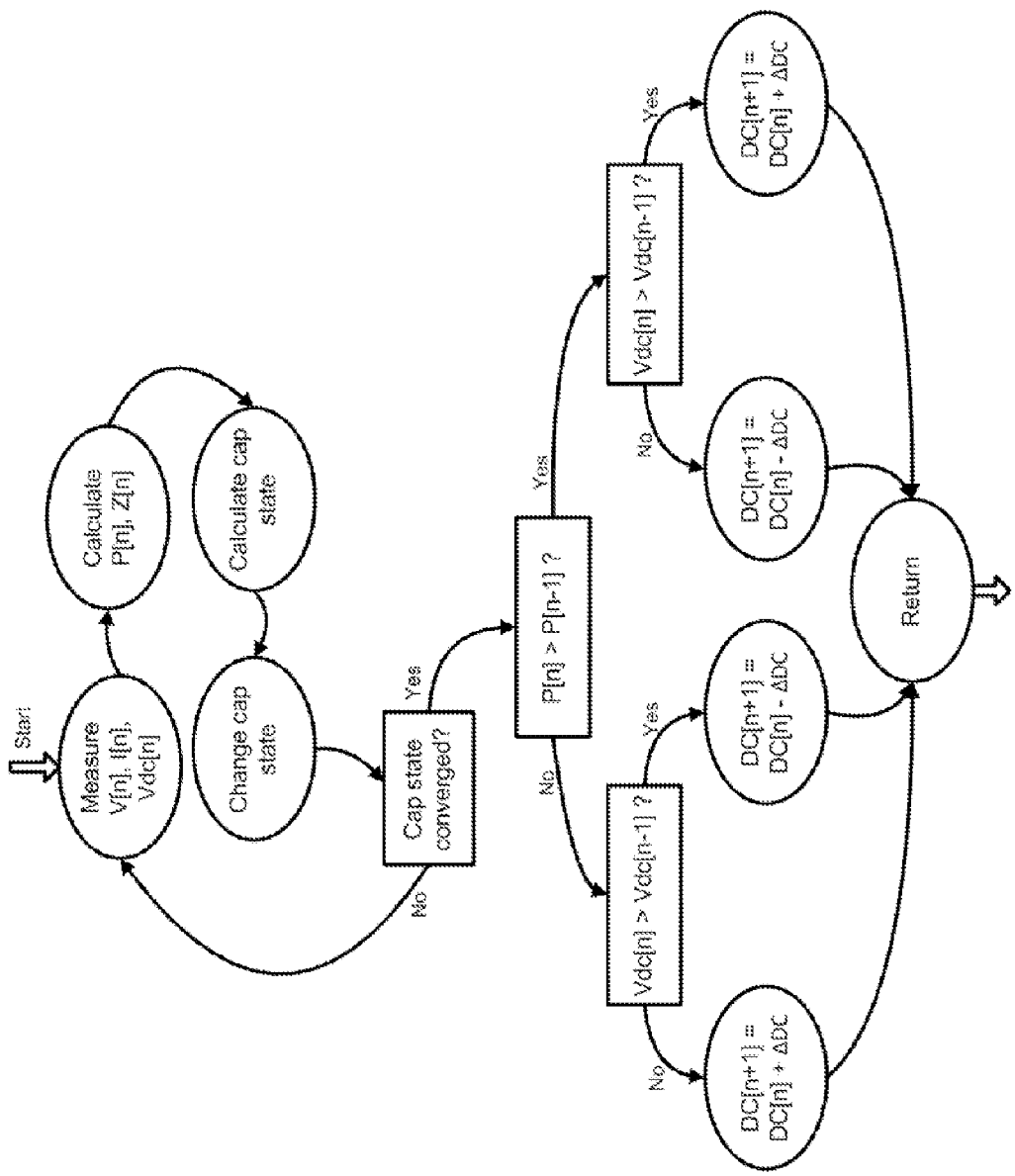
FIG. 39 shows a procedure for tuning the source for use with a PV panel.

FIG. 39 depicts an exemplary embodiment of a control algorithm. For a time-step n, the algorithm measures the AC voltage and current across the impedance matching network. The algorithm also measures the DC voltage across the PV panel. The algorithm then calculates a new setpoint for a tunable capacitance in the tuning network and actuates the change. The voltages and currents are remeasured in a next time-step and the adjustment loop continues until the desired capacitance state is achieved. Next, the power extracted from the PV panel is compared to the power extracted in the previous time-step and the sign of the difference is computed. The sign of the difference then determines how the algorithm adjusts the duty cycle of the switching times of the transistor switches. The duty cycle may be adjusted by changing either of the phase angles $\phi$ or $\gamma$, as described above.

In addition to solar PV panels, other methods of generating electrical energy include wind-powered generators, water-powered generators, thermoelectric generators, thermophotovoltaic generators, and the like. Such methods also provide electrical output that varies with environmental conditions, and conventional MPPT circuits can be used to maximize energy extraction. Those skilled in the art will understand that the features of the WEMPPT configuration are general and may be applied to a wide range of electrical energy generators.

In embodiments the wireless power transfer system may include safety interlocks and sensors. The PV panels and resonators may include temperature, power, impedance, and voltage sensors and microcontrollers or processors to ensure the panel operates within allowable limits. The wireless power transfer system may include a ground connection to provide a discharge path for accumulated electric charge. The wireless power transfer system may include a voltage sensor that enables detection of accumulated electric charge. If no connection to earth ground is available to the PV panel with wireless power transfer, the panel may include a ground-fault interrupt sensor where the case of the PV panel is treated as ground.

In embodiments the PV panels and resonators may include sensors and visual, auditory, and vibrational feedback to aid in resonator alignment to ensure efficient power transfer between an external PV panel and an internal capture resonator. For example, one of the resonators may be used to sense the position of another resonator by sensing an increase or decrease in the resonant coupling between the resonators. Alternatively, an increase or decrease in the mutual inductance between the resonators may be used to determine relative position of the resonators.

In embodiments with multiple PV panels or multiple resonators, the resonators of the system may be tuned to different frequencies to avoid interference. The tuned frequency of the various resonators may be time or frequency multiplexed. In other embodiments, the source and capture resonators may include a communications capability that allows the source and capture resonators to exchange configuration information. In other embodiments, such source and capture resonators may exchange information needed for initial calibration or for verifying that exchange of power is occurring between the intended resonators. The communication can be in-band or out-of-band, as was described above.

Figure 40:
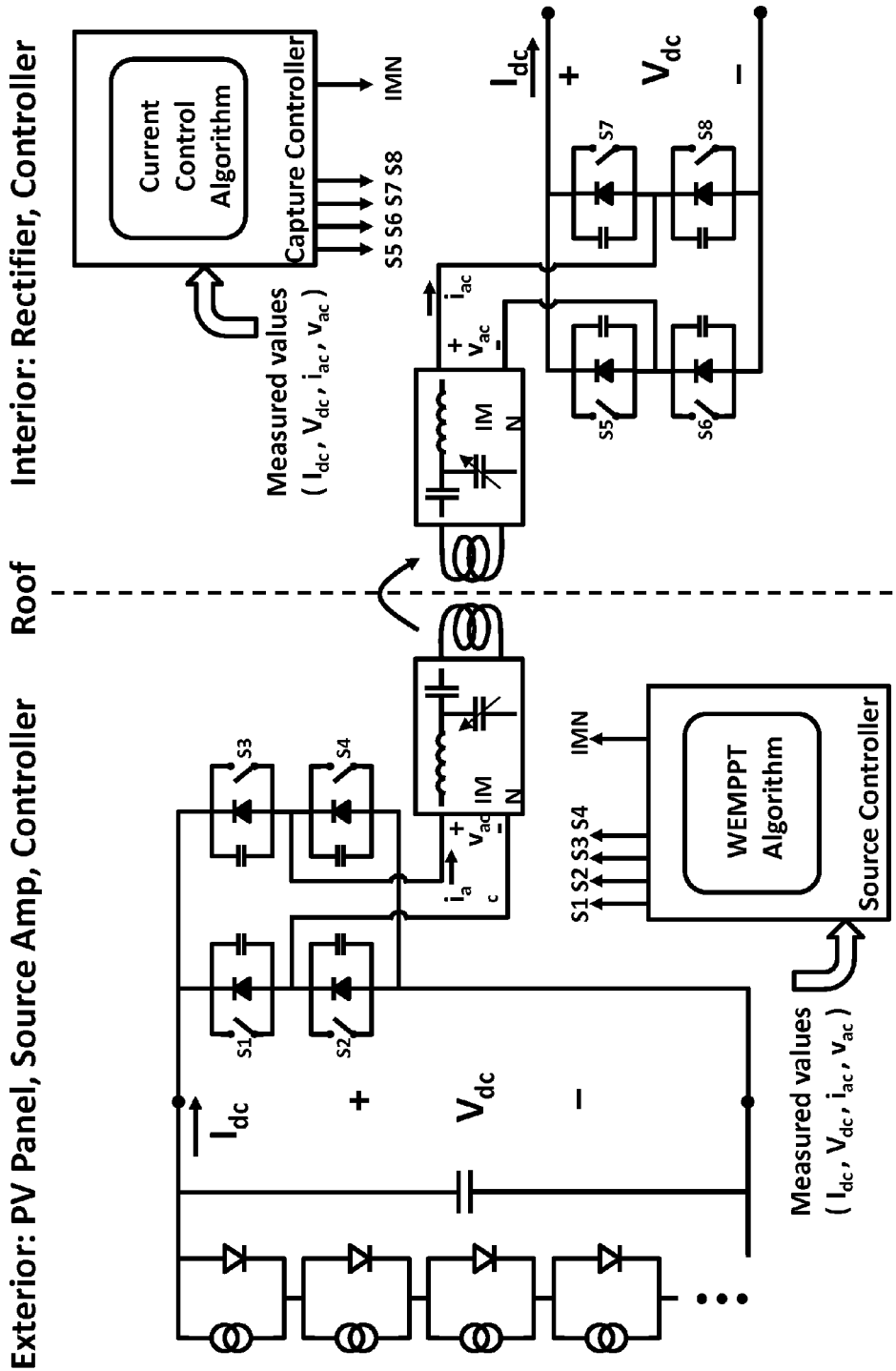
FIG. 40 shows a diagram of a wireless energy transfer system with a PV panels.

FIG. 40 shows a preferred embodiment of the WEMPPT configuration for the example of a solar PV panel installed on the roof of a building. A PV panel is depicted at left as a series-connected plurality of solar cells, where each cell is represented by a simplified equivalent circuit comprising a current source and a diode, as described above. The capacitor represents the capacitance across the PV panel terminals. Next, the PV panel terminals are connected to a full-bridge switching amplifier that can operate in the class DE mode described above. The switching times for S1-S4 and related parameters such as duty cycle and the phase angles φ and γ can be adjusted by a source controller. Next, the AC outputs of the switching amplifier are connected to an impedance matching network (IMN) with an adjustable circuit element such as a capacitor. As described herein, the combination of the switching time parameters and the circuit element can be adjusted in a manner that optimizes both the extraction of power from the PV panel and the wireless transfer of power through the roof barrier for a variety of environmental and solar irradiance conditions. A preferred algorithm for making the adjustments uses measured values of at least one of the DC current and DC voltage from the PV panel as well as measured values of at least one of the AC current and AC voltage in the IMN or on the source coil.

The right side of FIG. 40 shows the configuration of the power capture part of the WEMPPT configuration—interior to the building in this example. An algorithm can be implemented in a capture controller that performs two functions. First, said controller optimizes the impedance matching of the capture coil to the rectifier. Second, said controller regulates the DC current, DC voltage, and/or power output from the rectifier. A preferred algorithm for the roof-top solar example measures at least one of the AC current and AC voltage from the capture coil and at least one of the DC voltage or DC current from the rectifier. The switching times for S5-S8 can then be adjusted to maintain high-efficiency rectification. When coupled with another adjustable parameter such as a variable capacitor in the IMN, the switching times and the variable capacitor can be adjusted to optimize impedance matching, maintain high-efficiency rectification, and regulate the output DC current or voltage or power from the rectifier.

Figure 41:
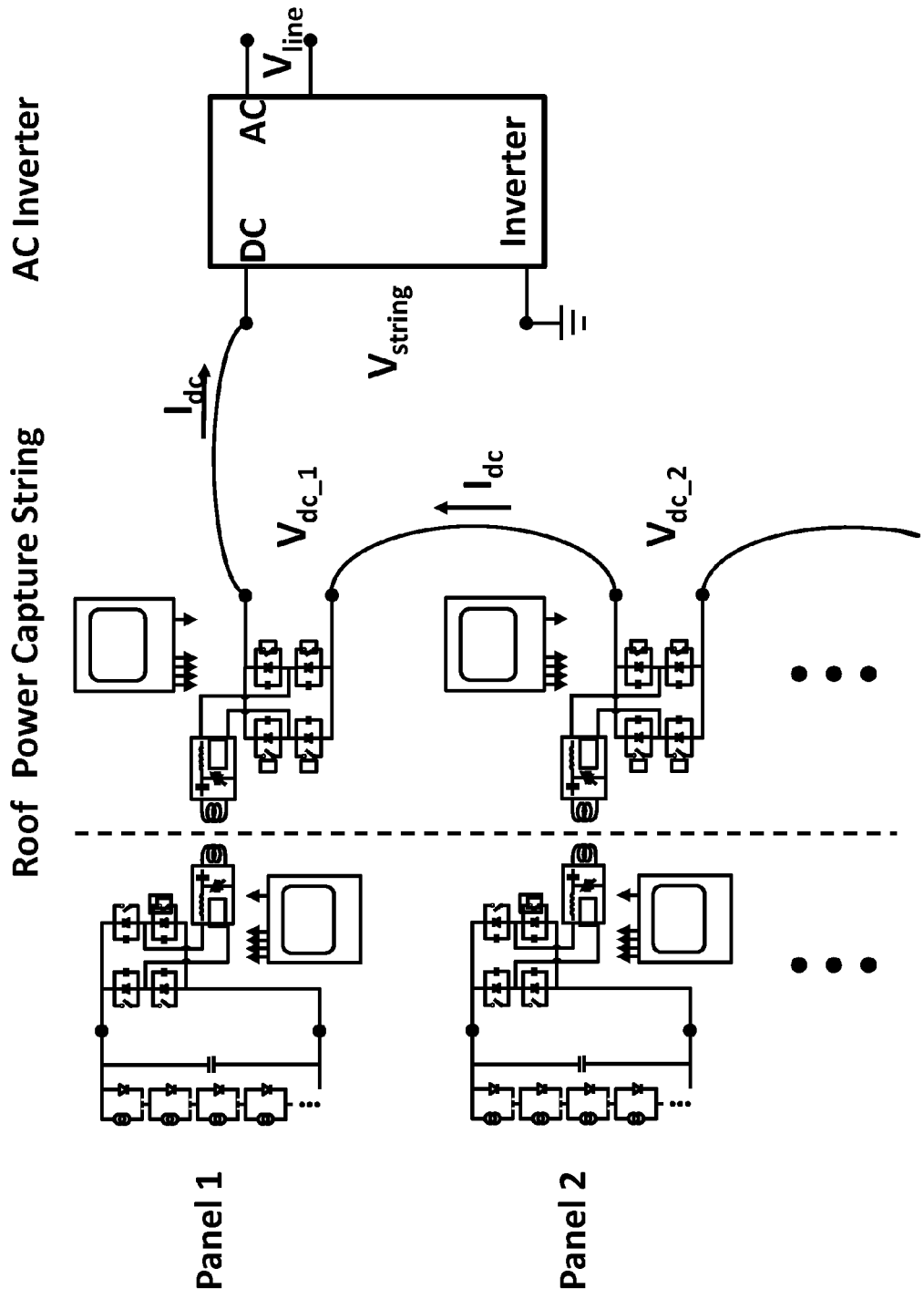
FIG. 41 shows a diagram of a wireless energy transfer system with a PV panels.

In a preferred embodiment for the example of a plurality of PV panels on a roof, each PV panel may have a corresponding capture circuit where each capture circuit regulates its DC output current to a common value $I_{dc}$. Then the plurality of PV panels can be electrically connected in series, as depicted in FIG. 41. Each PV panel may develop a voltage $V_{dc\_i}$, where i is an index corresponding to the ith PV panel. When different PV panels experience different irradiance, their power capture circuits may develop different DC voltages at the common current value of $I_{dc}$. The sum of the different DC voltages, $V_{string}$, is available to an inverter or battery charger. The amount of power supplied to the inverter or charger is $P = V_{string} \times I_{dc}$. For a given amount of power from the panels P, the value of $V_{string}$ is determined by the value of $I_{dc}$ flowing through the series-connected capture circuits. This is advantageous to maintaining a near-constant value of $V_{string}$ at the input of the inverter or charger—a condition that allows the inverter or charger to operate near its peak efficiency. To realize a near-constant $V_{string}$, the inverter or charger may set the common current value $I_{dc}$ for each of the power capture circuits. A communications link could be established between the inverter or charger and the power capture circuits to set the common current value. The link could make use of the DC wiring or it could use wireless communications.

The communications link could also be used to communicate information of diagnostic, performance, or other status information between the inverter or charger and the power capture circuits. It is also possible for each of the power capture circuits to obtain information about its corresponding PV panel using either in-band or out-of-band communications as described above. The information about the PV panels can then be shared across the interior communications link. This could include information about the relative alignment of a power capture circuit with its corresponding PV panel. The relative alignment could be monitored from the power capture circuit by a variety of techniques including inductive sensing, magnetic field-strength sensing, capacitive sensing, thermal sensing, or other modalities that do not require roof penetrations. In a preferred embodiment, relative alignment is monitored with a method that is sensitive to the mutual inductive coupling between the source and capture coils.

Although described in the context of solar PV panels, one skilled in the art will appreciate that the techniques and methods described may be used with other energy harvesting devices such as wind turbines, water turbines, thermal exchangers, and the like. An energy producing wind turbine mounted on the roof of a building, for example, may benefit from wireless power transfer in a similar way as described for the PV panels. Because other energy harvesting devices vary depending on environmental conditions, the WEMPPT functionality described above may be used in embodiments other than PV panels. Power from the wind turbine may be transferred from the exterior to the interior of the building without having to make holes or penetrations in the roof or walls. Likewise water turbines in boats or other structures that use water motion like currents, waves, and the like to generate energy may benefit from wireless power transfer. Drilling for wiring through a hull of a boat or a sealed submerged structure is undesirable for such applications. With wireless power transmission, submerged turbines and energy harvesters may be completely sealed and isolated making such devices more reliable and also easier to replace or repair since they can be removed and replaced without requiring any resealing of connections.

Wireless Energy Transfer for Packaging

Wireless energy transfer may be used to transfer energy to product packaging, packaged products, and the like. Power may be transferred to packaging or packaged products when the packages are on the shelves in a retail environment, in a storage environment, in a warehouse environment, in a refrigerator environment, in a shipping environment, and the like. Wireless energy captured by a package may be used to illuminate parts of the packaging, power electronics or sensors or the packaging, control the temperature of the packaging, provide power to devices or batteries inside the packaging, provide power to displays on the packaging, and the like.

Product packaging may include boxes, bags, bottles, stickers, cartons, displays, wrappings, bottle caps, signs, flyers, attachments, and the like. Product packaging may be a disposable outer wrapper of a product that gets removed before use. Product packaging may mean an integral part of the product which does not get removed but is a permanent part of the product.

In accordance with exemplary and non-limiting embodiments, a device resonator and electronics may be integrated into the packaging, may be located on the inside of the packaging, or attached to the outside of the packaging and receive wireless energy from a source resonator located on a shelf, on a floor, in a ceiling, in a wall, and the like at a position to transfer energy from the source resonator to the device resonator.

In accordance with exemplary and non-limiting embodiments the energy captured by the device resonator may be used to energize lights, buzzers, motors, vibrators, displays, organic materials, conductive inks or paints, or any other visual, auditory, or tactile stimulator that may be used to enhance a product's appearance, to convey information, or to attract the attention of a consumer.

In accordance with exemplary and non-limiting embodiments, the energy captured by the device resonator may be used directly by the packaged product. Energy may be used to recharge the battery of the packaged device ensuring that when the device is purchased and unpacked the battery of the device will be sufficiently charged for immediate use.

In accordance with exemplary and non-limiting embodiments, the energy captured by the device resonator may be used to maintain or monitor the environmental conditions within the packaging. Parameters such as temperature, light, humidity, product freshness, product quality, packaging integrity, and the like may be monitored, recorded, and reported to a user or a consumer.

Figure 42:
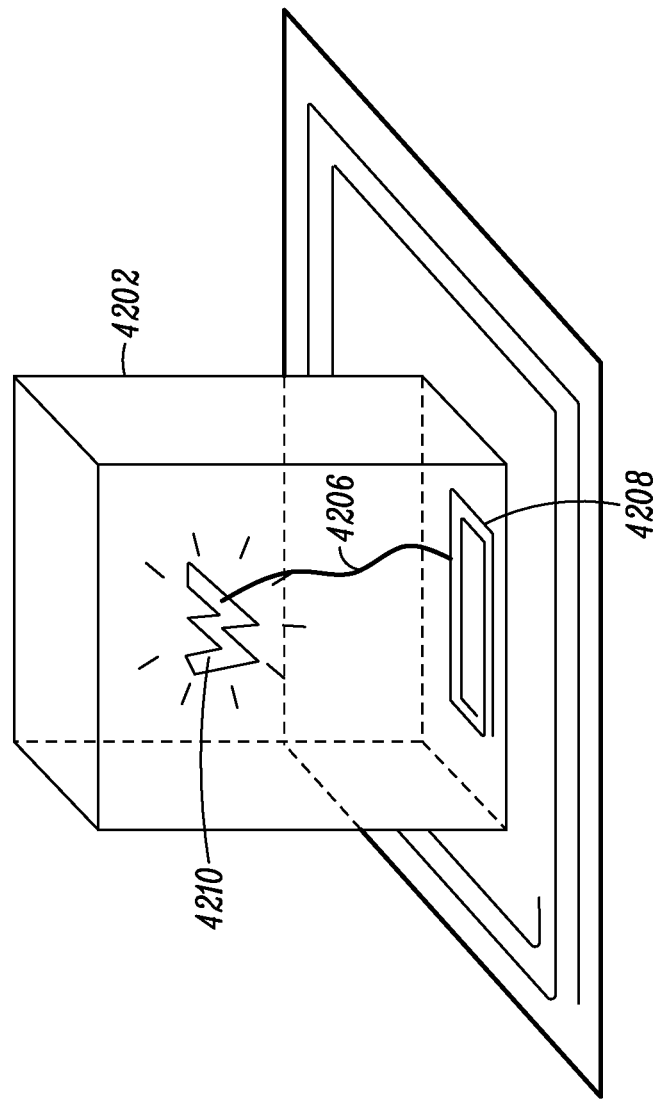
FIG. 42 is diagram of a packaging enabled with wireless energy transfer.

One exemplary embodiment of product packaging with a wireless energy transfer system is depicted in FIG. 42. A package 4202 with an integrated device resonator 4208 and optional device electronics (not pictured) may be placed near a source resonator 4204 coupled to source electronics (not pictured). The energy captured by the device resonator may be used to energize a light emitting feature 4210 of the packaging via a wired 4206 electrical connection. In embodiments the light emitting feature may be an LED, a bulb, a fluorescent bulb, a light emitting paint, a part of a display, and the like, that may be directly attached, integrated and/or recessed in the packaging.

In accordance with exemplary and non-limiting embodiments, the source and device resonators 4204, 4208 may be of different sizes. In accordance with exemplary and non-limiting embodiments, it may be preferable to have the source resonator 4204 be larger than the device resonator 4208 to allow a greater freedom of movement and placement of the device resonator 4208 within the proximity of the source resonator 4204.

In accordance with exemplary and non-limiting embodiments, the source and device resonators 4204, 4208 may be of any resonator type described herein and may include a planar resonator, a printed circuit board resonator, and the like. In exemplary embodiments the coil of the resonators 4204, 4206 may be comprise an electrical conductor printed directly onto the packaging or onto an insert or a sticker that is attached to the packaging.

Figure 43:
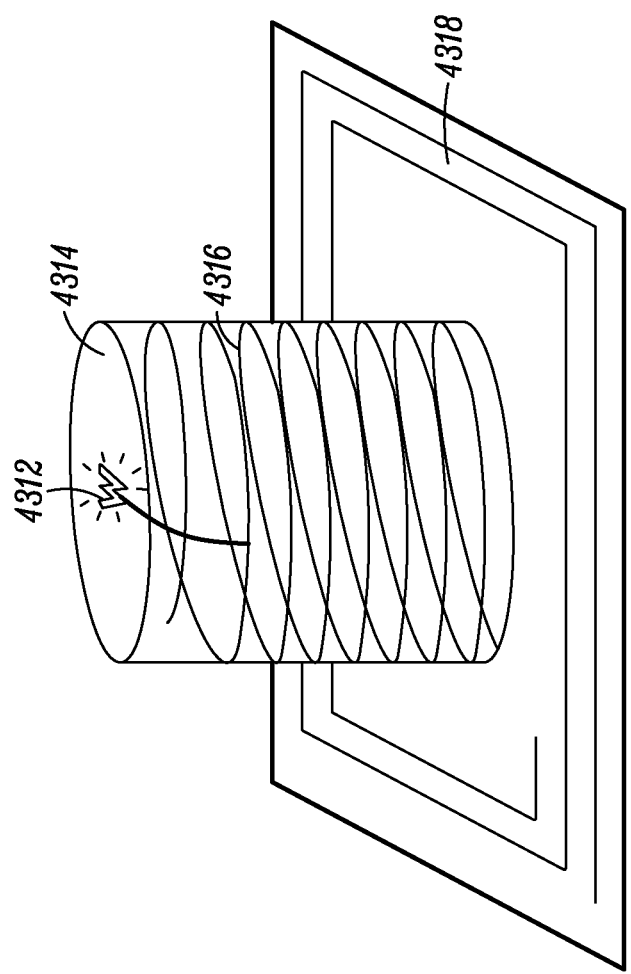
FIG. 43 is diagram of a packaging enabled with wireless energy transfer.

In accordance with exemplary and non-limiting embodiments, the device resonators 4208 may be adapted to fit into different sides and faces of the packaging. In accordance with exemplary and non-limiting embodiments, the device resonators 4208 may be adapted to fit round packaging such as depicted in FIG. 43 where a resonator coil 4316 is fitted around the perimeter of a cylindrical package 4314 and powers a illuminated logo 4312 of the package.

Figure 44:
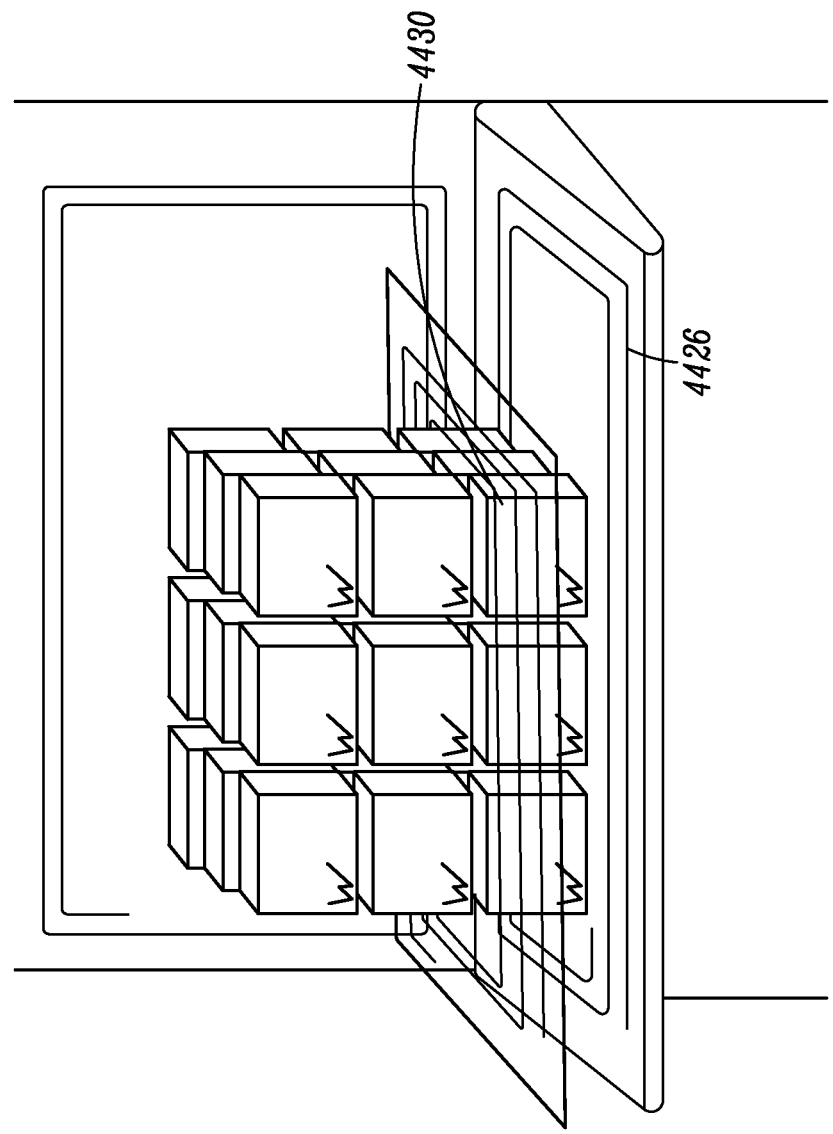
FIG. 44 is diagram of a stack of packages enabled with wireless energy transfer.

In embodiments the packaged products may be stacked or arranged in configurations where some packaged products may not be directly next to a source resonator 4204 but may be separated from a source resonator 4204 by one or more other packages or products. To receive energy the packaged products may need to receive energy through one or more packaged products. For example, as depicted in FIG. 44 square packages 4422 may be stacked in a three dimensional array on a shelf. The array may be four or more packages deep in all the directions. As a result, a source resonator 4204 placed on the top, back 4424, or bottom 4426 of the shelf 4428 may not be in contact or close proximity to all of the packages in the array so as to provide energy to device resonators 4208 corresponding to each of the packages 4422.

In accordance with exemplary and non-limiting embodiments, the maximum dimensions and distances of a stack or array of products may be limited based on the sizes of resonators, the power output from the source resonator, and the power requirements of the products. A package may be rated for a maximum separation from the source and hence a maximum stacking height.

In accordance with exemplary and non-limiting embodiments, the stacking height or separation distance of the source and the devices may be increased with repeater resonators. Large repeater resonators may be placed in between layers of stacked packaging increasing the coupling strength of the resonators in the devices and the source. For example, for the configuration shown in FIG. 44, energized by the bottom source resonator 4426, a large repeater resonator 4430 may be inserted between the first and the second layer of packages to extend the wireless energy transfer range to, for example, the second or third row of packages. A repeater resonator 4430 may also be inserted between the second and third rows and any additional rows.

Figure 45:
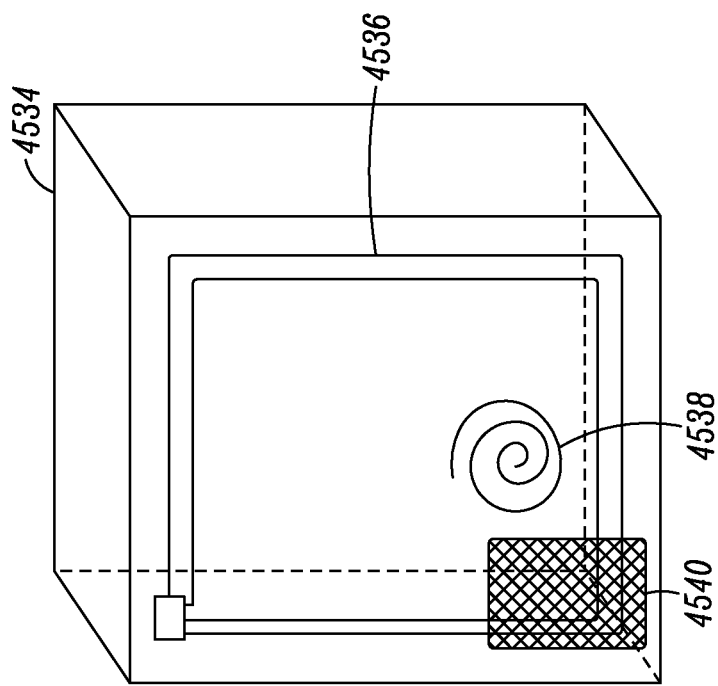
FIG. 45 is diagram of a packaging enabled with wireless energy transfer with a detuning patch.

In accordance with exemplary and non-limiting embodiments, the range of wireless energy transfer and the stack height of packaged products may be improved with a repeater resonator that is integrated or attached to each package. A repeater resonator may be added to the package to improve the coupling to the source resonator. An example of a package with a repeater resonator is depicted in FIG. 45. The package 4534 includes a device resonator 4538 that provides energy to any electronics or circuits in the packaging and a repeater resonator 4536 that may be larger than the device resonator and attached or integrated on the same or different side or face of the package than the device resonator. In this configuration multiple packages may be stacked front to back with a source resonator in the back of the packages.

In accordance with exemplary and non-limiting embodiments, it may be desirable to turn off or prevent energizing packages that may be in the middle of a stack or to the back of a stack. For example, illuminating a package designed to attract the attention of a consumer may only be useful when the package is visible to the consumer. Packages that are in the back of a stack may not be visible and energizing the packages may waste energy, reduce the reliability of the circuits and potentially lead to device failures. In embodiments the packages may be configured to energize or turn on only when they are in front of a display or when they are visible to a consumer.

In accordance with exemplary and non-limiting embodiments, packages may have sensors, such as light sensors, RFID sensors and the like that may be used to determine and activate the appropriate packaging.

In accordance with exemplary and non-limiting embodiments, the packaging may be configured to selectively detune device resonators that are not in front of a display. A resonator detuned from the resonant frequency of the source resonator may not efficiently receive energy from the source and may be in effect be disabled. Selective detuning of resonators may be accomplished by introducing a lossy material to mating faces of packages when stacked together. A material such as a sheet of an electrical conductor may sufficiently detune a device resonator when brought in close proximity to the device resonator. In embodiments packaging may be designed with a small area of a lossy material positioned such that the lossy material may detune the device resonator that is not in the front of package stack.

For example, consider again the packaging 4534 depicted in FIG. 45 comprising a device resonator 4538 and a repeater resonator 4536. The packaging may be designed to have a patch or sheet of a lossy material 4540 on the opposite side of the device resonator such that when two packages are stacked together the lossy material may load and detune the device resonator of the package in the back while not affecting the repeater resonator of each package allowing energy to pass through the repeater resonators to the front package.

Figure 46:
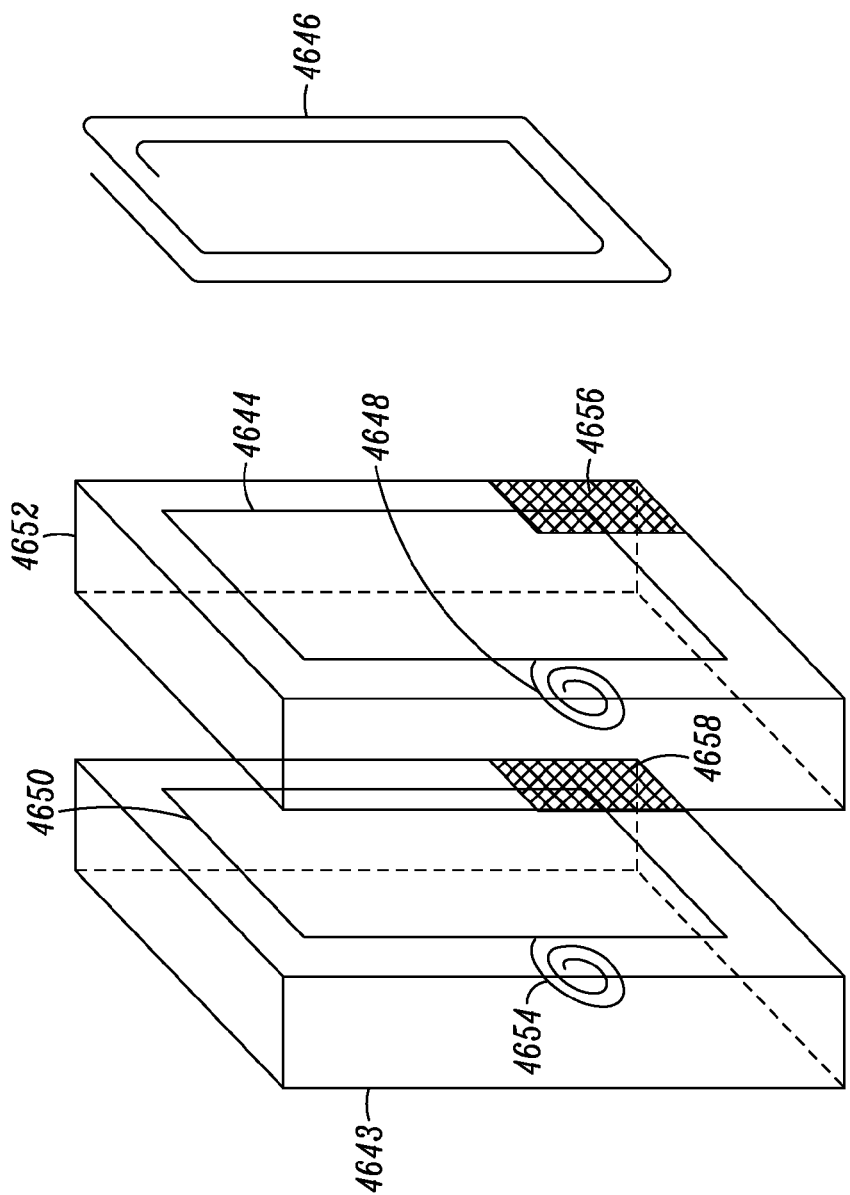
FIG. 46 is diagram of a packaging enabled with wireless energy transfer.

A configuration with two packages is shown in FIG. 46. The configuration comprises a source resonator 4646 and two packages 4643 and 4652 each with its own repeater resonator 4650, 4644 and device resonators 4654, 4648 respectively. Each package may also have a patch of a lossy material 4656, 4658. The lossy material is positioned such that it affects the device resonator of the box in back of it. For example, the patch 4658 is positioned to detune the device resonator 4648 or the box in the back without affecting the larger repeater resonators 4644, 4650, nor the device resonator of the front package 15854. Wireless energy may therefore pass from the source resonator 4646 to the device resonator of the front box 4654 via the repeater resonator of the back box 4644 without significantly energizing the device resonator 4648 of the back box.

In embodiments, efficient energy transfer may be realized when the Q of the source and/or repeater resonators is relatively high and the Q of the device resonators incorporated into the packaging are relatively low. Such lower Q resonators may comprise inductive elements comprising printed conductors, conducting inks, paints and the like. Inductive elements that are easy to manufacture and safe to dispose of may be preferable in packaging applications, even if the loss of these elements is higher than electronics grade copper, as an example. Higher loss conductors comprising carbon traces and/or lower conductivity but printable conductors may be suitable for this application because efficient power transfer may be realized using either or both higher Q source and repeater resonators.

In embodiments, whole new marking and communication capabilities may be realizable using this inventive wireless power transfer scheme. For example, by enabling wireless power transfer to product packaging, the packaging itself may include new functionality. For example, the packaging may include communications functionality that allows the displayed price to be updated via a wireless communication link. In a retail environment, a package may communicate with the cell phone of a consumer passing by, and cause the phone to ring or vibrate or emit a audible tone to alert the consumer to the fact that the product is on special, or has been improved, or has been reviewed, etc. In a warehouse environment, a package may communicate with a centralized database so that its location can be easily identified. For example, the UPS driver may not need to scan his packages anymore because the packages will be able to communicate wirelessly with tracking software in the warehouse, in the truck, and may be further integrated with a GPS tracking scheme so that rather than just saying "on truck'", a packaged could be tracked to the street location of the truck at a given time. Maybe the truck route could be displayed along with a more accurate estimated arrival time.

Wireless communication functionality might also be used to form ad hoc networks of multiple packages and the display capabilities or light-up capabilities enabled by wireless power transfer may be further enhanced by creating synchronized displays involving multiple packages. For examples, the light-up functionality might be synchronized to create a flashing light display, or a display where the lights "run around the packaging". In addition to lights, wireless power may be used to power audible tones or to deliver marketing apps over a wireless link.

Wireless communication could be coupled with an "in-carriage" system that displays the cost of the contents of the carriage to the consumer. The carriage could have wireless power capability to supply power to packages in the cart. The carriage could be powered by rechargeable batteries that are wirelessly recharged as the carriages sit at the carriage stands or the carriages could be powered from source coils in the floor as the carriages are pushed around a store. For fast selling items like the tickle me elmo or iphone, a consumer could download an app on their phone that allows them to instantaneously get a count of how many products are available at any given store.

Wireless power apps could include maps of power sources, power management and sharing, billing if you let someone have some of your power (their credit card could pay you before you share your power, or you could choose to exchange it for free) it might happen without you even knowing it. You could set your phone so that you always share power with a paying customer as long as you are at least 50% charged. You could also set your phone to be pinging for available power at a certain price any time your charge state gets below a certain level. You could set it to pay more for power when you reach a certain critical power level. Apps might be coordinated with sales, coupons, etc information that is wirelessly transmitted by wirelessly powered devices. Apps might link certain products with recipes or consumer reviews or allow a user to comment or input data that could be made available for other app users. Warnings could be displayed like spinach is currently suspected to be the cause of an e-coli outbreak. Foods or products that need to be recalled might be able to identify themselves on a shelf so that they can be identified and removed by store employees or avoided by consumers.

Wireless Software Modeling Tool

Figure 47:
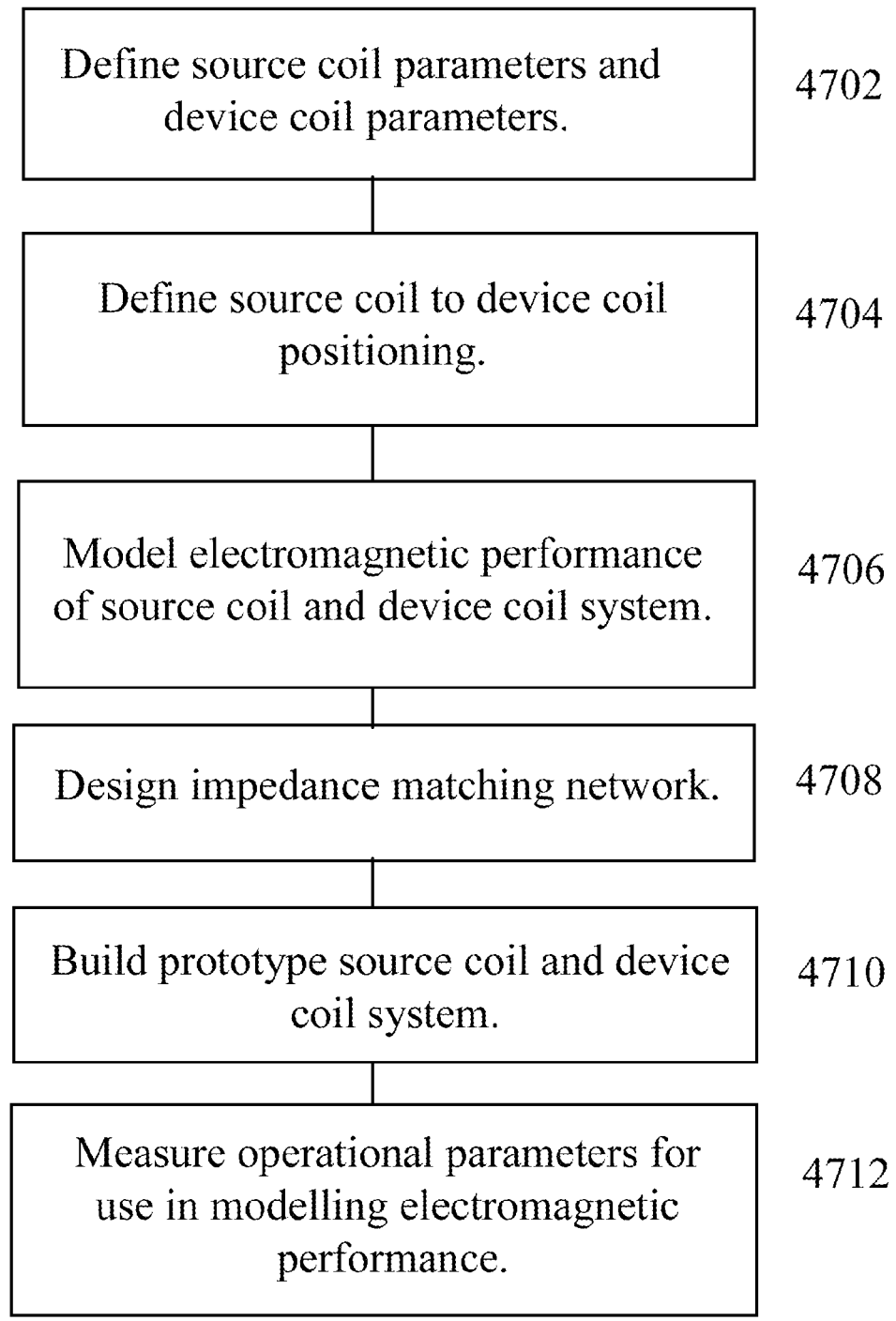
FIG. 47 is a flow chart of a method according to an exemplary and non-limiting embodiment.

With reference to FIG. 47, there is illustrated an exemplary embodiment of a method for modeling parameters relevant to the design and operation of systems for the wireless transfer of power using magnetic resonance. Because of the multiplicity of parameters that may be adjusted to achieve a desirable system, particularly a system involving a source resonator and a device resonator, the mathematical computations required to arrive at a solution for the optimal or near optimal operation of such a system may prove to be prohibitive. Specifically, as changes in any one parameter may affect the values of other related parameters that may in turn influence yet other parameter values, and so on, the ability to arrive at a solution for the multi-dimensional problem space comprised of every possible combination of parameters and attendant parameter values may require unobtainable computational resources.

In accordance with various exemplary and non-limiting embodiments, the amount of computations required to arrive at a near optimal solution for a source and device resonator system operating in accordance with desired, user specified parameter values is substantially reduced via a method of separately modeling (1) the design of both the source resonator and device resonator and (2) the interaction between the source resonator and device resonator. Specifically, it has been observed that the Q values of each of the source resonator and device resonator may be modeled separately while having little effect on the coupling coefficient k between the source resonator and device resonator. Breaking down the modeling process to perform these two forms of modeling separately reduces the number of parameters required to be modeled for either form individually. This reduces greatly the number of computations required to be performed in both instances while the results may be combined as described more fully below.

At step 4702, input parameters defining the attributes of at least one source and device resonator, comprising at least one source coil and at least one device coil, respectively, may be specified. Specifically, parameters corresponding to each of the at least one source coil and the at least one device coil may be specified individually. Then, at step 4704, attributes defining both the source coil and the device coil vis-a-vis one another may be specified. Next, at step 4706, the electromagnetic performance of the specified system comprising the source resonator and the device resonator may be modeled with the results used at step 4708 to design at least one impedance matching network (IMN). Note that the at least one source and the at least one device may comprise resonators, coils, and impedance matching networks. The impedance matching networks of the source and device may be designed to achieve certain system capabilities such as delivering a range of powers, maintaining a maximum output voltage, and/or open circuit voltage, operating at a certain bus voltage, and the like. In this disclosure, it should be understood that, designing the impedance matching network, step 4708, may comprise designing an impedance matching network for a source and/or an impedance matching network for a device. In some embodiments, the source and or device may have a predesigned, and/or pre-specified, impedance matching network, and the step 4708, may be used to determine any remaining impedance matching circuits for the system. Lastly, the 4710 system thus modeled may be built and operational parameters measured to be used as recursive inputs to step 4706 for incrementally improving the design of the system.

Figure 48:
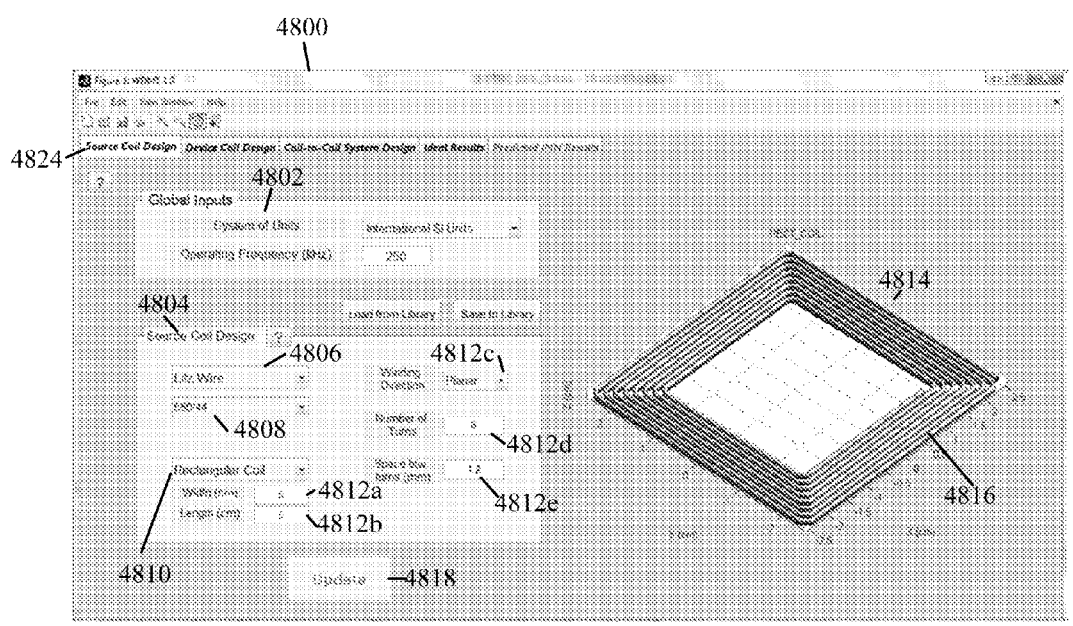
FIG. 48 is an illustration of a user interface for entering source coil design parameters according to an exemplary and non-limiting embodiment.

With reference to FIG. 48, there is illustrated an exemplary and non-limiting embodiment of a user-interface 4800 for entering source coil design parameters. As illustrated, user-interface 4800 may be displayed in response to an activation of source coil design tab 4824. While the following examples make use of various graphical user interface (GUI) elements, such as text entry fields, drop down menus and the like, it is understood that any and all GUI elements may be utilized to output and display data as well as to accept inputted data. In embodiments, users of a software modeling tool may access the input and output parameters using command lines, scripts, tables, links, and the like. Such methods of inputting and outputting parameters and/or data to the tool do not deviate from the methods, techniques, and embodiments described here.

As illustrated, global input panel 4802 may be comprised of a plurality of entry fields that accept parameter values for the system as a whole including, but not limited to, system units and an operating frequency of the system. Source coil design panel 4804 may be comprised of a plurality of entry fields that accept parameter values defining a source coil. As illustrated, a wire type entry field 4806 may comprise a drop down menu for selecting a wire type such as, for example, litz wire, solid core wire, copper tubing, printed circuit board trace, and the like, while wire attribute field 4808 may comprise a drop down menu for more specifically defining the physical dimensions of a selected wire type.

Source coil type field 4810 may be a drop down menu for defining a source coil type. In the present example, a rectangular coil has been chosen. Exemplary coil type attribute fields 4812a-4812e allow a user to input desired attribute values corresponding to the chosen source coil type. For example, a rectangular source coil is in part defined by the width and length of the rectangular source coil. As a result, coil type attribute fields 4812 may be selectively displayed for receiving inputted width and length dimensions. Various other exemplary coil type attribute fields include, but are not limited to, fields corresponding to source coil winding direction, source coil number of turns, and source coil spacing between the turns.

Once defined via global input panel 4802 and source coil design panel 4804, a source coil diagram 4814, such as a planimetric rendering, of source coil 4816 may displayed reflecting the chosen source coil attributes discussed above. In accordance with an exemplary embodiment, changes to any of the global input panel 4802 and source coil design panel 4804 input fields may result in the real-time, or near real-time, updating of a source coil diagram 4814 to reflect such changes. In another exemplary embodiment, source coil diagram 4814 may be updated at the request of a user such as via activation of update button 4818.

Figure 49:
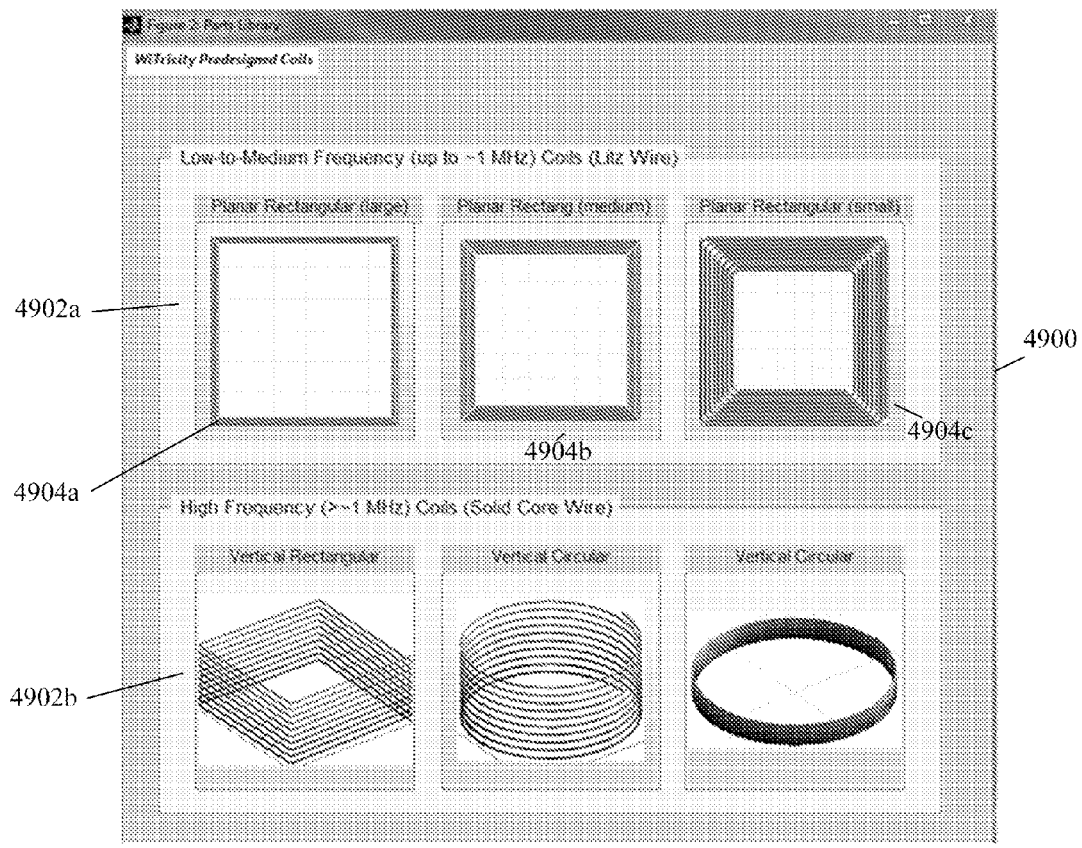
FIG. 49 is an illustration of a user interface for selecting source coil designs according to an exemplary and non-limiting embodiment.

Once defined, a user may save a source coil 4816 design for later retrieval and use such as in, for example, a parts library. Such saving of a source coil 4816 design may be achieved by activating, for example, a save button 4820. Likewise, previously saved or otherwise provided source coil 4816 designs may be loaded for use or for further modification such as by, for example, activating a load button 4822. With reference to FIG. 49, there is illustrated an exemplary and non-limiting embodiment of a user interface 4900 such as might be displayed in response to an activation of load button 4822.

As illustrated, each a plurality of groupings 4902a, 4902b each comprising one or more source coil designs 4904 may be displayed. In the present example groups 4902a, 4902b differ based upon frequency characteristics of the included source coil designs. Specifically, group 4902a is comprised of low-to-medium frequency source coil designs while group 4902b is comprised of high frequency source coil designs. In such instances, system 6400 operates to categorize saved source coil designs into logical groupings for display based, at least in part, upon attributes of each source design coil such as those described above as inputted via a user interface 4800.

In accordance with another exemplary and non-limiting embodiment, search input fields may be provided as forming a part of user interface 4900 to allow a user to define one or more search characteristics. For example, a user may select, such as from one or more drop down menus, selection criteria comprising rectangular coils having a minimum width of 5 cm. In response to such selection criteria, system 6400 may retrieve, such as from database in memory 6406, one or more source coil designs matching the specified search criteria. Once displayed, selection or activation of any source coil designs 4904 results in a return to user interface 4800 whereby the entry fields of global input panel 4802 and source coil design panel 4804 are filled in to reflect the retrieved attribute values of the selected source coil design.

Figure 50:
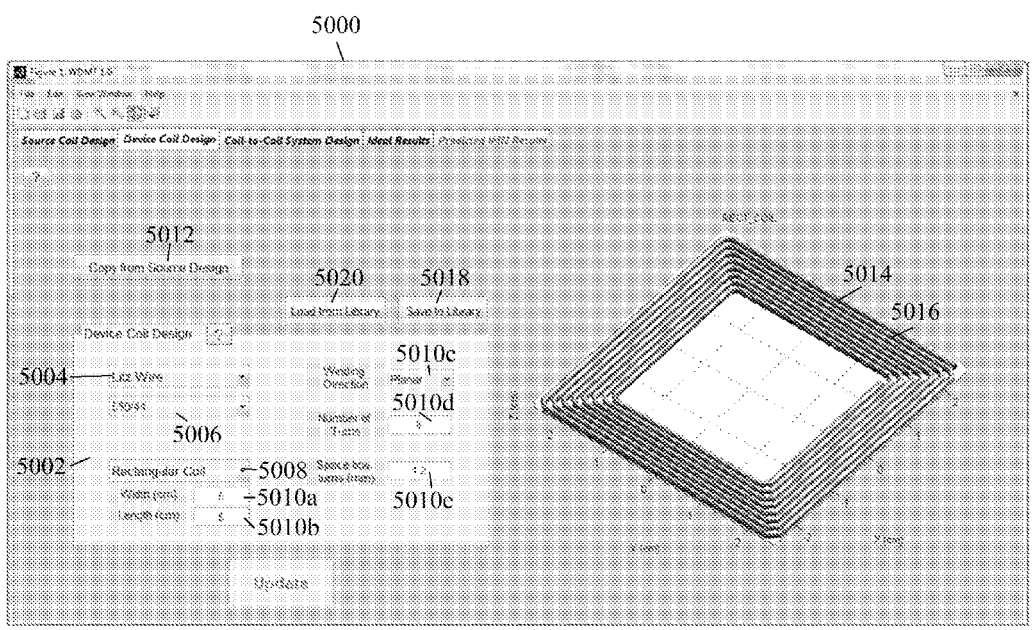
FIG. 50 is an illustration of a user interface for entering device coil design parameters according to an exemplary and non-limiting embodiment.

With reference to FIG. 50, there is illustrated an exemplary and non-limiting embodiment of a user-interface 5000 for entering device coil design parameters. As illustrated, user-interface 5000 may be displayed in response to an activation of device coil design tab 4824.

As illustrated, device coil design panel 5002 may be comprised of a plurality of entry fields that accept parameter values defining a device coil. As illustrated, wire type entry field 5004 comprises a drop down menu for selecting a wire type such as, for example, litz wire while wire attribute field 5006 comprises a drop down menu for more specifically defining the physical dimensions of a selected wire type. Note the wire types and/or dimensions available for the design of a device coil may be the same as those used in a source design or they may be different.

Device coil type field 5008 may be a drop down menu for defining a device coil type. In the present example, a rectangular coil has been chosen. Exemplary coil type attribute fields 5010a-5010e may allow a user to input desired attribute values corresponding to the chosen device coil type. For example, a rectangular device coil is in part defined by the width and length of the rectangular device coil. As a result, coil type attribute fields 5010 may be selectively displayed for receiving inputted width and length dimensions. Various other exemplary coil type attribute fields include, but are not limited to, fields corresponding to device coil winding direction, device coil number of turns, and device coil spacing between the turns.

In embodiments, resonators may be formed by source coils and device coils having similar or identical parameters. In such instances, it may be desirable to populate the fields of device coil design panel 5002 with the parameters defined with respect to source coil design panel 4804 (or vice versa). In accordance with an exemplary and non-limiting embodiment, a source design copy button 5012 may be provided and/or a device design copy button (not shown) may be provided. Activating a source design copy button 5012 (or a device design copy button) results in the retrieval of attributes defining a corresponding source coil (or device coil) design. These retrieved attributes may be then utilized as a starting point from which, if desired, to further refine parameter values defining the device coil (or source coil) design.

As before with reference to the source coil design of FIG. 48, a device coil diagram 5014, such as a planimetric rendering, of device coil 5016 may be displayed reflecting the chosen device coil attributes discussed above. In accordance with an exemplary embodiment, changes to any of the device coil design panel 5002 input fields may result in the real-time, or near real-time, updating of device coil diagram 5014 to reflect such changes. In another exemplary embodiment, device coil diagram 5014 may be updated at the request of a user such as via activation of update button 5018.

Once defined, a user may save a device coil design for later retrieval and use such as in, for example, a parts library. Such saving of a device coil design may be achieved by activating, for example, save button 5018. Likewise, previously saved or otherwise provided device coil designs may be loaded for use or for further modification such as by, for example, activating load button 5020.

Figure 51:
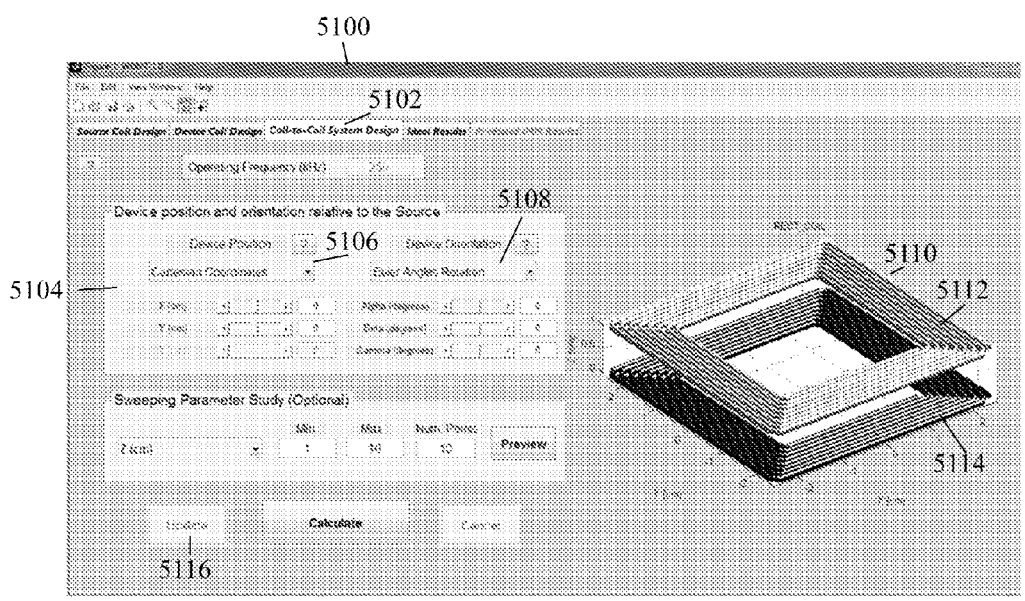
FIG. 51 is an illustration of a user interface for entering source coil and device coil position parameters according to an exemplary and non-limiting embodiment.

Once each of the source coil and the device coil forming a resonator have been defined as described above, attributes of the combined source coil and device coil may be defined. With reference to FIG. 51 there is illustrated an exemplary and non-limiting embodiment of a user-interface 5100 for entering source coil to device coil system design parameters. User interface 5100 may be accessed, for example, by selecting or otherwise activating coil-to-coil system design tab 5102.

In this exemplary embodiment, the device position and device orientation panels 5104 enables the input of various positional parameters defining the position and orientation of the device coil relative to the source coil. For example, device position fields 5106 may allow for the entry of a desired coordinate system, such as a Cartesian coordinate system, for example, in which a position of the device coil relative to the source coil may be specified as well as values defining the position of the device coil in the chosen coordinate system. Similarly, device orientation fields 5108 allow for the entry of a desired coordinate system, such as using Euler angle rotations, for example, in which an orientation of the device coil may be specified relative to the source coil, as well as values defining the orientation of the device coil in the chosen coordinate system.

Once the position and orientation of the device coil is defined, a resonator diagram 5110, such as a planimetric rendering, of the resonator comprising source coil 5114 and device coil 5112 may be displayed reflecting the chosen resonator coil attributes discussed above. In accordance with an exemplary embodiment, changes to any of the device position and orientation panel 5104 input fields may result in the real-time, or near real-time, updating of a resonator diagram 5110 to reflect such changes. In another exemplary embodiment, a resonator diagram 5110 may be updated at the request of a user such as via activation of update button 5116.

As described more fully below, an optional sweep parameter panel 5116 may be provided. Sweep parameter panel 5116 may define a series of discrete conditions under which the operation of the resonators is to be calculated, displayed, tested, and the like. In the present example, there is illustrated a situation wherein the distance, z, separating the source coil and the device coil is to be varied from a minimum distance of 1 cm to a maximum distance of 10 cm with calculations and/or predictions of the response of the resonator calculated at ten evenly spaced intervals between the minimum and maximum distance values. Note that there are a wide range of swept parameters, combinations of swept parameters, minimum and maximum values of swept parameters, ranges of swept parameters, spacings of swept parameters and the like, that may be realized using a software modeling tool. The embodiment described here is only a single exemplary embodiment.

There has therefore been described how various parameters defining the geometry and composition of individual source coils and device coils as well as resonators formed of a combination of a source coil and a device coil may be entered. In accordance with various exemplary and non-limiting embodiments, system 6400 may further operate to perform input validation as user's enter parameters to define the characteristics of source coils, device coils and resonators as described above. Specifically, system 6400 may operate to alert or prevent the occurrence of erroneous input field entries as well as the occurrence of data field entries that are individually compliant but are logically or physically inconsistent or incompatible with other input field entries.

Figure 52:
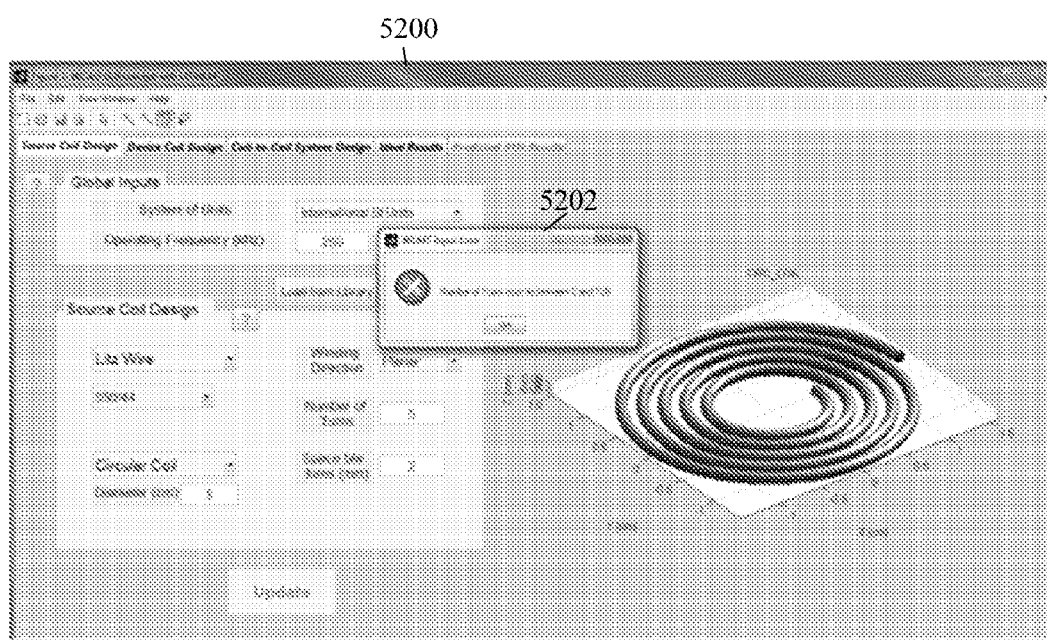
FIG. 52 is an illustration of an error message according to an exemplary and non-limiting embodiment.

With reference to FIG. 52, there is illustrated an instance of an error message according to an exemplary and non-limiting embodiment. In the example illustrated, user interface 5200 is displaying an error message 5202 alerting a user that the data entry field identifying the desired number of turns is outside of acceptable design parameters. In such an instance, upon dismissal of the error message 5202 by the user, the identified data field entry may be returned to a previous or default value within acceptable design parameters. As described, validation is performed at an individual data entry field level.

Figure 53:
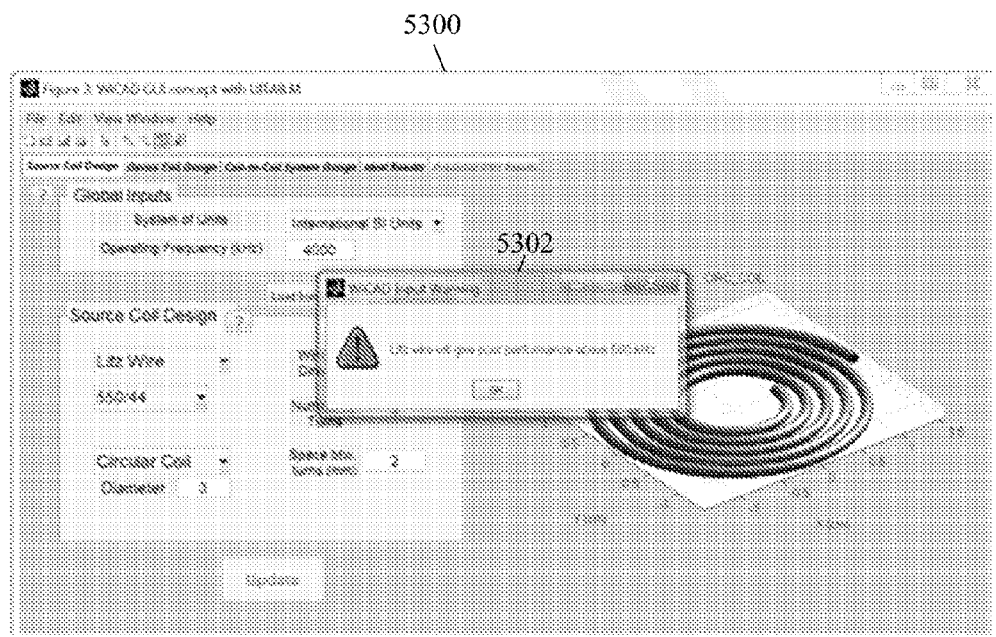
FIG. 53 is an illustration of an error message according to an exemplary and non-limiting embodiment.

With reference to FIG. 53, there is illustrated an instance of an error message according to another exemplary and non-limiting embodiment. In the example illustrated, user interface 5300 is displaying an error message 5302 alerting a user that the data entry field identifying the wire type is potentially inconsistent or incompatible with other data field entries. Specifically, in the present example, error message 5302 indicates that a selection of litz wire is inconsistent with the choice of an operating frequency of 4000 kHz. In such embodiments, system 6400 operates to warn users of poor choices for system parameters. In accordance with some exemplary embodiments, system 6400 may operate to suggest alternative parameters choices and values resulting in a diminution of inconsistency. As described, such validation is performed at a panel level.

Figure 54:
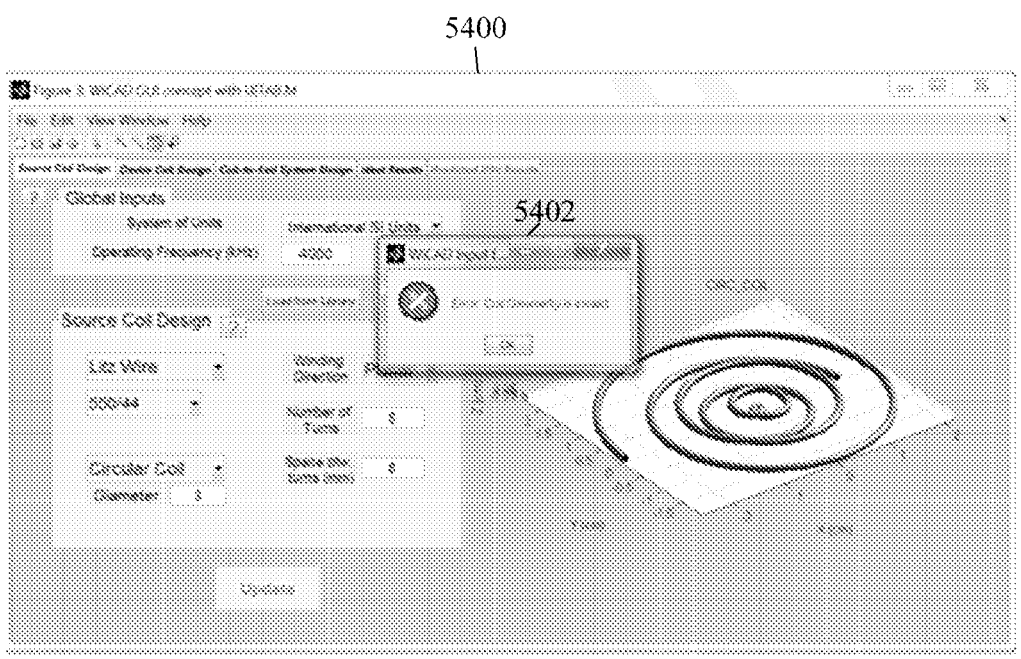
FIG. 54 is an illustration of an error message according to an exemplary and non-limiting embodiment.

With reference to FIG. 54, there is illustrated an instance of an error message according to another exemplary and non-limiting embodiment. In the example illustrated, user interface 5400 is displaying an error message 5402 alerting a user that the geometry of the source coil defined by the data field entries is invalid. In such embodiments, system 6400 operates to warn users of design errors. As described, such validation is performed at a tab level.

With continued reference to FIG. 47, at step 4706, the design parameters for the resonator having been defined, the electromagnetic performance of designed resonator may be modeled.

Figure 55:
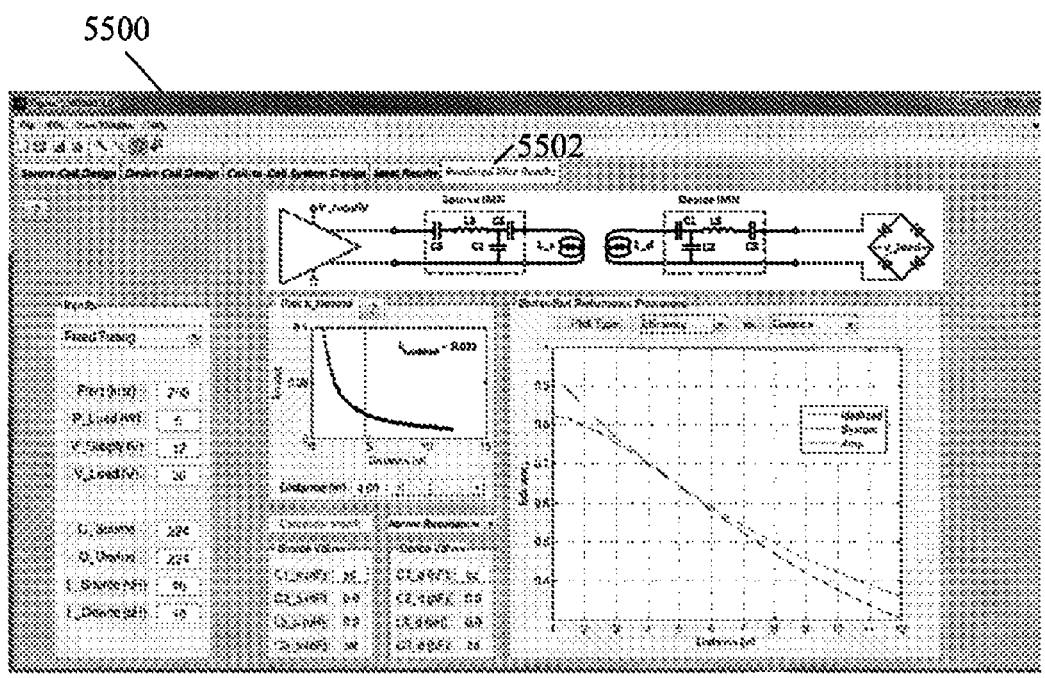
FIG. 55 is an illustration of a user interface according to an exemplary and non-limiting embodiment.

With reference to FIG. 55, there is illustrated an exemplary and non-limiting embodiment of a user-interface 5500 for computing and observing predicted IMN results for the system 6400 defined in steps 4702 and 4704. As illustrated, user-interface 5500 may be displayed in response to an activation of predicted IMN results tab 5502.

In accordance with exemplary and non-limiting embodiments, as described above, after predicting the electromagnetic performance of the system at step 4706, impedance matching networks may be designed at step 4708. Then, at step 4710, the system thus modeled may be built and operational parameters measured to be used as recursive inputs to step 4706 for fine-tuning and incrementally improving the design of the system.

In accordance with exemplary and non-limiting embodiments, this fine-tuning may involve a validation procedure where source and device coil parameters are measured. These parameters may be then fed back into step 4706 to calculate and/or re-calculate the matching circuit components for any and/or all of the impedance matching networks. The remaining process for assembling a wireless power system may involve populating actual components on source and device electronics boards and measuring resulting input impedances. Measured data from assembled components may be then fed back into the system to finalize the matching component values for the optimum performance.

Proper design and construction of the impedance matching networks (IMN) on the source and device resonators may ensure safe and reliable operation of the system over a range of source and device configurations. Typically, these configurations may involve a range of device positions (with respect to the source), in which the device may be under both nominal and open-circuit load conditions. In accordance with exemplary embodiments, designed IMNs may ensure appropriate power extraction from the source amplifier and the delivery of this power to the device (without the need for active control) under all nominal configurations. When the device load is open-circuited (as is the case for, e.g., a fully-charged battery), the source and device IMNs may transform the open circuit in such a way as to minimize the power drawn from the source amplifier. In accordance with exemplary and non-limiting embodiments, the impedance matching networks may be designed so that the maximum open-circuited load voltage is less than any voltage limitations, regulations, specifications, and the like, associated with any or all of the device electronic circuits and components.

Figure 56:
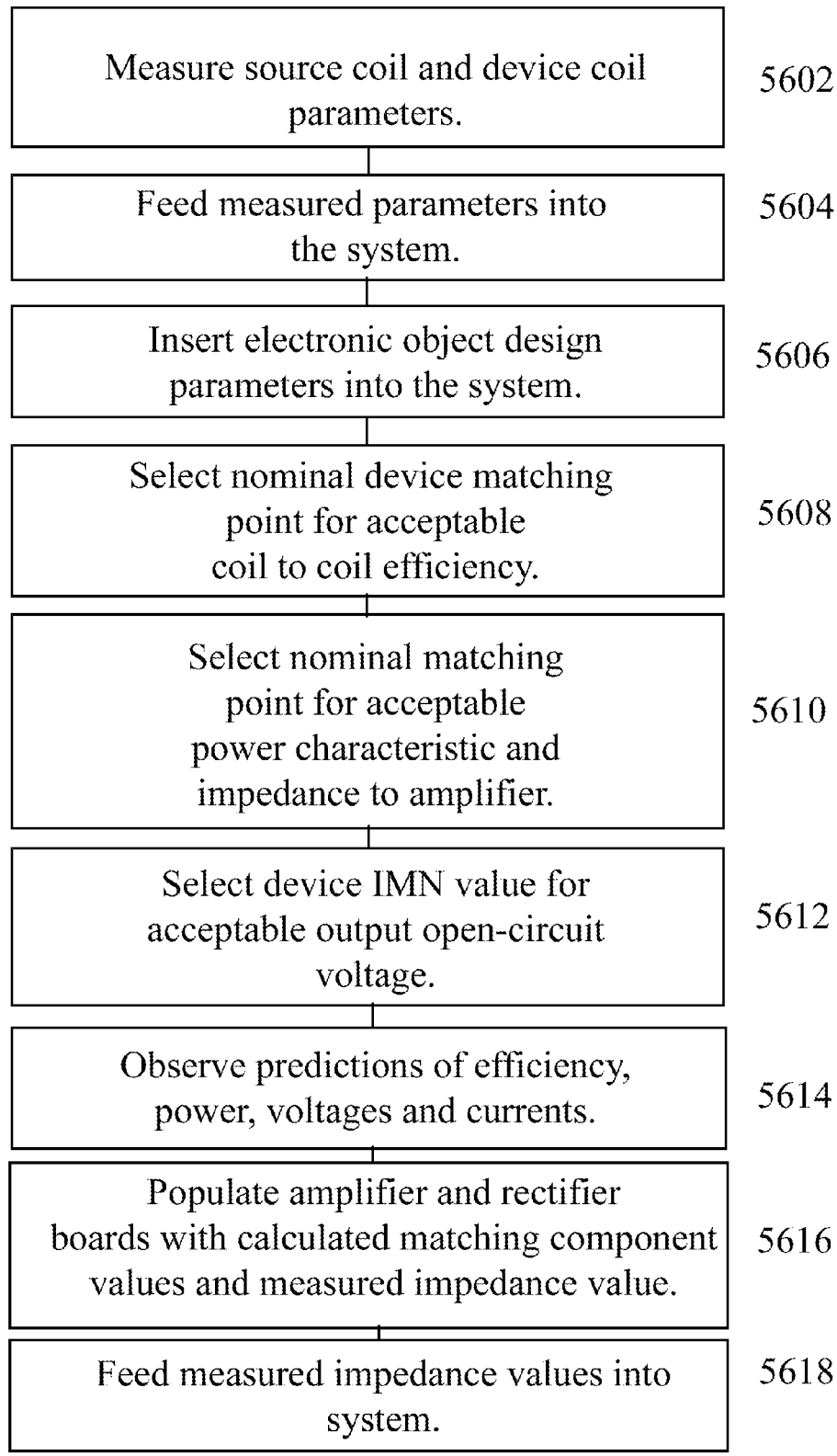
FIG. 56 is a flow chart of a method according to an exemplary and non-limiting embodiment.

With reference to FIG. 56, there is illustrated the steps of a validation process according to an exemplary and non-limiting embodiment. First, at step 5602, source and device coil parameters such as the quality factor, self-inductance, and coupling factor may be measured. Then, at step 5604, the measured coil parameters as well as amplifier and rectifier parameters may be fed into the system. Then, at step 5606 electronic object design parameters such as the power supply, amplifier, rectifier, and device load parameters may be inserted into the system. Next, at step 5608, a nominal device matching point for an acceptable coil-to-coil efficiency characteristic may be selected. The nominal device matching point may chosen from a set values calculated in a parameter sweep and/or it may be entered by a user without considering or having performed a parameter sweep. Next, at step 5610, a nominal source matching point and a value for the source IMN for an acceptable power characteristic and impedance to amplifier may be selected and/or calculated. Then, at step 5612, the device IMN value may be selected for an acceptable output open-circuit voltage (or other system specification). Then, at step 5614, predictions of efficiency, power, voltages and currents at a certain operating point or as a function of sweeping parameter may be observed. Then, at step 5616, amplifier and rectifier boards may be populated with calculated matching components such as inductors, capacitors, switches, and the like, with the calculated values, or with values close to the calculated values and the input impedance measured. Lastly, at step 5618, the measured impedance values may be fed back into the system to adjust and finalize the matching component values.

Figure 57:
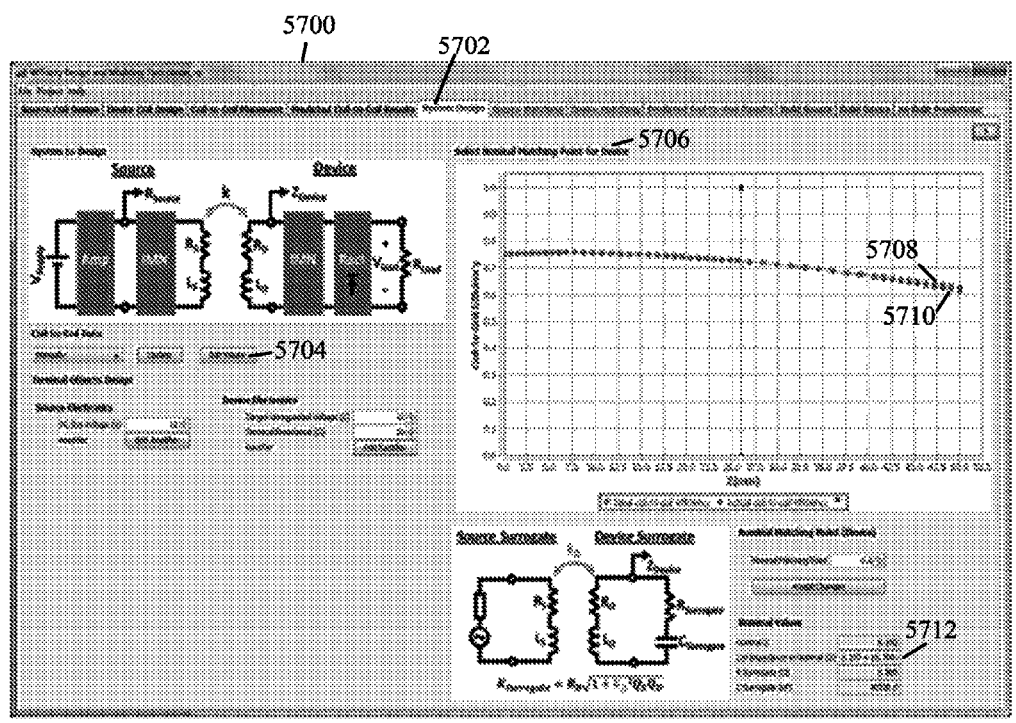
FIG. 57 is an illustration of a user interface according to an exemplary and non-limiting embodiment.

With reference to FIG. 57, there is illustrated an exemplary and non-limiting embodiment of a user-interface 5700 for entering system design parameters. As illustrated, user-interface 5700 may be displayed in response to an activation of system design tab 5702.

Figure 58:
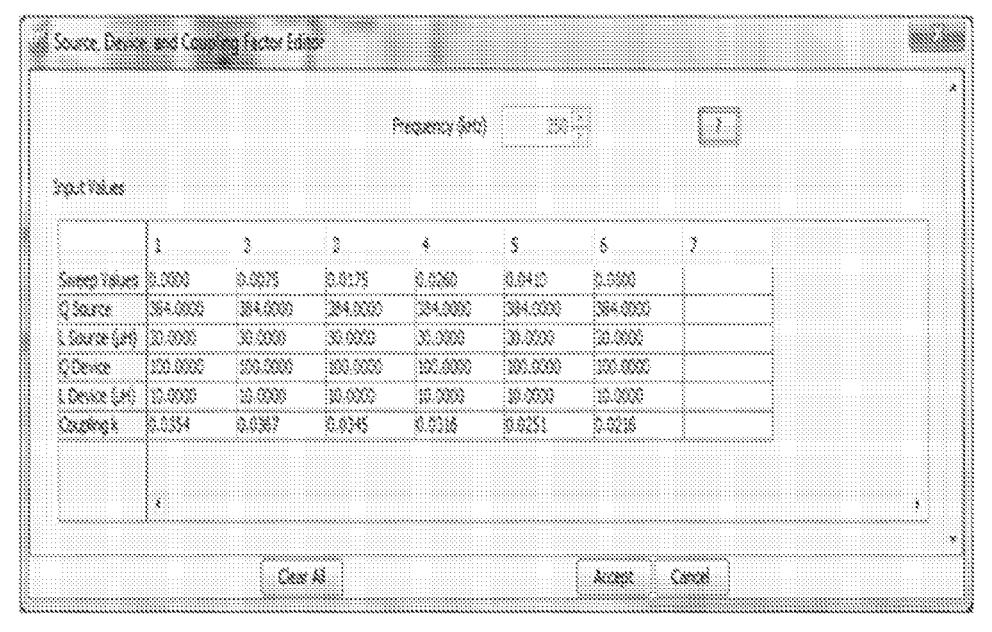

As illustrated, the left half of the user interface 5700 contains data entry fields for Coil-to-Coil data—including the Q, L, and k values. By clicking on the "Edit Values" button 5704, a table editor window may appear, illustrated in FIG. 58, allowing one to input the measured Q, L, and k values determined from 5602. In the present example the sweep values are in SI units, e.g. units of meters are utilized for translation values.

In this exemplary embodiment, Terminal Objects refers to the electronics attached to the power supply and load terminals. The design values for the Source Electronics and Device Electronics may be modified via the illustrated user interface elements. In the present example, these include specifications for the source-side power supply bus voltage and amplifier type (full-bridge switching amplifier, half-bridge switching amplifier, etc.), and the device side rectifier type (full-bridge, half-bridge, etc.) and load characteristics (resistance, open-circuited voltage, etc.).

On the right half of user interface 5700 is a panel 5706 labeled "Select Nominal Matching Point for Device". Panel 5704 may be utilized to perform the first step of designing the impedance matching network. In an exemplary embodiment, this step may involve picking a nominal matching point for the device which fixes the value of $Z_{device}$ as illustrated. The design criterion to pay attention to in this step may be the coil-to-coil efficiency. The first plot 5708 in panel 5706 shows the ideal coil-to-coil efficiency, which is reached when $Z_{device}$ is allowed to vary as a function of position, and the second plot 5710 shows the maximum possible coil-to-coil efficiency with a fixed $Z_{device}$. In some exemplary embodiments, the system may have a fixed $Z_{device}$.

The nominal matching point may be changed by clicking on the "Nominal Matching Point" spinner below panel 5706. As the nominal matching point is changed, the second plot 5710 may change in real-time, near real time, or as a result of activating a button or command. If the impedance matching networks are fixed, the software tool may suggest an impedance matching network that results in a system efficiency that is closest to the calculated coil-to-coil efficiency and the specified nominal matching point. That is, the second plot 5710 may be closest to the first plot 5708 at the nominal matching point, but may deviate more from the first plot 5708 at other points. Note that coil-to-coil efficiencies displayed on different tabs and/or reported at different stages in the design process may not reflect the electronics and components losses associated with the amplifier and rectifier designs, and therefore, the final end-to-end efficiency will be lower than the second plot 5710.

By reviewing the predicted performance of the system designed for various nominal matching points, the user may then select the nominal matching point that yields an acceptable coil-to-coil efficiency profile across the entire range of sweeping parameters. Final selections of design parameters may be entered into the software modeling tool by saving the parameters by any known method, including, for example, clicking on an "Accept Change" button which may be programmed to enter the selected values into the system. If needed, the parameters in Terminal Objects may be adjusted until the changes are successfully accepted.

Nominal values display 5712 may be a display of the nominal values for the device parameters, including the values of $R_{surrogate}$ and $C_{surrogate}$. These may be the actual component values to be used to support construction of the source IMN. That is, the surrogate values are not the final device IMN values, but rather a network that may be used to support accurate and efficient assembly of the source electronics and impedance matching networks. The device IMN may be designed in another tab, or section of code, and may be reported to the user once a source has been assembled and characterized. In embodiments, the device IMN may be calculated and reported at the same time as the source IMN, and both the source and device may be assembled without the intermediate step involving surrogate circuits.

Figure 59:
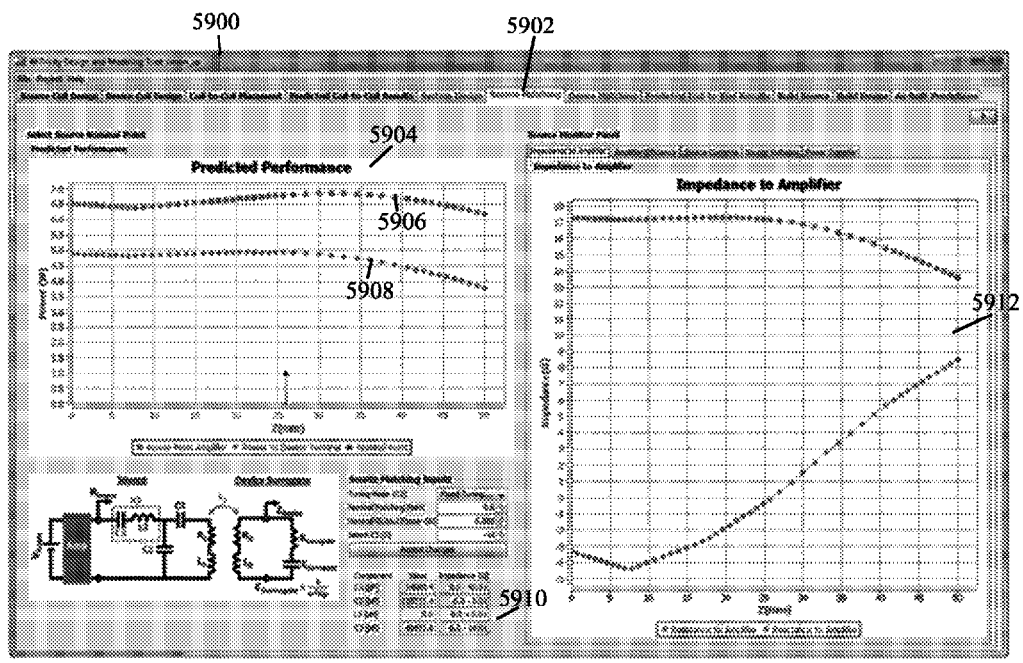
FIG. 59 is an illustration of a user interface according to an exemplary and non-limiting embodiment.

With reference to FIG. 59, there is illustrated an exemplary and non-limiting embodiment of a user-interface 5900 for performing a step in determining and/or assembling an impedance matching network. As illustrated, user-interface 5900 may be displayed in response to an activation of source matching design tab 5902. In accordance with exemplary embodiments, after this step, a source design may be complete. In some assembly steps, coil-to-coil efficiency may be used as a design criterion. In other assembly steps, power flow may be used as a design criterion. In exemplary embodiments, source impedance matching network design and assembly methods, results, techniques, and the like, may utilize power flow as a metric of design and assembly quality and/or suitability.

In the top left panel 5904 are plotted two curves. First curve 5906 is the predicted power output from the amplifier and second curve 5908 the predicted power delivered to the device load. Below panel 5904 are three data-entry fields under Source Matching Inputs. One may utilize the up/down arrows on the spinner controls to the right of the data-entry fields to adjust their values.

In accordance with an exemplary and non-limiting embodiment, an example design sequence is as follows. First, the nominal matching point for the source is selected by pressing the up/down arrows on the nominal matching point spinner. At this nominal point, a fixed output power is extracted from the amplifier. This point may be moved to the center of the desired output range.

Next, the nominal output power may be selected by pressing the up/down arrows on the nominal output power spinner. This determines the power output from the amplifier at the nominal matching point from the previous step. This value may be increased to ensure enough power is delivered to the load over the desired operating range. While this adjustment may change the shape of the overall power delivery curve, the power delivery curve may be readjusted in the next step.

Finally, the reactance value for X3 in the source IMN may be set by pressing the up/down arrows on the X3 slider. This will adjust the shape of the power delivery curve. The value of X3 may be changed so that the curve is approximately symmetric about the nominal matching point. In accordance with exemplary embodiments, there may be two solutions with acceptable curves, one with a positive X3 (an inductor), and one with a negative X3 (a capacitor).

As illustrated, the computed source IMN components appear in panel 5910 below the controls. The components may be inspected to determine if they are acceptable for the intended application. If acceptable, clicking on the "Accept Changes" button will accept all changes for storage on the system. If the values are not acceptable, then the user should return to the previous steps and select different parameters for the system design until a suitable and/or acceptable impedance matching network has been designed by the tool.

Panel 5912 displays the impedance presented to the amplifier, as well as component currents and voltages for verification that all values are within acceptable ranges (e.g., that voltage levels are within component tolerances). At this point, one may go back and adjust the nominal matching point, the nominal power output, and/or the X3 spinners if the components are determined to be unacceptable for the intended application.

Having set the nominal matching point (coil-to-coil configuration) and determined the source IMN components, a value of X3 may be selected for the device IMN, which will fully determine the device IMN components. The design criterion here may be the open-circuit voltage across the load terminal on the device. This parameter may be important when, for example, the load is a DC/DC converter with a maximum input voltage tolerance.

Figure 60:
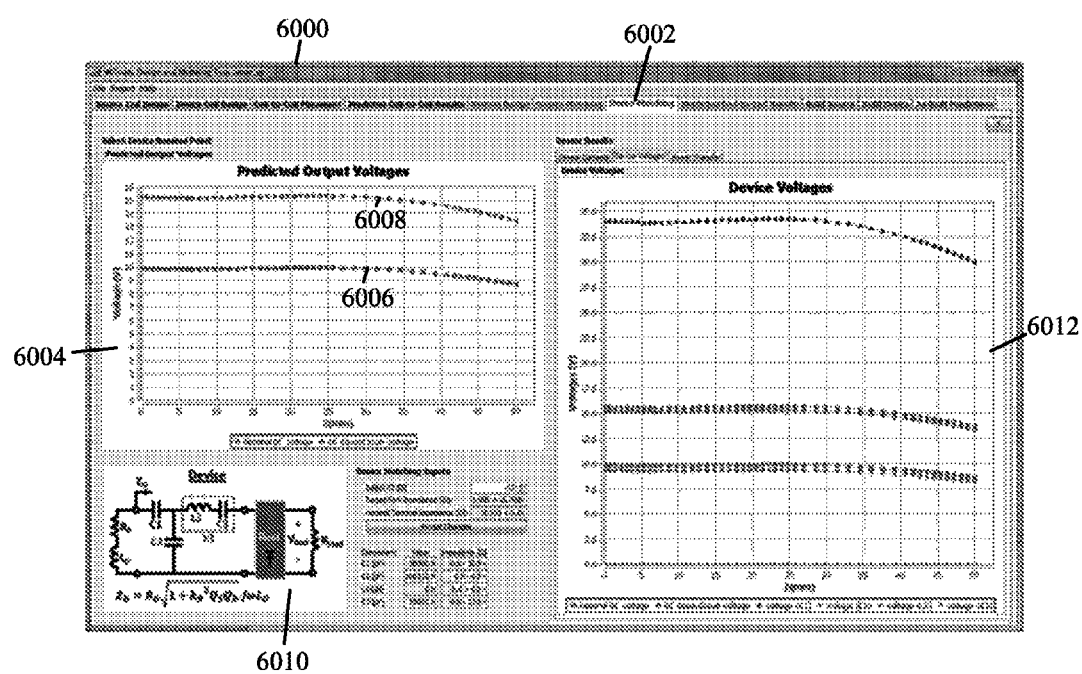
FIG. 60 is an illustration of a user interface according to an exemplary and non-limiting embodiment.

With reference to FIG. 60, there is illustrated an exemplary and non-limiting embodiment of a user-interface 6000 for performing a next step in impedance matching. As illustrated, user-interface 6000 may be displayed in response to an activation of device matching design tab 6002. Panel 6004 plots the nominal load voltage 6006 and the open-circuit load voltage 6008, as a function of the sweeping parameter. Below panel 6004 is a control for adjusting the device X3 and optimizing another design criterion—the open circuit voltage. Varying the device X3 may change the open-circuit voltage profile, without changing the nominal load voltage profile. The open circuit voltage is what appears at the load terminals if, for example, the load is a battery charger that has finished charging a battery. X3 may be varied, for example, by clicking on the spinner arrows until an open-circuit voltage profile has been obtained. When the value of X3 is set, the device IMN components are displayed in panel 6010. If X3 is a positive reactance, L3 will be non-zero and C3 will be infinite (short circuited). If X3 is negative, C3 will be finite and L3 will be zero.

After deciding on a value for X3, panel 6012 displays device component currents, voltages, and power dissipation to ensure that all quantities are within the component tolerances.

Figure 61:
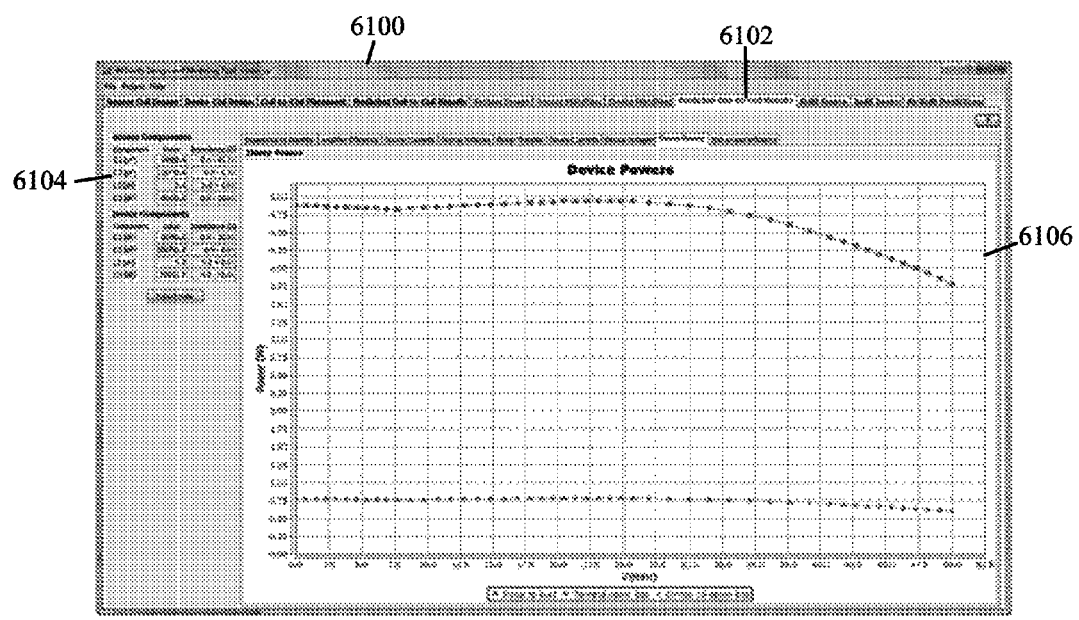
FIG. 61 is an illustration of a user interface according to an exemplary and non-limiting embodiment.

With reference to FIG. 61, there is illustrated an exemplary and non-limiting embodiment of a user-interface 6100 for displaying computed source and device IMN component values. As illustrated, user-interface 6100 is displayed in response to an activation of predicted end-to-end results tab 6102. Panel 6104 displays the computed source and device IMN component values. Panel 6106 displays plots of a range of physically relevant quantities, including the currents and voltages from the previous tabs. Also included is the end-to-end efficiency prediction for the system, including losses in the electronics. These predictions may be checked before proceeding to verify that all predicted quantities lie within an acceptable range.

Figure 62:
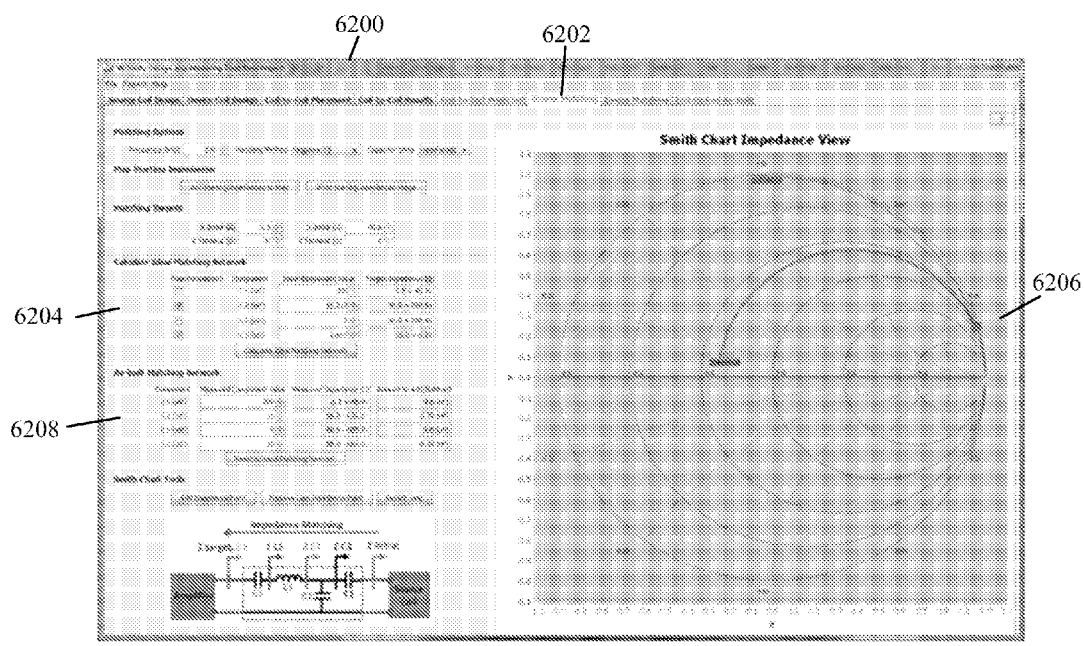
FIG. 62 is an illustration of a user interface according to an exemplary and non-limiting embodiment.

In accordance with exemplary and non-limiting embodiments, the system operates to guide one through the process of physically constructing the source- and device-side IMNs. As both follow a similar workflow, both the source matching user interface and the device matching user interface are described more fully below with reference to source matching user interface 6200. With reference to FIG. 62, there is illustrated an exemplary and non-limiting embodiment of a source matching user-interface 6200. As illustrated, user-interface 6200 is displayed in response to an activation of source matching tab 6202.

As described more fully with references to exemplary and non-limiting embodiments of device and source build user interfaces below, initial and target impedances are shown in the "Matching Targets" panel on the left. The source IMN will transform $Z_{initial} = R_{initial} + jX_{initial}$ to $Z_{final} = R_{final} + jX_{final}$. $Z_{initial}$ refers to the impedance on the coil side of the "T" IMN. $Z_{final}$ refers to the impedance that should be seen from the terminal—either by the amplifier for the source side and or by the load for the device side.

Each user interface 6200 is designed to show the ideal or near ideal matching components determined in the previous tabs and to compare them to measured values of as-built components as they are soldered in.

For example, the calculated source IMN components from the Source Matching user interface 5900 are displayed on the left side in the "Calculate Ideal Matching Network" panel 6204. There are additional controls that allow one to vary component values and recalculate the match. This is useful, for example, if the inductance of the L3 inductor in inventory is larger than the predicted ideal component value. By activating the check-boxes for C2 and C3 to be free parameters, the match may be recalculated. This will result in a finite value of C3 that trims out the excess reactance from L3. Users may utilize such a feature to customize the IMN as desired (e.g., by reducing sensitivity to variations in certain component values).

On each user interface 6200, a Smith Chart 6206 illustrates the trajectory the impedance takes as components are successively populated. Starting from the initial impedance $Z_{initial}$ at the top of the Smith Chart 6206, as the reactance associated with C1 becomes more negative (increasing C1), the impedance traces out the curve to the end-point labeled C1. As the admittance associated with C2 increases (increasing C2), the resulting impedance traces out the dark blue curve. If L3 were non-zero, the impedance would trace out a green curve. Finally, as C3's reactance becomes more negative (decreasing C3), the net impedance seen from the terminal traces out the red curve. By viewing how the traces change as components of the ideal or near-ideal IMN vary, one can build intuition about the behavior and sensitivity of each component.

As described more fully below, "As-built Matching Network" panel 6208 allows one to track the effective value of components soldered into the IMN. Solder pads and traces may have some parasitic capacitances and inductances, and capacitor values may not be exactly equal to their listed value. Variations of a few percent can cause significant deviations in the IMN behavior, as can be seen by changing the values of the "Ideal IMN" components.

The As-Built panel 6208 may be utilized as follows: beside each component value is a field showing what the impedance at the component is given its current value and the value of the other downstream (towards the source coil) components. The value of the current component may be adjusted until the displayed impedance matches as closely as possible the value measured from the network analyzer, or any equivalent measurement equipment. The component value thus displayed is the actual component value on the board, including parasitics and natural component value variation. The far right text field on this row displays the amount to add/subtract in order to get to the desired IMN value.

In embodiments, when soldering capacitors into the impedance matching networks, it may be preferable to start by soldering in a component with a specified value equal to approximately 80% of the desired value. Then, once the effective capacitor value is deduced using the as-built user interface, the remaining value can be added. This technique may reduce the amount of times a capacitor needs to be unsoldered from the network and replaced with a different one. If soldering and unsoldering capacitors are equally desirable or undesirable, there may not be a need to initially solder in lower capacitance components. Using the matching tool in this way enables the user to construct the matching network to high accuracy.

Figure 63:
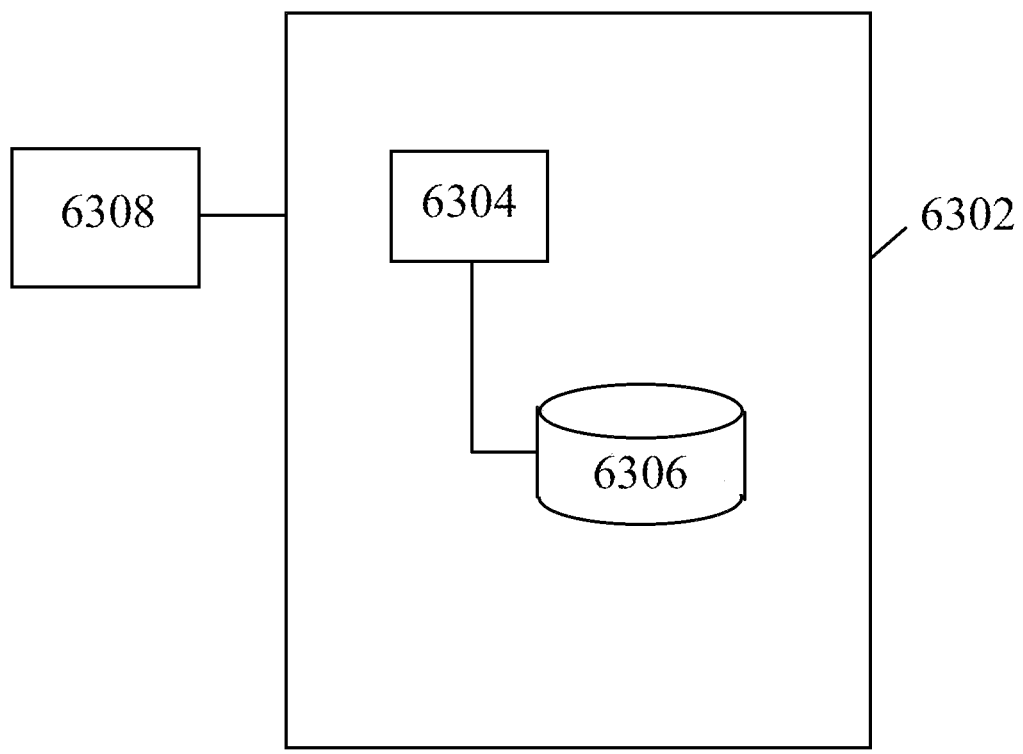
FIG. 63 is an illustration of an exemplary system according to an exemplary and non-limiting embodiment.

With reference to FIG. 63, there is illustrated a block diagram of a system 6300 for practicing various exemplary and non-limiting embodiments of the software modeling tool described above. A computing device 6302, including, but not limited to, a personal computer, server, PDA and the like comprises a processor 6304 and attendant memory 6306.

Processor 6304 may be enabled to execute software instructions such as may be stored in a computer readable medium such as, for example, memory 6306, to perform the software steps described above. User interface 6308 enables the entry of data and information, such as from a user, and the display of information to a user.

Figure 64:
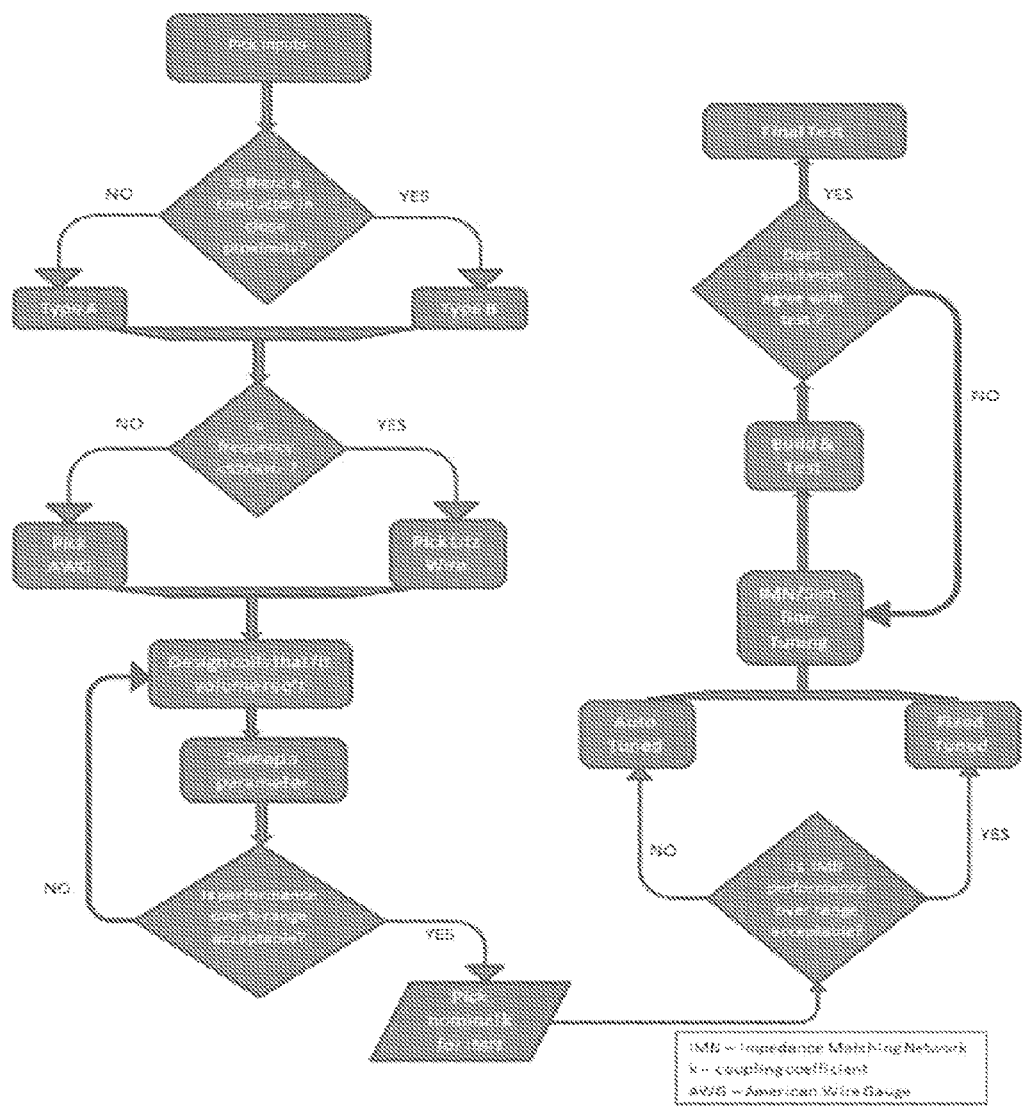
FIG. 64 is a flow chart of a method according to an exemplary and non-limiting embodiment.

In accordance with other exemplary and non-limiting embodiments a design and modeling tool may be used to assist a designer in developing a wireless energy transfer system, from initial concept to final test. A flow chart depicting the main steps of the design and modeling tool is shown in FIG. 64. The main steps of the design tool are as follows.

Initially, a designer may pick inputs such as frequency, power, coil geometry, and other parameters that are suited for an application.

Next, the choice of a type of resonator coils (shielded or unshielded) may be determined by whether or not extraneous conductors are nearby. Extraneous objects may be susceptible to parasitic eddy currents that may reduce the Q of one or both resonators. A shielded resonator coil may typically be preferable near extraneous conductors, but may be slightly larger than an unshielded resonator coil of a similar surface area. In other applications, the choice of resonators may be between approximately planar coils and three-dimensional coils, such as a helix and the like. Helical coils may have increased alignment tolerance but could be more difficult to package.

Next, frequency considerations and choices such as resonator conductor choices may be made in the modeling tool. For example, Litz wire may be chosen as the conducting material because it works well below the AM radio band (<520 kHz) and solid core wire may be chosen where it may work better, such as at higher frequencies (e.g. the ISM bands at 6.78 and 13.56 MHz).

Next, the highest Qs and coupling coefficients may be calculated for various coil designs. A few iterations may be utilized to study how different coil parameters affect Q and coupling (k) over a swept parameter range, such as distance between coils.

Next, once acceptable coupling between coils is realized, the designer may pick a nominal value of the sweep parameter (e.g. distance) to calculate the optimum IMNs (Impedance Matching Networks) to couple the resonators to the source and device electronics. If the chosen nominal value is a distance, that distance will correspond to a nominal value of coupling coefficient k.

Next, the designer may calculate a power-transfer curve plotted as a function of the sweep parameter. In many cases, a fixed-tuned amplifier may provide adequate performance. In some cases, an auto-tuned amplifier and/or rectifier that can dynamically change the IMN may provide extended performance over the sweep parameter.

Then, in the lab, the designer may attach the IMN components onto inductive elements or coils and make a few measurements on a network analyzer, oscilloscope, and the like to fine-tune the parameters in the simulator. The user may build and test the system and compare the measurements to the simulation output. After one or two iterations, the user may make small adjustments to capacitors, inductors, and the like, or to simulation parameters to improve the agreement between the simulation and measurements.

Lastly, the source and device resonators may be packaged and go through final testing. The designer may use the simulator and the modeling tool to provide what-if analyses. For example, what is the expected tolerance of the system to orientation variations? Or, how much worse is the efficiency at another distance?

While the invention has been described in connection with certain preferred embodiments, other embodiments will be understood by one of ordinary skill in the art and are intended to fall within the scope of this disclosure, which is to be interpreted in the broadest sense allowable by law.

All documents referenced herein are hereby incorporated by reference in their entirety as if fully set forth herein.

What is claimed is:

1. A computer-implemented method comprising:
a) defining and storing, through a computer-implemented user interface, one or more attributes of a source resonator and a device resonator forming a wireless energy transfer system;
b) defining and storing, through the user interface, information about an interaction between the source resonator and the device resonator;
c) modeling, one or more electronic processors, an electromagnetic performance of the wireless energy transfer system to derive one or more modeled values based on the received one or more attributes of the source and device resonator;
d) generating, using the one or more electronic processors, a design of an impedance matching network based on the derived one or more modeled values; and
e) using the one or more electronic processors to provide, through the user interface, a visual representation of information about the modeled electromagnetic performance of the wireless energy transfer system and the generated design of the impedance matching network.

2. The method of claim 1 wherein:
the one or more attributes of the source resonator comprises at least one source resonator parameter selected from the group consisting of source resonator wire type, source resonator length, source resonator width, source resonator coil winding direction, source resonator coil number of turns and source resonator coil spacing between turns; and
the one or more attributes of the device resonator comprises at least one device resonator parameter selected from the group consisting of device resonator wire type, device resonator length, device resonator width, device resonator coil winding direction, device resonator coil number of turns and device resonator coil spacing between turns.

3. The method of claim 1 wherein defining and storing the one or more attributes of the source resonator and the device resonator comprises using the one or more electronic processors to provide alerts to the user interface, the alerts being indicative of one or more logical or physical incompatibilities between the defined one or more attributes.

4. The method of claim 1 wherein defining and storing the one or more attributes of the source resonator comprises retrieving a previously defined source resonator through the user interface and defining and storing the one or more attributes of the device resonator comprises retrieving a previously defined device resonator through the user interface.

5. The method of claim 1 wherein the interaction between the source resonator and the device resonator comprises at least one system parameter selected from the group consisting of a sweep parameter and source/device resonator separation distance.

6. The method of claim 1 further comprising:
f) building a physical system based, at least in part, upon the impedance matching network;
g) measuring at least one attribute of the physical system; and h) repeating step c wherein the at least one measured attribute of the physical system is utilized to model the electromagnetic performance of the system.

7. A non-transitory computer-readable medium containing a set of instructions that causes a computer to:
   enable the defining through a computer-implemented user interface of one or more attributes of a source resonator and a device resonator forming a wireless energy transfer system;
   enable the defining through the user interface of information about an interaction between the source resonator and the device resonator;
   model an electromagnetic performance of the wireless energy transfer system to derive one or more modeled values based on the defined one or more attributes of the source and device resonator;
   generate a design of an impedance matching network based on the derived one or more modeled values; and
   provide through the user interface a visual representation of information about the modeled electromagnetic performance of the wireless energy transfer system and the generated design of the impedance matching network.

8. The computer-readable medium of claim 7 wherein:
   the one or more attributes of the source resonator comprises at least one source resonator parameter selected from the group consisting of source resonator wire type, source resonator length, source resonator width, source resonator coil winding direction, source resonator coil number of turns and source resonator coil spacing between turns; and
   the one or more attributes of the device resonator comprises at least one device resonator parameter selected from the group consisting of device resonator wire type, device resonator length, device resonator width, device resonator coil winding direction, device resonator coil number of turns and device resonator coil spacing between turns.

9. The computer-readable medium of claim 7 wherein the enabling the defining of the one or more attributes of the source resonator and the device resonator comprises providing alerts indicative of one or more logical or physical incompatibilities between the defined one or more attributes.

10. The computer-readable medium of claim 7 wherein the enabling the defining of the one or more attributes of the source resonator comprises retrieving a previously defined source resonator and the enabling the defining of the one or more attributes of the device resonator comprises retrieving a previously defined device resonator.

11. The computer-readable medium of claim 7 wherein the defining of the information about the interaction between the source resonator and the device resonator comprises defining at least one system parameter selected from the group consisting of a sweep parameter and source/device resonator separation distance.

12. The computer-readable medium of claim 7 in which the instructions further causing the computer to model the electromagnetic performance of the wireless energy transfer system utilizing at least one measured attribute of a physical system built based, at least in part, upon the impedance matching network.

13. The computer-readable medium of claim 7 wherein generating the design of the impedance matching network is based on a received a nominal matching value of the wireless energy transfer system.

14. The computer-readable medium of claim 7 wherein the visual representation represents a predicted performance of the wireless energy transfer system based on the generated design of the impedance matching network.

15. The computer-readable medium of claim 14 wherein the predicted performance is based on a fixed impedance value in the wireless energy transfer system.

16. The computer-readable medium of claim 14 wherein providing the visual representation comprises displaying a Smith Chart.

17. The computer-readable medium of claim 7 wherein the visual representation comprises multiple curves which depend on different configurations of the wireless energy transfer system.

18. The computer-readable medium of claim 7 wherein the visual representation comprises a plot of the modeled electromagnetic performance over a range of values of a received sweeping parameter.

19. The computer-readable medium of claim 7 wherein the user interface is a graphical user interface.

20. The computer-readable medium of claim 7 wherein the user interface includes a command line.

21. A computing device comprising:
   a memory configured to store instructions;
   a processor configured to execute the instructions to:
      enable the defining through a user interface of one or more attributes of a source resonator and a device resonator forming a wireless energy transfer system;
      enable the defining through the user interface of information about an interaction between the source resonator and the device resonator;
      model an electromagnetic performance of the wireless energy transfer system to derive one or more modeled values based on the defined one or more attributes of the source and device resonator;
      generate a design of an impedance matching network based on the derived one or more modeled values; and
      provide through the user interface a visual representation of information about the modeled electromagnetic performance of the wireless energy transfer system and the generated design of the impedance matching network; and
   the user interface configured to display the visual representation.

22. The computing device of claim 21 in which the processor is further configured to model the electromagnetic performance of the wireless energy transfer system utilizing at least one measured attribute of a physical system built based, at least in part, upon the impedance matching network.

23. The computing device of claim 21 in which to enable the defining of the one or more attributes of the source resonator and the device resonator comprises providing alerts indicative of one or more logical or physical incompatibilities between the defined one or more attributes.

24. The computing device of claim 21 in which to enable the defining of the one or more attributes of the source resonator comprises retrieving a previously defined source resonator and to enable the defining of the one or more attributes of the device resonator comprises retrieving a previously defined device resonator.

25. The computer-readable medium of claim 21 wherein the visual representation represents a predicted performance of the wireless energy transfer system based on the generated design of the impedance matching network.

26. The computer-readable medium of claim 21 wherein the visual representation comprises multiple curves which depend on different configurations of the wireless energy transfer system.

27. The computer-readable medium of claim 21 wherein the visual representation comprises a plot of the modeled electromagnetic performance over a range of values of a received sweeping parameter.

* * * * *

UNITED STATES PATENT AND TRADEMARK OFFICE
CERTIFICATE OF CORRECTION

PATENT NO.         : 8,667,452 B2
APPLICATION NO.    : 13/668756
DATED              : March 4, 2014
INVENTOR(S)        : Simon Verghese et al.

Page 1 of 1

It is certified that error appears in the above-identified patent and that said Letters Patent is hereby corrected as shown below:

On the Title Page:

Page 6, Column 1

(Other Publications), Line 50, delete "NewScientistsTech.com" and insert -- NewScientistTech.com --

Page 6, Column 2

(Other Publications), Line 30, delete "Appiied" and insert -- Applied --

(Other Publications), Line 32, delete "a.cochlear" and insert -- a cochlear --

(Other Publications), Line 52, delete "Reasonators" and insert -- Resonators --

Page 7, Column 2

(Other Publications), Line 67, delete "Jun. 29-Jul." and insert -- Jun. 29-Jul. 3 --

In the Claims:

Column 62

Line 18, in Claim 1, after "modeling," insert -- using --

Column 64

Line 60, in Claim 25, delete "The computer-readable medium" and insert -- A computing device --

Line 64, in Claim 26, delete "The computer-readable medium" and insert -- A computing device --

Column 65

Line 1, in Claim 27, delete "The computer-readable medium" and insert -- A computing device --

Signed and Sealed this
Tenth Day of June, 2014

Michelle K. Lee
*Deputy Director of the United States Patent and Trademark Office*